United States Patent
Takashima et al.

(10) Patent No.: US 9,407,438 B2
(45) Date of Patent: Aug. 2, 2016

(54) CRYPTOGRAPHIC SYSTEM, CRYPTOGRAPHIC METHOD, AND CRYPTOGRAPHIC PROGRAM

(71) Applicants: Katsuyuki Takashima, Chiyoda-ku (JP); Tatsuaki Okamoto, Musashino (JP)

(72) Inventors: Katsuyuki Takashima, Chiyoda-ku (JP); Tatsuaki Okamoto, Musashino (JP)

(73) Assignees: Mitsubishi Electric Corporation, Tokyo (JP); NIPPON TELEGRAPH AND TELEPHONE CORPORATION, Tokyo (JP)

( * ) Notice: Subject to any disclaimer, the term of this patent is extended or adjusted under 35 U.S.C. 154(b) by 62 days.

(21) Appl. No.: 14/376,147

(22) PCT Filed: Mar. 1, 2013

(86) PCT No.: PCT/JP2013/055661
§ 371 (c)(1),
(2) Date: Aug. 1, 2014

(87) PCT Pub. No.: WO2013/133158
PCT Pub. Date: Sep. 12, 2013

(65) Prior Publication Data
US 2015/0010147 A1 Jan. 8, 2015

(30) Foreign Application Priority Data
Mar. 6, 2012 (JP) .................... 2012-049275

(51) Int. Cl.
*H04L 9/00* (2006.01)
*H04L 9/16* (2006.01)
*H04L 9/30* (2006.01)

(52) U.S. Cl.
CPC ............... *H04L 9/16* (2013.01); *H04L 9/3073* (2013.01)

(58) Field of Classification Search
CPC ... H04L 9/3073; H04L 9/0836; H04L 9/3093; H04L 9/0861; H04L 9/0847; H04L 9/085; H04L 9/28; H04L 9/08
See application file for complete search history.

(56) References Cited

U.S. PATENT DOCUMENTS 7,634,085 B1 12/2009 Sahai et al.
2009/0080658 A1 3/2009 Waters et al.
(Continued)

FOREIGN PATENT DOCUMENTS

WO 2011/083678 7/2011
WO 2011/086687 7/2011
(Continued)

OTHER PUBLICATIONS

Predicate Encryption Supporting Disjunctions, Polynomial Equations, and Inner Products, Katz J (on Applicants IDS filed Sep. 24, 2014).*
(Continued)

*Primary Examiner* — Jeffrey Pwu
*Assistant Examiner* — Helai Salehi
(74) *Attorney, Agent, or Firm* — Oblon, McClelland, Maier & Neustadt, L.L.P.

(57) ABSTRACT

The present invention aims to allow for addition of an attribute category without reissuing a public parameter. A cryptographic system 10 uses an indexing technique in dual system encryption in dual pairing vector spaces. Specifically, for a transmission-side vector $t_j$ for index j, the cryptographic system 10 sets information J assigned to the index j in advance as a coefficient of a predetermined basis vector. For a reception-side vector for index j' corresponding to the index j, the cryptographic system 10 sets information J' having an inner-product of 0 with the information J as a coefficient of a basis vector corresponding to the predetermined basis vector.

11 Claims, 40 Drawing Sheets

(56) References Cited

U.S. PATENT DOCUMENTS

| | | | |
|---|---|---|---|
| 2012/0297201 A1* | 11/2012 | Matsuda | G06F 21/6245 713/189 |
| 2013/0028415 A1 | 1/2013 | Takashima et al. | |
| 2013/0039489 A1 | 2/2013 | Takashima et al. | |
| 2013/0114810 A1 | 5/2013 | Kobayashi et al. | |

FOREIGN PATENT DOCUMENTS

| | | |
|---|---|---|
| WO | 2011/135895 | 11/2011 |
| WO | 2012/011575 | 1/2012 |

OTHER PUBLICATIONS

International Search Report Issued May 7, 2013 in PCT/JP13/055661 filed Mar. 1, 2013.
Beimel, A. et al., "Secure Schemes for Secret Sharing and Key Distribution", Israel Institute of Technology, 1996 (115 pages).
Bethencourt, J. et al., "Ciphertext-Policy Attribute-Based Encryption", IEEE Press, pp. 321-334, 2007.
Boneh, D. et al., "Efficient Selective-ID Secure Identity based Encryption Without Random oracles", EUROCRYPT, vol. 3027, pp. 223-238, 2004.
Boneh, D. et al., "Secure Identity Based Encryption Without Random oracles", CRYPTO, vol. 3152, pp. 443-459, 2004.
Boneh, D. et al., "Hierarchical Identity Based Encryption with Constant Size Ciphertext", EUROCRYPT, vol. 3494, pp. 440-456, 2005.
Boneh, D. et al., "Short Group Signatures", CRYPTO, vol. 3152, pp. 41-55, 2004.
Boneh, D. et al., "Identity-Based Encryption from the Well Pairing", CRYPTO, vol. 2139, pp. 213-229, 2001.
Boneh, D. et al., "Generalized Identity Based and Broadcast Encryption Schemes", ASIACRYPT, vol. 5350, pp. 455-470, 2008.
Boneh, D. et al., "Improved Efficiency for CCA-Secure Cryptosystems Built Using Identity-Based Encrytion", RSA-CT, 2005.
Boneh, D. et al., "Conjunctive, Subset, and Range Queries on Encrypted Data", TCC, vol. 4392, pp. 535-554, 2007.
Boyen, X. et al., "Anonymous Hierarchical Identity-Based Encryption(Without Random Oracles)", CRYPTO, vol. 4117 pp. 290-307, 2006.
Canetti, R. et al., "Chosen-Ciphertext Security from Identity-Based Encryption", EUROCRYPT, 2004.
Chase, M., "Multi-Authority Attribute Based Encryption", TCC, LNCS, pp. 515-534, 2007.
Chase, M., "Improving Privacy and Security in Multi-Authority Attribute-Based Encryption", ACM, pp. 121-130, 2009.
Cocks, C., "An Identity Based Encryption Scheme Based on Quadratic Residues", IMA Int. Conf., vol. 2260, pp. 360-363, 2001.
Gentry, C., "Practical Identity-Based Encryption Without Random Oracles", EUROCRYPT, vol. 4004, pp. 445-464, 2006.
Gentry, C., "Hierarchical Identity Based Encryption with Polynomially Many Levels", TCC, vol. 5444, pp. 437-456, 2009.
Gentry, C., et al., "Hierarchical ID-Based Cryptography", ASIACRYPT, vol. 2501, pp. 548-566, 2002.
Goyal, V., et al., "Attribute-Based Encryption for Fine-Grained Access Control of Encrypted Data", ACM, pp. 89-98, 2006.
Katz, J., et al., "Predicate Encryption Supporting Disjunctions, Polynomial Equations, and Inner Products", EUROCRYPT, vol. 4965, pp. 146-162, 2008.
Lewko, A., et al., "Fully Secure Functional Encryption: Attribute-Based Encryption and (Hierarchical) Inner Product Encryption", EUROCRYPT, 2010 (57 pages).
Lewko, A., et al., "New Techniques for Dual System Encryption and Fully Secure HIBE with Short Ciphertexts", TCC, vol. 5978, pp. 455-479, 2010.
Lewko, A. B., et al., "Decentralizing Attribute-Based Encryption", the proceedings of Eurocrypt, 2011(32 pages).
Lewko, A. B., et al., "Unbounded HIBE and Attribute-Based Encryption", the proceedings of Eurocrypt, 2011 (20 pages).
Lin, H., et al., "Secure threshold multi attribute based encryption without a central authority", INDOCRYPT, LNCS, vol. 5365, pp. 426-436, 2008.
Mueller, S., et al., "On Multi-Authority Ciphertext-Policy Attribute-Based Encryption", Bull. Korean Math. Soc., 46, No. 4, pp. 803-819, 2009.
Okamoto, T., et al., "Homomorphic Encryption and Signatures from Vector Decomposition", LNCS, vol. 5209, pp. 57-74, 2008.
Okamoto, T., et al., "Hierarchical Predicate Encryption for Inner-Products", ASIACRYPT, 2009 (21 pages).
Okamoto, T., et al., "Fully Secure Functional Encryption with General Relations from the Decisional Linear Assumption", CRYPTO, vol. 6223, pp. 191-208, 2010.
Okamoto, T., et al., "Efficient Attribute-Based Signatures for Non-Monotone Predicates in the Standard Model", PKC, 2011(41 pages).
Okamoto, T., et al., "Decentralized Attribute-Based Signatures", http://eprint.iacr.org/2011/701(59 pages).
Ostrovsky, R., et al., "Attribute-Based Encryption with Non-Monotonic Access Structures", ACM, pp. 195-203, 2007.
Pirretti, M., et al., "Secure Attribute-Based Systems", ACM, pp. 99-112, 2006.
Sahai, A., et al., "Fuzzy Identity-Based Encryption", EUROCRYPT, vol. 3494, pp. 457-473, 2005.
Shi, E., et al., "Delegating Capabilities in Predicate Encryption Systems", ICALP (2), LNCS, vol. 5126, pp. 560-578, 2008.
Waters, B., et al., "Efficient Identity-Based Encryption Without Random Oracles", LNCS, vol. 3152, pp. 443-459, 2005.
Waters, B., et al., "Ciphertext-Policy Attribute-Based Encryption: An Expressive, Efficient, and Provably Secure realization", ePrint, IACR, http://eprint.iacr.org/2008/290 (30 pages).
Waters, B., et al., "Dual Systems Encryption: Realizing Fully Secure IBE and HIBE under Simple Assumptions", CRYPTO, vol. 5677, pp. 619-636, 2009.
Okamoto, T., et al., "Adaptively Attribute-Hiding (Hierarchical) Inner Product Encryption", Cryptology ePrint, 2012 (39 pages).
Okamoto, T., et al., "Achieving Short Ciphertexts or Short Secret-Keys for Adaptively Secure General Inner-Product encryption", CANS, LNCS 7092, pp. 138-159, 2011.
Boneh, D. et al., "Identity-Based Encryption from the Weil Pairing", CRYPTO, vol. 2139, pp. 213-229, 2001.
Goyal, V., et al., "Attribute-Base Encryption for Fine-Grained Access Control of Encrypted Data", ACM, pp. 89-98, 2006.
Lewko, A., et al., "Fully Secure Functional Encryption: Attribute-Based Encryption and (Hierarchical) Inner Product", EUROCRYPT, 2010 (57 pages).
Lewko, A., et al., "New Techniques for Dual System Encryption and Fully Secure HIBE with Short Ciphertexts", TCC, vol. 5978, pp. 455-479, 2010.
Mueller, S., et al., "On Multi-Authority Ciphertext-Policy Attribute-Based Encryption ", Bull. Korean Math. Soc., 46, No. 4, pp. 803-819, 2009.
Okamoto, T., et al., "Hierarchical Predicate Encryption for Inner-Products ", ASIACRYPT, 2009 (21 pages).

* cited by examiner

Fig. 3

$$s_0 = \begin{bmatrix} \overbrace{1, \ldots, 1}^{r \text{ COLUMNS}} \end{bmatrix} \begin{pmatrix} f_1, \ldots, f_r \end{pmatrix} = \sum_{k=1}^{r} f_k$$

Fig. 4

$$\vec{s}^T = \underbrace{\begin{pmatrix} M_{1,1} & M_{1,2} & \cdots & M_{1,r} \\ M_{2,1} & M_{2,2} & \cdots & M_{2,r} \\ & & \cdots & \\ M_{L,1} & M_{L,2} & \cdots & M_{L,r} \end{pmatrix}} \begin{pmatrix} f_1, & \cdots & , f_r \end{pmatrix} = \begin{pmatrix} s_1, & \cdots & , s_L \end{pmatrix}$$

CRYPTOGRAPHIC SYSTEM, CRYPTOGRAPHIC METHOD, AND CRYPTOGRAPHIC PROGRAM

TECHNICAL FIELD

The present invention relates to a cryptographic system that allows for addition of an attribute category without reissuing a public parameter.

BACKGROUND ART

Non-Patent Literature 29 describes a functional encryption scheme.

CITATION LIST

Non-Patent Literature

Non-Patent Literature 1: Beimel, A., Secure schemes for secret sharing and key distribution. PhD Thesis, Israel Institute of Technology, Technion, Haifa, Israel, 1996.

Non-Patent Literature 2: Bethencourt, J., Sahai, A., Waters, B.: Ciphertext-policy attribute-based encryption. In: 2007 IEEE Symposium on Security and Privacy, pp. 321-334. IEEE Press (2007)

Non-Patent Literature 3: Boneh, D., Boyen, X.: Efficient selective-ID secure identity based encryption without random oracles. In: Cachin, C., Camenisch, J. (eds.) EUROCRYPT 2004. LNCS, vol. 3027, pp. 223-238. Springer Heidelberg (2004)

Non-Patent Literature 4: Boneh, D., Boyen, X.: Secure identity based encryption without random oracles. In: Franklin, M. K. (ed.) CRYPTO 2004. LNCS, vol. 3152, pp. 443-459. Springer Heidelberg (2004)

Non-Patent Literature 5: Boneh, D., Boyen, X., Goh, E.: Hierarchical identity based encryption with constant size ciphertext. In: Cramer, R. (ed.) EUROCRYPT 2005. LNCS, vol. 3494, pp. 440-456. Springer Heidelberg (2005)

Non-Patent Literature 6: Boneh, D., Boyen, X., Shacham, H.: Short group signatures. In: Franklin, M. (ed.) CRYPTO 2004. LNCS, vol. 3152, pp. 41-55. Springer, Heidelberg (2004)

Non-Patent Literature 7: Boneh, D., Franklin, M.: Identity-based encryption from the Weil pairing. In: Kilian, J. (ed.) CRYPTO 2001. LNCS, vol. 2139, pp. 213-229. Springer Heidelberg (2001)

Non-Patent Literature 8: Boneh, D., Hamburg, M.: Generalized identity based and broadcast encryption scheme. In: Pieprzyk, J. (ed.) ASIACRYPT 2008. LNCS, vol. 5350, pp. 455-470. Springer Heidelberg (2008)

Non-Patent Literature 9: Boneh, D., Katz, J., Improved efficiency for CCA-secure cryptosystems built using identity based encryption. RSA-CT 2005, LNCS, Springer Verlag (2005)

Non-Patent Literature 10: Boneh, D., Waters, B.: Conjunctive, subset, and range queries on encrypted data. In: Vadhan, S. P. (ed.) TCC 2007. LNCS, vol. 4392, pp. 535-554. Springer Heidelberg (2007)

Non-Patent Literature 11: Boyen, X., Waters, B.: Anonymous hierarchical identity-based encryption (without random oracles). In: Dwork, C. (ed.) CRYPTO 2006. LNCS, vol. 4117, pp. 290-307. Springer Heidelberg (2006)

Non-Patent Literature 12: Canetti, R., Halevi S., Katz J.: Chosen-ciphertext security from identity-based encryption. EUROCRYPT 2004, LNCS, Springer Heidelberg (2004)

Non-Patent Literature 13: Chase, M.: Multi-authority attribute based encryption. TCC, LNCS, pp. 515-534, Springer Heidelberg (2007).

Non-Patent Literature 14: Chase, M. and Chow, S.: Improving privacy and security in multi-authority attribute-based encryption, ACM Conference on Computer and Communications Security, pp. 121-130, ACM (2009).

Non-Patent Literature 15: Cocks, C.: An identity based encryption scheme based on quadratic residues. In: Honary, B. (ed.) IMA Int. Conf LNCS, vol. 2260, pp. 360-363. Springer Heidelberg (2001)

Non-Patent Literature 16: Gentry, C.: Practical identity-based encryption without random oracles. In: Vaudenay, S. (ed.) EUROCRYPT 2006. LNCS, vol. 4004, pp. 445-464. Springer Heidelberg (2006)

Non-Patent Literature 17: Gentry, C., Halevi, S.: Hierarchical identity-based encryption with polynomially many levels. In: Reingold, O. (ed.) TCC 2009. LNCS, vol. 5444, pp. 437-456. Springer Heidelberg (2009)

Non-Patent Literature 18: Gentry, C., Silverberg, A.: Hierarchical ID-based cryptography. In: Zheng, Y. (ed.) ASIACRYPT 2002. LNCS, vol. 2501, pp. 548-566. Springer Heidelberg (2002)

Non-Patent Literature 19: Goyal, V., Pandey, O., Sahai, A., Waters, B.: Attribute-based encryption for fine-grained access control of encrypted data. In: ACM Conference on Computer and Communication Security 2006, pp. 89-98, ACM (2006)

Non-Patent Literature 20: Katz, J., Sahai, A., Waters, B.: Predicate encryption supporting disjunctions, polynomial equations, and inner products. In: Smart, N. P. (ed.) EUROCRYPT 2008. LNCS, vol. 4965, pp. 146-162. Springer Heidelberg (2008)

Non-Patent Literature 21: Lewko, A., Okamoto, T., Sahai, A., Takashima, K., Waters, B.: Fully secure functional encryption: Attribute based encryption and (hierarchical) inner product encryption, EUROCRYPT 2010. LNCS, Springer Heidelberg (2010)

Non-Patent Literature 22: Lewko, A. B., Waters, B.: New techniques for dual system encryption and fully secure HIBE with short ciphertexts. In: Micciancio, D. (ed.) TCC 2010. LNCS, vol. 5978, pp. 455-479. Springer Heidelberg (2010)

Non-Patent Literature 23: Lewko, A. B., Waters, B.: Decentralizing Attribute-Based Encryption, the proceedings of Eurocrypt 2011, LNCS, Springer Heidelberg (2011).

Non-Patent Literature 24: Lewko, A. B., Waters, B.: Unbounded HIBE and attribute-based encryption, the proceedings of Eurocrypt 2011, LNCS, Springer Heidelberg (2011).

Non-Patent Literature 25: H. Lin, Z. Cao, X. Liang, and J. Shao.: Secure threshold multi authority attribute based encryption without a central authority, INDOCRYPT, LNCS, vol. 5365, pp. 426-436, Springer Heidelberg (2008).

Non-Patent Literature 26: S. Muller, S. Katzenbeisser, and C. Eckert.; On multi-authority ciphertext-policy attribute-based encryption, Bull. Korean Math Soc. 46, No. 4, pp. 803-819 (2009).

Non-Patent Literature 27: Okamoto, T., Takashima, K.: Homomorphic encryption and signatures from vector decomposition. In: Galbraith, S. D., Paterson, K. G. (eds.) Pairing 2008. LNCS, vol. 5209, pp. 57-74, Springer Heidelberg (2008)

Non-Patent Literature 28: Okamoto, T., Takashima, K.: Hierarchical predicate encryption for inner-products, In: ASIACRYPT 2009, Springer Heidelberg (2009)

Non-Patent Literature 29: Okamoto, T., Takashima, K.: Fully secure functional encryption with general relations from the decisional linear assumption. In: Rabin, T. (ed.) CRYPTO 2010. LNCS, vol. 6223, pp. 191-208. Springer Heidelberg (2010). Full version is available at http://eprint.iacr.org/2010/563

Non-Patent Literature 30: Okamoto, T., Takashima, K.: Efficient attribute-based signatures for non-monotone predicates in the standard model, In: PKC 2011, Springer Heidelberg (2011)

Non-Patent Literature 31: Okamoto, T., Takashima, K.: Decentralized Attribute-Based Signatures http://eprint.iacr.org/2011/701

Non-Patent Literature 32: Ostrovsky, R., Sahai, A., Waters, B.: Attribute-based encryption with non-monotonic access structures. In: ACM Conference on Computer and Communication Security 2007, pp. 195-203, ACM (2007)

Non-Patent Literature 33: Pirretti, M., Traynor, P., McDaniel, P., Waters, B.: Secure attribute-based systems. In: ACM Conference on Computer and Communication Security 2006, pp. 99-112, ACM, (2006)

Non-Patent Literature 34: Sahai, A., Waters, B.: Fuzzy identity-based encryption. In: Cramer, R. (ed.) EUROCRYPT 2005. LNCS, vol. 3494, pp. 457-473. Springer Heidelberg (2005)

Non-Patent Literature 35: Shi, E., Waters, B.: Delegating capability in predicate encryption systems. In: Aceto, L., Damgård, I., Goldberg, L. A., Halldørsson, M. M., Ingólfsdóttir, A., Walukiewicz, I. (eds.) ICALP (2) 2008. LNCS, vol. 5126, pp. 560-578. Springer Heidelberg (2008)

Non-Patent Literature 36: Waters, B.: Efficient identity based encryption without random oracles. Eurocrypt 2005, LNCS, vol. 3152, pp. 443-459. Springer Verlag, (2005)

Non-Patent Literature 37: Waters, B.: Ciphertext-policy attribute-based encryption: an expressive, efficient, and provably secure realization. ePrint, IACR, http://eprint.iacr.org/2008/290

Non-Patent Literature 38: Waters, B.: Dual system encryption: realizing fully secure IBE and HIBE under simple assumptions. In: Halevi, S. (ed.) CRYPTO 2009. LNCS, vol. 5677, pp. 619-636. Springer Heidelberg (2009)

SUMMARY OF INVENTION

Technical Problem

In the functional encryption scheme described in Non-Patent Literature 29, a pair of a basis $B_t$ and a basis $B^*_t$ is required for each attribute category. When an attribute category is to be added, a new pair of a basis $B_t$ and a basis $B^*_t$ needs to be generated. This makes it necessary to reissue a public parameter because the basis $B_t$ is included in the public parameter.

It is an object of the present invention to allow for addition of an attribute category without reissuing a public parameter.

Solution to Problem

A cryptographic system according to the present invention is configured to perform a process using a predetermined basis B and a predetermined basis B*, and the cryptographic system includes:

a transmission device configured to generate a transmission-side vector $t_j$ for at least one index j out of a plurality of indices j, the transmission-side vector $t_j$ being a vector in which information J assigned in advance to the index j is set as a coefficient of a predetermined basis vector $b_{index}$ of the basis B, and a parameter $\Phi_j$ for the index j is set as a coefficient of another basis vector $b_{att}$ of the basis B; and a reception device configured to use a reception-side vector $r_{j'}$ for at least one index j' out of a plurality of indices j', the reception-side vector $r_{j'}$ being a vector in which information J' having an inner-product of 0 with the information J assigned in advance to the index j corresponding to the index j' is set as a coefficient of a basis vector $b^*_{index}$ of the basis B* corresponding to the basis vector $b_{index}$, and a parameter $\Psi_{j'}$ for the index j' is set as a coefficient of a basis vector $b^*_{att}$ of the basis B* corresponding to the basis vector $b_{att}$, and compute a product of pairing operations on corresponding pairs of the basis vectors of the transmission-side vector $t_j$ for the index j and the reception-side vector $r_{j'}$ for the index j' corresponding to the index j.

Advantageous Effects of Invention

In a cryptographic system according to the present invention, information J which is assigned in advance to index j is set in a transmission-side vector $t_j$, and information J' having an inner-product of 0 with the information J is set in a reception-side vector $r_{j'}$. With this arrangement, a basis B and a basis B* can be used commonly for all attribute categories with security maintained, thus eliminating the need for using a basis $B_t$ and a basis $B^*_t$ for each category. As a result, when an attribute category is to be added, there is no need to newly generate a basis $B_t$ and a basis $B^*_t$, thus allowing for addition of an attribute category without reissuing a public parameter.

BRIEF DESCRIPTION OF DRAWINGS

FIG. 3 is an explanatory drawing of $s_0$;

FIG. 4 is an explanatory drawing of $\vec{s}\,\vec{0}^T$;

DESCRIPTION OF EMBODIMENTS

Figure 1:
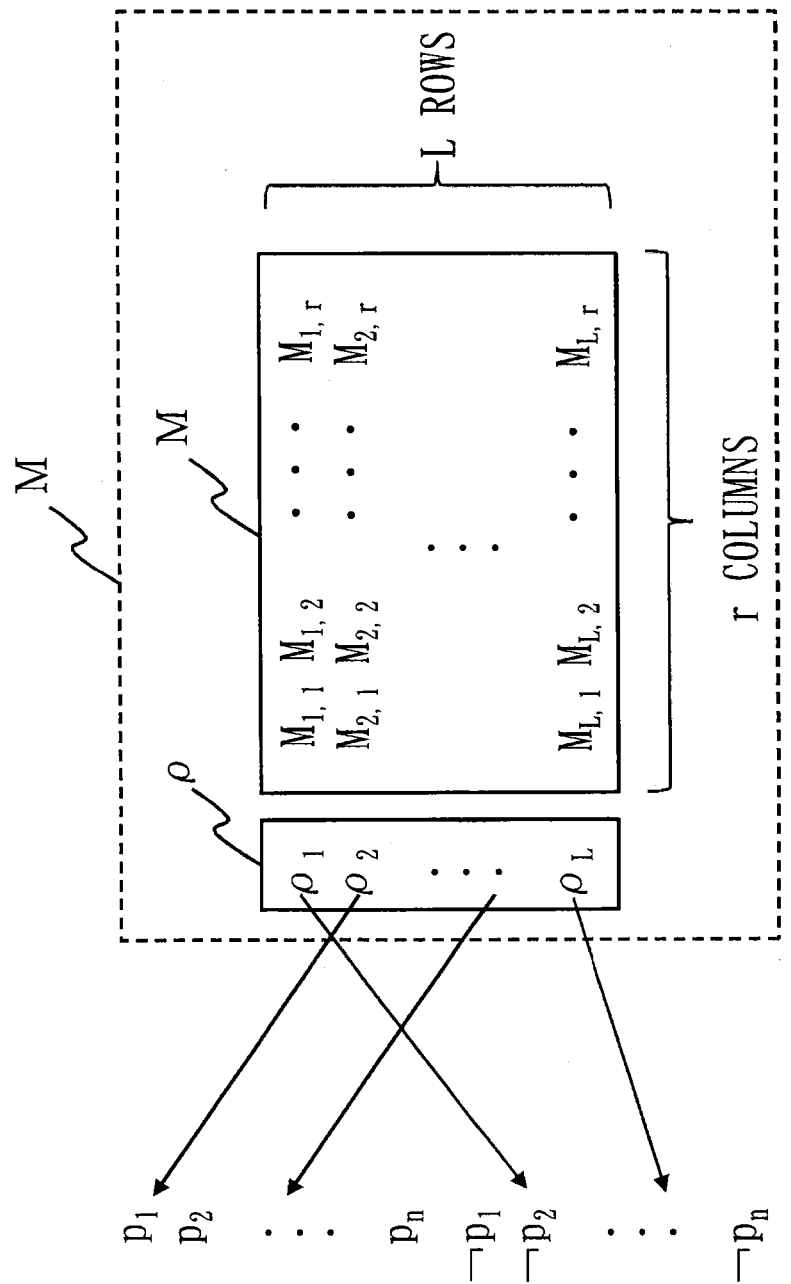
FIG. 1 is an explanatory drawing of a matrix M^.

Embodiments of the present invention will be described hereinafter with reference to the accompanying drawings.

In the following description, a processing device is a CPU 911 or the like to be described later. A storage device is a ROM 913, a RAM 914, a magnetic disk 920 or the like to be described later. A communication device is a communication board 915 or the like to be described later. An input device is a keyboard 902, the communication board 915 or the like to be described later. That is, the processing device, the storage device, the communication device, and the input device are hardware.

Notations to be used in the following description will be described.

When A is a random variable or distribution, Formula 101 denotes that y is randomly selected from A according to the distribution of A. That is, y is a random number in Formula 101.

$$y \xleftarrow{R} A \quad \text{[Formula 101]}$$

When A is a set, Formula 102 denotes that y is uniformly selected from A. That is, y is a uniform random number in Formula 102.

$$y \xleftarrow{U} A \quad \text{[Formula 102]}$$

Formula 103 denotes that y is a set defined or substituted by z.

$$y := z \quad \text{[Formula 103]}$$

When $\underline{a}$ is a fixed value, Formula 104 denotes that a machine (algorithm) A outputs $\underline{a}$ on input x.

$$A(x) \rightarrow \underline{a} \quad \text{[Formula 104]}$$

For example, $$A(x) \rightarrow 1$$

Formula 105, namely $F_q$, denotes a finite field of order q.

$$\mathbb{F}_q \quad \text{[Formula 105]}$$

A vector symbol denotes a vector representation over the finite field $F_q$, as indicated in Formula 106.

$\vec{x}$ denotes $$(x_1, \ldots, x_n) \in \mathbb{F}_q^n \quad \text{[Formula 106]}$$

Formula 107 denotes that the inner-product, indicated in Formula 109, of two vectors x and v indicated in Formula 108.

$$\vec{x} \cdot \vec{v} \quad \text{[Formula 107]}$$

$$\vec{x} = (x_1, \ldots, x_n),$$

$$\vec{v} = (v_1, \ldots, v_n) \quad \text{[Formula 109]}$$

$$\Sigma_{i=1}^n x_i v_i \quad \text{[Formula 109]}$$

Note that $X^T$ denotes the transpose of a matrix X.

When $b_i$ (i=1, . . . , n) is an element of a vector of a space V, that is when Formula 110 is established, Formula 111 denotes a subspace generated by Formula 112.

$$b_i \in \mathbb{V} \ (i=1, \ldots, n) \quad \text{[Formula 110]}$$

$$\text{span}\langle b_1, \ldots, b_n \rangle \subseteq \mathbb{V} \ (\text{resp. span} \langle \vec{x}_1, \ldots, \vec{x}_n \rangle) \quad \text{[Formula 111]}$$

$$b_1, \ldots, b_n (\text{resp.} \ \vec{x}_1, \ldots, \vec{x}_n) \quad \text{[Formula 112]}$$

For a basis B and a basis B* indicated in Formula 113, Formula 114 is established.

$$\mathbb{B} := (b_1, \ldots, b_N),$$

$$\mathbb{B}^* := (b^*_1, \ldots, b^*_N) \quad \text{[Formula 113]}$$

$$(x_1, \ldots, x_N)_{\mathbb{B}} := \Sigma_{i=1}^N x_i b_i,$$

$$(y_1, \ldots, y_N)_{\mathbb{B}^*} := \Sigma_{i=1}^N y_i b^*_i \quad \text{[Formula 114]}$$

Note that $e_j$ denotes an orthonormal basis vector indicated in Formula 115.

$$\vec{e}_j : (\overset{j-1}{\overline{0 \cdots 0}}, 1, \overset{n-j}{\overline{0 \cdots 0}}) \in \mathbb{F}_q^n \text{ for } j = 1, \cdots, n, \quad \text{[Formula 115]}$$

In the following description, when "Vt" is shown as a subscript or superscript, this Vt denotes $V_t$. Likewise, when "δi,j" is shown as a superscript, this δi,j denotes $\delta_{i,j}$.

When "→" representing a vector is attached to a subscript or superscript, it is meant that this "→" is attached as a superscript to the subscript or superscript.

In the following description, processes of cryptographic primitives include not only a narrowly-defined cryptographic process for keeping information secure from a third party, but also include a signature process. The processes of the cryptographic primitives include a key generation process, an encryption process, a decryption process, a key delegation process, a signature process, and a verification process.

Embodiment 1

This embodiment describes a basic concept for implementing the processes of the cryptographic primitives to be described in the following embodiments that allow for addition of an attribute category without reissuing a public parameter.

First, addition of an attribute category will be described.

Second, a functional encryption scheme and a basic construction of the functional encryption scheme will be briefly described.

Third, a key technique for realizing addition of an attribute category without reissuing a public parameter will be described.

Fourth, a space having a rich mathematical structure called "dual pairing vector spaces (DPVS)" which is a space for implementing the functional encryption scheme will be described.

Fifth, a concept for implementing the functional encryption scheme will be described. Here, "span program", "inner-product of attribute information and access structure", and "secret distribution scheme (secret sharing scheme)" will be described.

<1. Addition of an Attribute Category>

An attribute category is a classification of an attribute of each user, such as belonging organization, belonging department, position in company, age, and gender.

The processes of the cryptographic primitives to be described in the following embodiments realize access control based on the user's attribute. For example, with a narrowly-defined cryptographic process for securing information from a third party, whether or not the user can decrypt a ciphertext is controlled based on the user's attribute.

Generally, attribute categories used for access control are determined in advance at the design stage of a system. However, there may be a case where the operational rules of the system are changed at a later stage, necessitating addition of an attribute category used for access control.

For example, suppose that a cryptographic system is constructed on the assumption that the system is to be used only within Company A. In this case, it is assumed that the attribute categories to be used are, for example, belonging department, position in company, and individual ID. However, suppose that the operational rules are changed at a later stage so that the cryptographic system is used not only in Company A but also in associated companies of Company A. In this case, belonging company needs to be newly set as an attribute category to be used.

If the attribute categories used for access control are specified by a public parameter, adding an attribute category at a later stage requires that the public parameter be reissued and redistributed to each user. For this reason, an attribute category cannot be easily added at a later stage, and an operational mode that was not taken into consideration at the design stage of the system cannot be flexibly adopted.

Therefore, it is important to allow for addition of an attribute category without reissuing a public parameter.

<2. Functional Encryption Scheme>

The functional encryption scheme is an encryption scheme that provides more sophisticated and flexible relations between an encryption key ek and a decryption key dk.

According to the functional encryption scheme, a parameter Φ and a parameter Ψ are set in the encryption key ek and the decryption key dk, respectively. The decryption key dk can decrypt a ciphertext encrypted with the encryption key ek if and only if a relation R (Φ, Ψ) holds.

The functional encryption scheme includes an attribute-based encryption scheme and an 1D-based encryption scheme.

The construction of the functional encryption scheme will be briefly described.

The functional encryption scheme consists of four algorithms: Setup, KeyGen, Enc, and Dec.

(Setup)

A Setup algorithm is an algorithm that outputs a public parameter pk and a master key sk.

(KeyGen)

A KeyGen algorithm is an algorithm that takes as input the public parameter pk, the master key sk, and a parameter Ψ, and outputs a decryption key $sk_\Psi$.

(Enc)

An Enc algorithm is an algorithm that takes as input the public parameter pk, a parameter Φ, and a message m, and outputs a ciphertext $ct_\Phi$.

(Dec)

A Dec algorithm is an algorithm that takes as input the public parameter pk, the decryption key $sk_\Psi$, and the ciphertext $ct_\Phi$, and outputs the message m or a distinguished symbol ⊥.

The ciphertext $ct_\Phi$ can be decrypted with the decryption key $sk_\Psi$ to obtain the message m if and only if the parameter Ψ and the parameter Φ satisfy the relation R (if R(Φ, Ψ) holds).

Generally, the Setup algorithm is executed only once at system setup. The KeyGen algorithm is executed each time a decryption key $sk_\Psi$ of a user is to be generated. The Enc algorithm is executed each time a message m is to be encrypted. The Dec algorithm is executed each time a ciphertext $ct_\Phi$ is to be decrypted.

<3. Key Technique>

The key technique for realizing addition of an attribute category without reissuing a public parameter is to apply an indexing technique to dual system encryption in the dual pairing vector spaces.

In the dual system encryption in the dual pairing vector spaces, a pair of dual bases, a basis B and a basis B*, are randomly generated. Then, a part of the basis B (basis B^) is used as a public parameter.

In the functional encryption scheme described in Non-Patent Literature 29, a basis $\hat{B}_1$, . . . , and a basis $\hat{B}_d$ are generated as a public parameter. One attribute category is assigned to each basis $\hat{B}_t$ corresponding to each integer t=1, ..., d. That is, d pieces of attribute categories can be handled.

As is evident from the fact that the basis $\hat{B}_1, \ldots$, and the basis $\hat{B}_d$ are used as the public parameter, the public parameter needs to be reissued to add a basis $\hat{B}$, that is, to increase the value of d, at a later stage. In other words, the value of d is bounded by the public parameter.

In the functional encryption scheme to be described in the following embodiments, a basis $\hat{B}$ is generated as a public parameter. Two-dimensional index vectors, $\sigma_t(1, t)$ and $\mu_t(t, -1)$, corresponding to each integer t=1, ..., d are set in a ciphertext c and a secret key k*, respectively, such that one attribute category is assigned to each integer t. That is, d pieces of attribute categories can be handled.

Note here that the public parameter includes the basis $\hat{B}$ but not the index vectors. Hence, when index vectors are to be added at a later stage to increase the value of d, there is no need to reissue the public parameter. In other words, the value of d is not bounded by the public parameter.

<4. Dual Pairing Vector Spaces>

First, symmetric bilinear pairing groups will be described.

Symmetric bilinear pairing groups $(q, G, G^T, g, e)$ are a tuple of a prime q, a cyclic additive group G of order q, a cyclic multiplicative group $G^T$ of order q, $g \neq 0 \in G$, and a polynomial-time computable nondegenerate bilinear pairing $e: G \times G \to G_T$. The nondegenerate bilinear pairing signifies $e(sg, tg) = e(g, g)^{st}$, and $e(g, g) \neq 1$.

In the following description, let $G_{bpg}$ be an algorithm that takes as input $1^\lambda$ and outputs values of a parameter $param_G := (q, G, G_T, g, e)$ of bilinear pairing groups with a security parameter $\lambda$.

Dual pairing vector spaces will now be described.

Dual pairing vector spaces $(q, V, G_T, A, e)$ can be constructed by a direct product of the symmetric bilinear pairing groups $(param_G := (q, G, G_T, g, e))$. The dual pairing vector spaces $(q, V, G_T, A, e)$ are a tuple of a prime q, an N-dimensional vector space V over $F_q$ indicated in Formula 116, a cyclic group $G_T$ of order q, and a canonical basis $A := (a_1, \ldots, a_N)$ of the space V, and have the following operations (1) and (2), where $a_i$ is as indicated in Formula 117.

$$V := \overbrace{G \times \cdots \times G}^{N}$$ [Formula 116]

$$a_i := (\overbrace{0, \cdots, 0}^{i-1}, g, \overbrace{0, \cdots, 0}^{N-i})$$ [Formula 117]

Operation (1): Nondegenerate Bilinear Pairing

A pairing in the space V is defined by Formula 118.

$$e(x,y) := \Pi_{i=1}^N e(G_i, H_i) \in G_T$$ [Formula 118]

where $(G_1, \ldots, G_N) := x \in V$, $(H_1, \ldots, H_N) := y \in V$

This is nondegenerate bilinear, that is, $e(sx, ty) = e(x, y)^{st}$ and if $e(x, y) = 1$ for all $y \in V$, then $x = 0$. For all i and j, $e(a_i, a_j) = e(g, g)^{\delta_{i,j}}$, where $\delta_{i,j} = 1$ if $i = j$, and $\delta_{i,j} = 0$ if $i \neq j$, and $e(g, g) \neq 1 \in G_T$.

Operation (2): Distortion Maps

Linear transformations $\phi_{i,j}$ on the space V indicated in Formula 119 can achieve Formula 120.

If $\phi_{i,j}(a_j) = a_i$ and [Formula 119]
$k \neq j$, then $\phi_{i,j}(a_k) = 0$.

$$\phi_{i,j}(x) := (\overbrace{0, \cdots, 0}^{i-1}, g_j, \overbrace{0, \cdots, 0}^{N-i})$$ [Formula 120]

where $(g_1, \cdots g_N) := x$

The linear transformations $\phi_{i,j}$ will be called distortion maps.

In the following description, let $G_{dpvs}$ be an algorithm that takes as input $1^\lambda$ ($\lambda \in$ natural number), $N \in$ natural number, and values of a parameter $param_G := (q, G, G_T, g, e)$ of bilinear pairing groups, and outputs values of a parameter $param_V := (q, V, G_T, A, e)$ of dual pairing vector spaces with a security parameter $\lambda$ and an N-dimensional space V.

Description will be directed herein to a case where the dual pairing vector spaces are constructed using the above-described symmetric bilinear pairing groups. The dual pairing vector spaces can also be constructed using asymmetric bilinear pairing groups. The following description can easily be adapted to a case where the dual pairing vector spaces are constructed using asymmetric bilinear pairing groups.

<5. Concept for Implementing Functional Encryption>

<5-1. Span Program>

FIG. 1 is an explanatory drawing of a matrix $\hat{M}$.

Let $\{p_1, \ldots, p_n\}$ be a set of variables. $\hat{M} := (M, \rho)$ is a labeled matrix. The matrix M is an (L rows×r columns) matrix over $F_q$, and $\rho$ is a label of rows of the matrix M and is related to one of literals $\{p_1, \ldots, p_n, \neg p_1, \ldots, \neg p_n\}$. A label $\rho_i$ (i=1, ... L) of each row of M is related to one of the literals. That is, $\rho: \{1, \ldots, L\} \to \{p_1, \ldots, p_n, \neg p_1, \ldots, \neg p_n\}$.

For every input sequence $\delta \in \{0, 1\}^n$, a submatrix $M_\delta$ of the matrix M is defined. The matrix $M_\delta$ is a submatrix consisting of those rows of the matrix M the labels $\rho$ of which are related to a value "1" by the input sequence $\delta$. That is, the matrix $M_\delta$ is a submatrix consisting of the rows of the matrix M which are related to $p_i$ such that $\delta_i = 1$ and the rows of the matrix M which are related to $\neg p_i$ such that $\delta_i = 0$.

Figure 2:
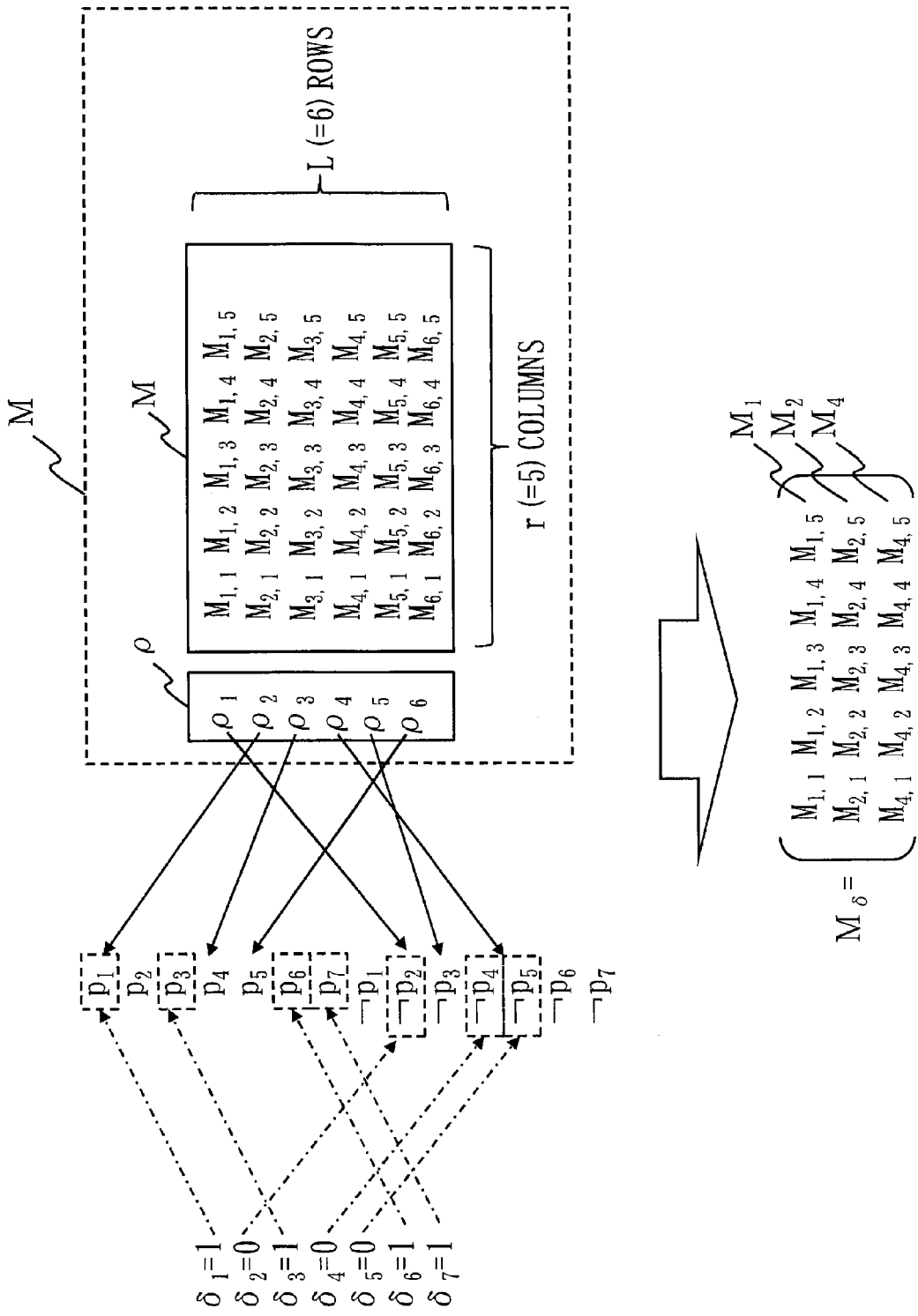
FIG. 2 is an explanatory drawing of a matrix $M_\delta$.

FIG. 2 is an explanatory drawing of the matrix $M_\delta$. In FIG. 2, note that n=7, L=6, and r=5. That is, the set of variables is $\{p_1, \ldots, p_7\}$, and the matrix M is a (6 rows×5 columns) matrix. In FIG. 2, assume that the labels $\rho$ are related such that $\rho_1$ is related to $\neg p_2, \rho_2$ to $p_1, \rho_3$ to $p_4, \rho_4$ to $\neg p_5, \rho_5$ to $\neg p_3$, and $\rho_6$ to $p_5$.

Assume that in an input sequence $\delta \in \{0, 1\}^7$, $\delta_1 = 1, \delta_2 = 0, \delta_3 = 1, \delta_4 = 0, \delta_5 = 0, \delta_6 = 1$, and $\delta_7 = 1$. In this case, a submatrix consisting of the rows of the matrix M which are related to literals $(p_1, p_3, p_6, p_7, \neg p_2, \neg p_4, \neg p_5)$ surrounded by broken lines is the matrix $M_\delta$. That is, the submatrix consisting of the first row $(M_1)$, second row $(M_2)$, and fourth row $(M_4)$ of the matrix M is the matrix $M_\delta$.

In other words, when map $\gamma: \{1, \ldots, L\} \to \{0, 1\}$ is $[\rho(j) = p_i] \wedge [\delta_i = 1]$ or $[\rho(j) = \neg p_i] \wedge [\delta_i = 0]$, then $\gamma(j) = 1$; otherwise $\gamma(j) = 0$. In this case, $M_\delta := (M_j)_{\gamma(j)=1}$. Note that $M_j$ is the j-th row of the matrix M.

That is, in FIG. 2, map $\gamma(j) = 1$ (j=1, 2, 4), and map $\gamma(j) = 0$ (j=3, 5, 6). Hence, $(M_j)_{\gamma(j)=1}$ is $M_1, M_2$, and $M_4$, and the matrix $M_\delta$.

More specifically, whether or not the j-th row of the matrix M is included in the matrix $M_\delta$ is determined by whether the value of the map $\gamma(j)$ is "0" or "1".

The span program $M^\wedge$ accepts an input sequence $\delta$ if and only if $1 \in \text{span}<M_\delta>$, and rejects the input sequence $\delta$ otherwise. That is, the span program $M^\wedge$ accepts the input sequence $\delta$ if and only if linear combination of the rows of the matrix $M_\delta$ which are obtained from the matrix $M^\wedge$ by the input sequence $\delta$ gives 1. 1 is a row vector which has a value "1" in each element.

For example, in FIG. 2, the span program $M^\wedge$ accepts the input sequence $\delta$ if and only if linear combination of the respective rows of the matrix $M_\delta$ consisting of the 1st, 2nd, and 4th rows of the matrix M gives 1. That is, if there exist $\alpha_1$, $\alpha_2$, and $\alpha_4$ with which $\alpha_1(M_1)+\alpha_2(M_2)+\alpha_4(M_4)=\vec{1}$, the span program $M^\wedge$ accepts the input sequence $\delta$.

The span program is called monotone if its labels $\rho$ are related to only positive literals $\{p_1, \ldots, p_n\}$. The span program is called non-monotone if its labels $\rho$ are related to the literals $\{p_1, \ldots, p_n, \neg p_1, \ldots, \neg p_n\}$. It is assumed herein that the span program is non-monotone. An access structure (non-monotone access structure) is constituted using the non-monotone span program. Briefly, an access structure controls access to encryption, that is, it controls whether a ciphertext is to be decrypted or not.

As will be described in detail later, the span program being non-monotone, instead of being monotone, allows for a wider range of applications of the functional encryption scheme constituted using the span program.

<5-2. Inner-Product of Attribute Information and Access Structure>

The above-described map $\gamma(j)$ is computed using the inner-product of attribute information. That is, the inner-product of attribute information is used to determine which row of the matrix M is to be included in the matrix $M_\delta$.

$U_t$ ($t=1, \ldots, d$ and $U_t \subset \{0, 1\}^*$) is a sub-universe and a set of attributes. Each $U_t$ includes identification information (t) of the sub-universe and an n-dimensional vector (v). That is, $U_t$ is (t, v), where to $t \in \{1, \ldots, d\}$ and $v \in F_q^n$.

Let $U_t := (t, v)$ be a variable p of the span program $M^\wedge := (M, \rho)$. That is, $p := (t, v)$. Let the span program $M^\wedge := (M, \rho)$ having the variable $(p := (t, v), (t', v'), \ldots)$ be an access structure S. That is, the access structure $S := (M, \rho)$ and $\rho: \{1, \ldots, L\} \to \{(t, v), (t', v'), \ldots, \neg(t, v), \neg(t', v'), \ldots\}$.

Let $\Gamma$ be a set of attributes. That is, $\Gamma := \{(t, x_t) | x_t \in F_q^n, 1 \le t \le d\}$.

When $\Gamma$ is given to the access structure S, map $\gamma: \{1, \ldots, L\} \to \{0, 1\}$ for the span program $M^\wedge := (M, \rho)$ is defined as follows. For each integer $i=1, \ldots, L$, set $\gamma(j)=1$ if $[\rho(i)=(t, v_i)] \wedge [(t, x_t) \in \Gamma] \wedge [v_i \cdot x_t = 0]$ or $[\rho(i)=\neg(t, v_i)] \wedge [(t, x_t) \in \Gamma]^\wedge [v_i \cdot x_t \ne 0]$. Set $\gamma(j)=0$ otherwise. ¬

That is, the map $\gamma$ is computed based on the inner-product of the attribute information v and x. As described above, which row of the matrix M is to be included in the matrix $M_\delta$ is determined by the map $\gamma$. More specifically, which row of the matrix M is to be included in the matrix $M_\delta$ is determined by the inner-product of the attribute information v and x. The access structure $S := (M, \rho)$ accepts $\Gamma$ if and only if $1 \in \text{span}<(M_i)_{\gamma(i)=1}>$.

<5-3. Secret Distribution Scheme>

A secret distribution scheme for the access structure $S := (M, \rho)$ will be described.

The secret distribution scheme is distributing secret information to render it nonsense distributed information. For example, secret information s is distributed into 10 pieces to generate 10 pieces of distributed information. Each of the 10 pieces of distributed information does not have information on the secret information s. Hence, even when one of the pieces of distributed information is obtained, no information can be obtained on the secret information s. On the other hand, if all of the 10 pieces of distributed information are obtained, the secret information s can be recovered.

Another secret distribution scheme is also available according to which the secret information s can be recovered if some (for example, 8 pieces) of distributed information can be obtained, without obtaining all of the 10 pieces of distributed information. A case like this where the secret information s can be recovered using 8 pieces out of 10 pieces of distributed information will be called 8-out-of-10. That is, a case where the secret information s can be recovered using t pieces out of n pieces of distributed information will be called t-out-of-n. This t will be called a threshold.

Still another secret distribution scheme is available according to which when 10 pieces of distributed information $d_1, \ldots, d_{10}$ are generated, the secret information s can be recovered with 8 pieces of distributed information $d_1, \ldots, d_8$, but the secret information s cannot be recovered with 8 pieces of distributed information $d_3, \ldots, d_{10}$. In other words, secret distribution schemes include a scheme according to which whether or not the secret information s can be recovered is controlled not only by the number of pieces of distributed information obtained, but also the combination of distributed information obtained.

FIG. 3 is an explanatory drawing of $s_0$. FIG. 4 is an explanatory drawing of $s^T$.

Let a matrix M be an (L rows$\times$r columns) matrix. Let $f^T$ be a column vector indicated in Formula 121.

$$\vec{f}^T := (f_1, \cdots f_r)^T \xleftarrow{U} \mathbb{F}_q^r \qquad \text{[Formula 121]}$$

Let $s_0$ indicated in Formula 122 be secret information to be shared.

$$s_0 := \vec{1} \cdot \vec{f}^T := \Sigma_{k=1}^r f_k \qquad \text{[Formula 122]}$$

Let $s^T$ indicated in Formula 123 be a vector of L pieces of distributed information of $s_0$.

$$\vec{s}^T := (s_1, \ldots s_L)^T := M \cdot \vec{f}^T \qquad \text{[Formula 123]}$$

Let the distributed information $s_i$ belong to $\rho(i)$.

If the access structure $S := (M, \rho)$ accepts $\Gamma$, that is, $1 \in \text{span}<(M_i)_{\gamma(i)=1}>$ for $\gamma: \{1, \ldots, L\} \to \{0, 1\}$, then there exist constants $\{\alpha_i \in F_q | i \in I\}$ such that $I \subseteq \{i \in \{1, \ldots, L\} | \gamma(i)=1\}$.

This is obvious from the explanation about the example of FIG. 2 that if there exist $\alpha_1$, $\alpha_2$, and $\alpha_4$ with which $\alpha_1(M_1)+\alpha_2(M_2)+\alpha_4(M_4)=1$, the span program $M^\wedge$ accepts the input sequence $\delta$. That is, if the span program $M^\wedge$ accepts the input sequence $\delta$ when there exist $\alpha_1$, $\alpha_2$, and $\alpha_4$ with which $\alpha_1(M_1)+\alpha_2(M_2)+\alpha_4(M_4)=1$, then there exist $\alpha_1$, $\alpha_2$, and $\alpha_4$ with which $\alpha_1(M_1)+\alpha_2(M_2)+\alpha_4(M_4)=1$.

Note Formula 124.

$$\Sigma_{i \in I} \alpha_i s_i = s_0 \qquad \text{[Formula 124]}$$

Note that the constants $\{\alpha_i\}$ can be computed in time polynomial in the size of the matrix M.

With the functional encryption scheme according to the following embodiments, an access structure is constructed by applying the inner-product predicate and the secret distribution scheme to the span program, as described above. Therefore, access control can be designed flexibly by designing the matrix M in the span program and the attribute information x and the attribute information v (predicate information) in the inner-product predicate. That is, access control can be designed very flexibly. Designing of the matrix M corresponds to designing of conditions such as a threshold of the secret distribution scheme.

For example, the attribute-based encryption scheme described above corresponds to a case where designing of the inner-product predicate is limited to a certain condition in the access structure in the functional encryption scheme according to the following embodiments. That is, when compared to the access structure in the functional encryption scheme according to the following embodiments, the access structure in the attribute-based encryption scheme has a lower flexibility in access control design because it lacks the flexibility in designing the attribute information x and the attribute information v (predicate information) in the inner-product predicate. More specifically, the attribute-based encryption scheme corresponds to a case where attribute information $\{x_t\}_{t \in \{1, \ldots, d\}}$ and $\{v_t\}_{t \in \{1, \ldots, d\}}$ are limited to two-dimensional vectors for the equality relation, for example, $x_t := (1, x_t)$ and $v_t := (v_t, -1)$.

An inner-product predicate encryption scheme corresponds to a case where designing of the matrix M in the span program is limited to a certain condition in the access structure in the functional encryption scheme according to the following embodiments. That is, when compared to the access structure in the functional encryption scheme according to the following embodiments, the access structure in the inner-product predicate encryption scheme has a lower flexibility in access control design because it lacks the flexibility in designing the matrix M in the span program. More specifically, the inner-product predicate encryption scheme corresponds to a case where the secret distribution scheme is limited to 1-out-of-1 (or d-out-of-d).

In particular, the access structure in the functional encryption scheme according to the following embodiments constitutes a non-monotone access structure that uses a non-monotone span program. Thus, the flexibility in access control designing improves.

More specifically, since the non-monotone span program includes a negative literal ($\neg$p), a negative condition can be set. For example, assume that First Company includes four departments, A, B, C, and D. Assume that access control is to be performed such that only users belonging to departments other than department B of First Company are capable of access (capable of decryption). In this case, if a negative condition cannot be set, a condition that "the user belongs to any one of departments A, C, and D of First Company" must be set. On the other hand, if a negative condition can be set, a condition that "the user is an employee of First Company and belongs to a department other than department B" can be set. In other words, since a negative condition can be set, natural condition setting is possible. Although the number of departments is small in this case, this scheme is very effective in a case where the number of departments is large.

Embodiment 2

This embodiment describes a narrowly-defined cryptographic processing scheme. In particular, this embodiment describes a key-policy functional encryption (KP-FE) scheme.

Note that key-policy means that a policy, namely an access structure, is embedded in a decryption key.

First, the construction of the KP-FE scheme will be described.

Second, the configuration of a cryptographic system 10 that implements the KP-FE scheme will be described.

Third, the KP-FE scheme will be described in detail.

<1. Construction of KP-FE Scheme>

The KP-FE scheme consists of four algorithms: Setup, KeyGen, Enc, and Dec.

(Setup)

A Setup algorithm is a probabilistic algorithm that takes as input a security parameter λ, and outputs a public parameter pk and a master key sk.

(KeyGen)

A KeyGen algorithm is a probabilistic algorithm that takes as input an access structure S:=(M, ρ), the public parameter pk, and the master key sk, and outputs a decryption key $sk_S$.

(Enc)

An Enc algorithm is a probabilistic algorithm that takes as input a message m, an attribute set $\Gamma := \{(t, x_t) | x_t \in F_q^n, 1 \leq t \leq d\}$, and the public parameter pk, and outputs a ciphertext $ct_\Gamma$.

(Dec)

A Dec algorithm is an algorithm that takes as input the ciphertext $ct_\Gamma$ encrypted under the attribute set Γ, the decryption key $sk_S$ for the access structure S, and the public parameter pk, and outputs the message m or a distinguished symbol ⊥.

<2. Configuration of Cryptographic System 10 that Implements KP-FE Scheme>

Figure 5:
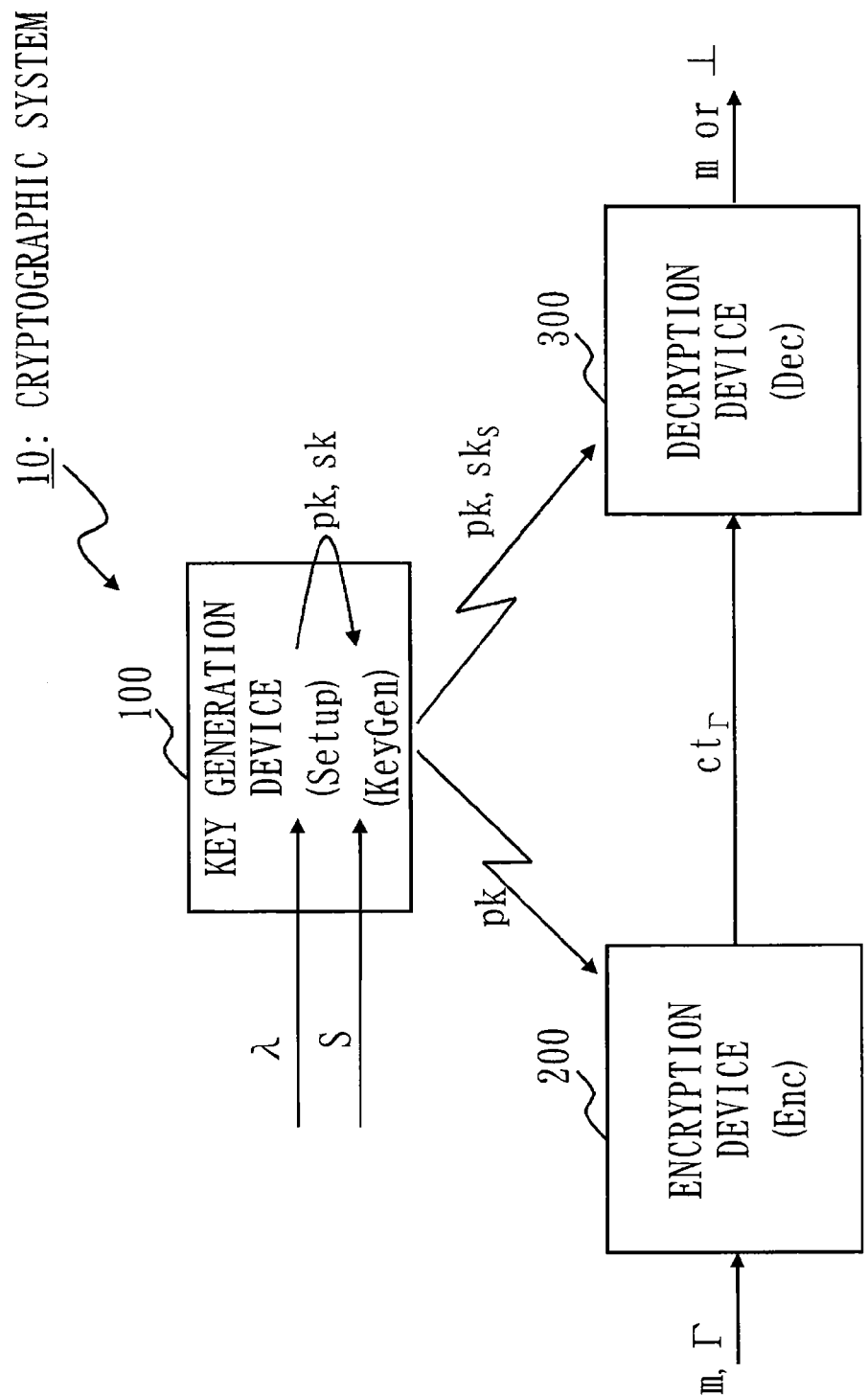
FIG. 5 is a configuration diagram of a cryptographic system 10 that implements a KP-FE scheme according to Embodiment 2.

FIG. 5 is a configuration diagram of the cryptographic system 10 that implements the KP-FE scheme according to Embodiment 2.

The cryptographic system 10 includes a key generation device 100, an encryption device 200, and a decryption device 300.

The key generation device 100 executes the Setup algorithm taking as input a security parameter λ, and thus generates a public parameter pk and a master key sk. Then, the key generation device 100 publishes the generated public parameter pk. The key generation device 100 also executes the KeyGen algorithm taking as input an access structure S, and thus generates a decryption key $sk_S$, and distributes the decryption key $sk_S$ to the decryption device 300 in secrecy.

The encryption device 200 executes the Enc algorithm taking as input a message m, an attribute set Γ, and the public parameter pk, and thus generates a ciphertext $ct_\Gamma$. The encryption device 200 transmits the generated ciphertext $ct_\Gamma$ to the decryption device 300.

The decryption device 300 executes the Dec algorithm taking as input the public parameter pk, the decryption key $sk_S$, and the ciphertext $ct_\Gamma$, and thus outputs the message m or a distinguished symbol ⊥.

<3. KP-FE Scheme in Detail>

With reference to FIGS. 6 to 12, the KP-FE scheme will be described, and the function and operation of the cryptographic system 10 that implements the KP-FE scheme will be described.

Figure 6:
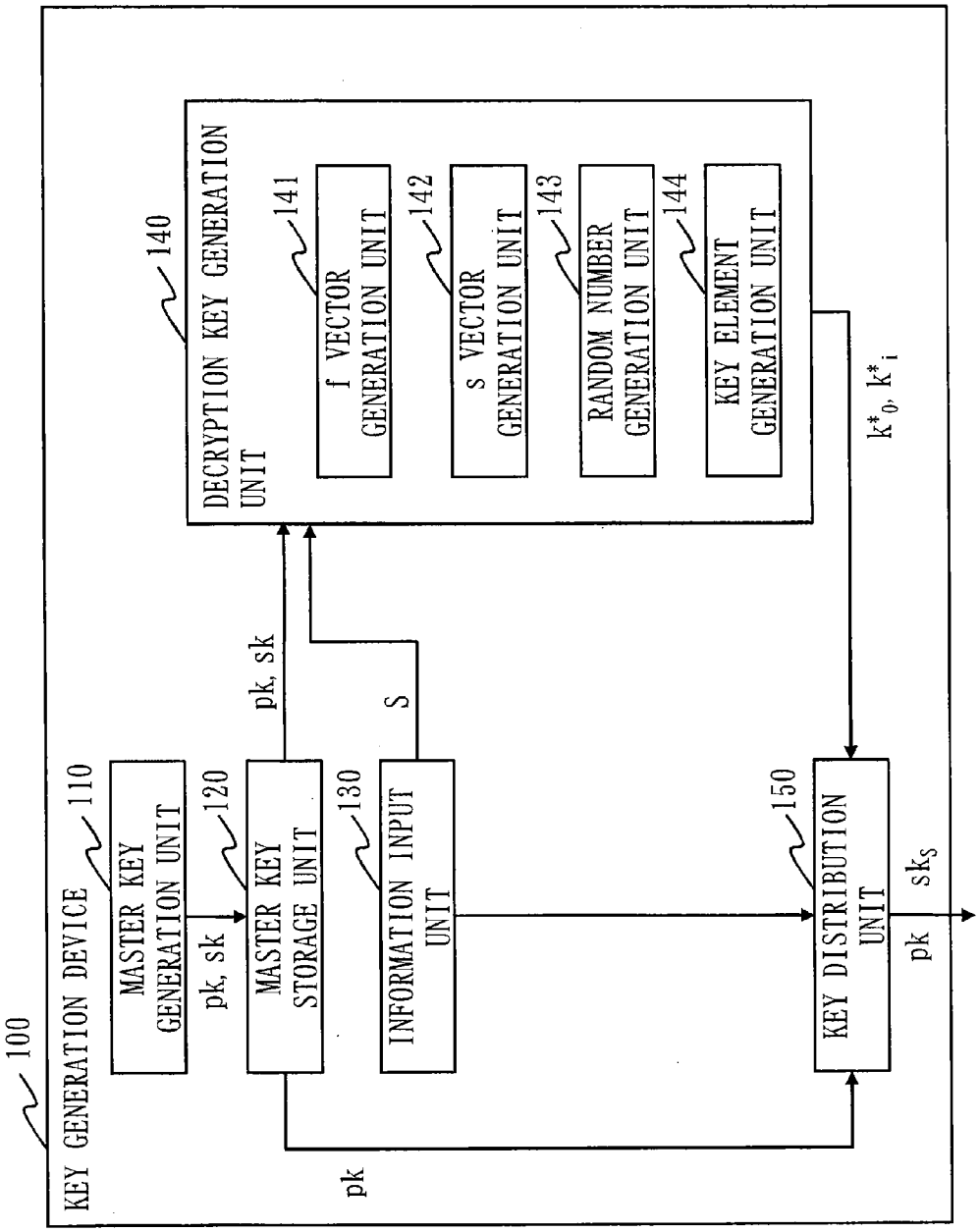
FIG. 6 is a configuration diagram of a key generation device 100 according to Embodiment 2.
Figure 7:
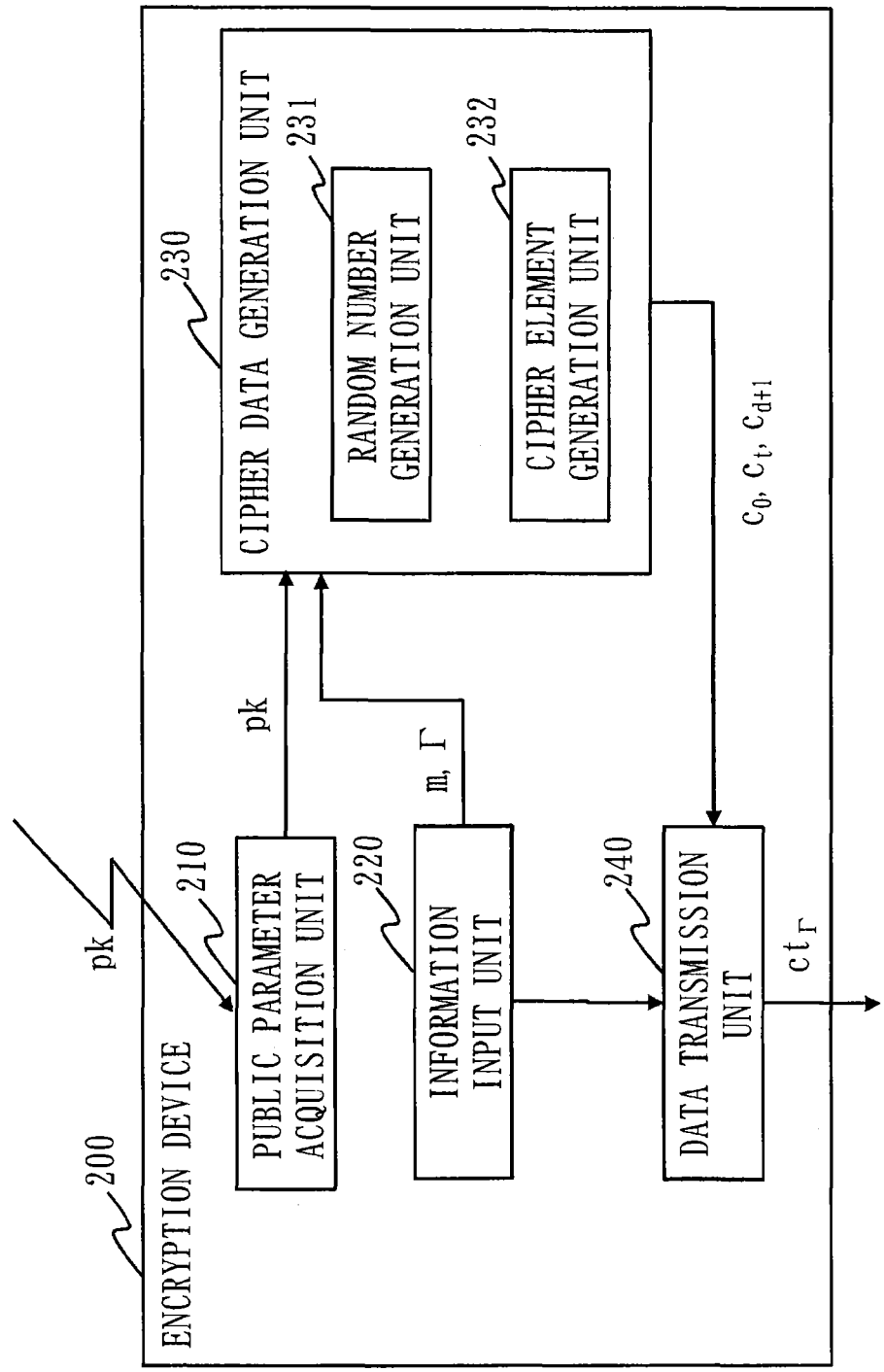
FIG. 7 is a configuration diagram of an encryption device 200 according to Embodiment 2.
Figure 8:
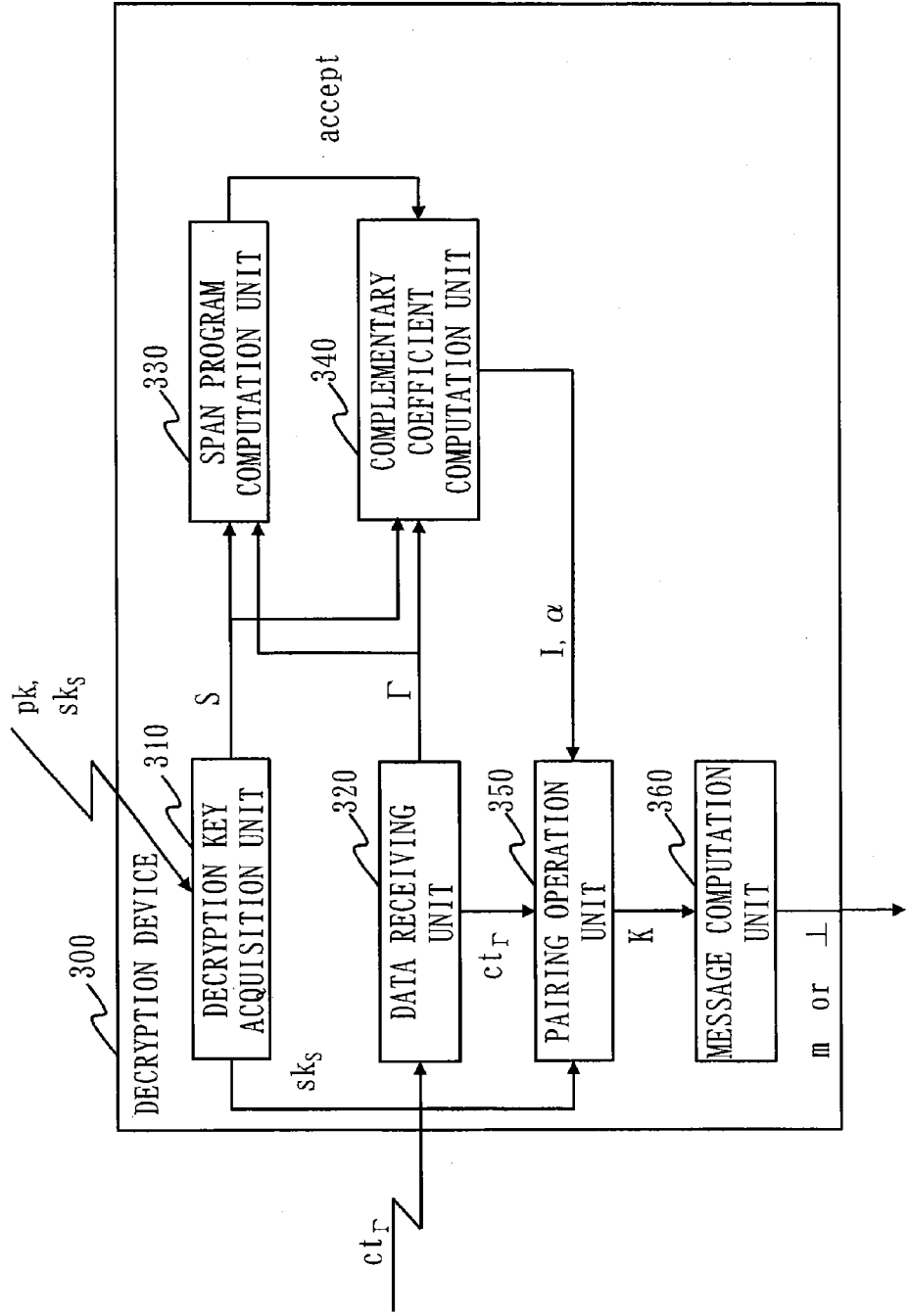
FIG. 8 is a configuration diagram of a decryption device 300 according to Embodiment 2.

FIG. 6 is a configuration diagram of the key generation device 100 according to Embodiment 2. FIG. 7 is a configuration diagram of the encryption device 200 according to Embodiment 2. FIG. 8 is a configuration diagram of the decryption device 300 according to Embodiment 2.

Figure 9:
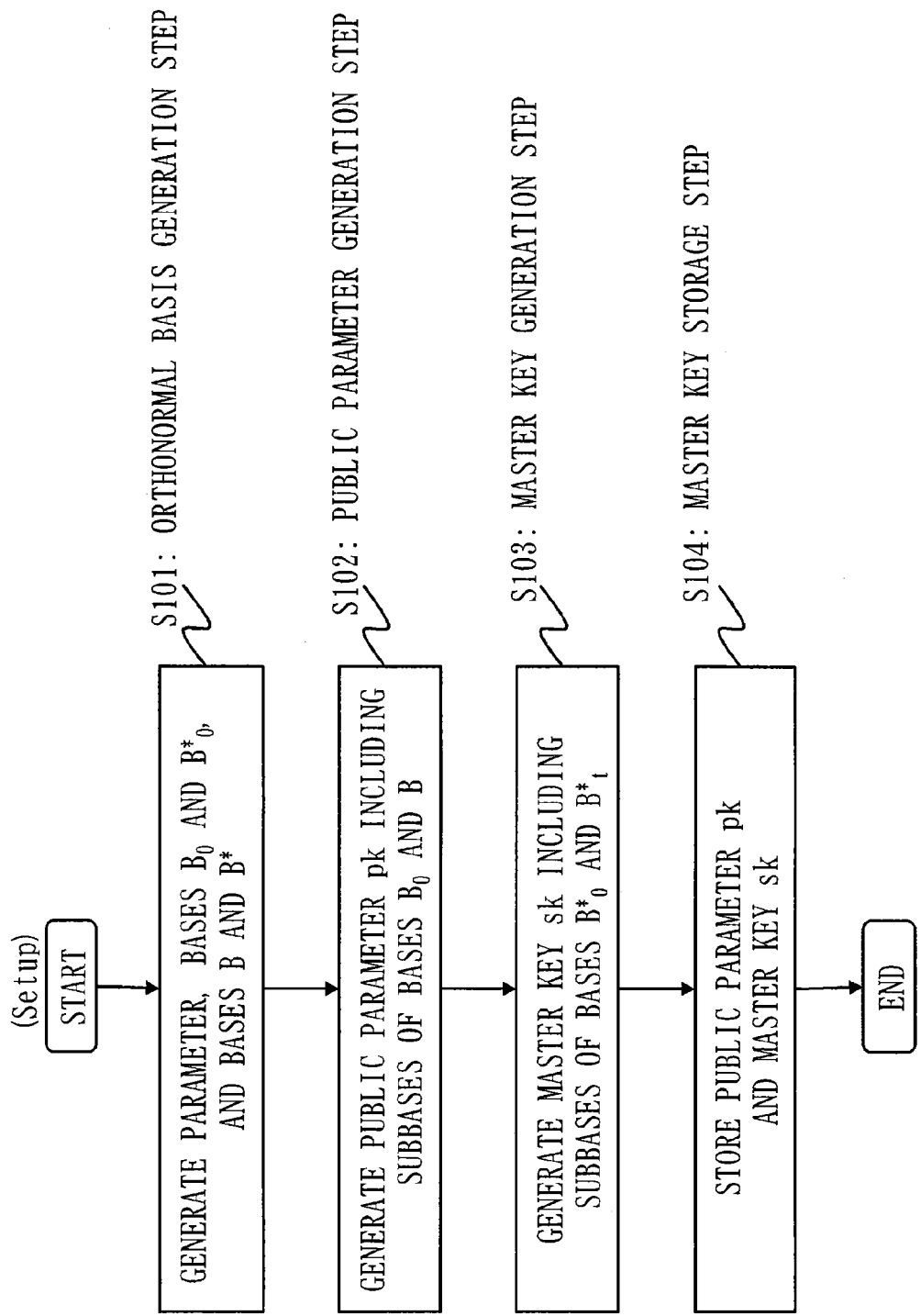
FIG. 9 is a flowchart illustrating the process of a Setup algorithm according to Embodiment 2.
Figure 10:
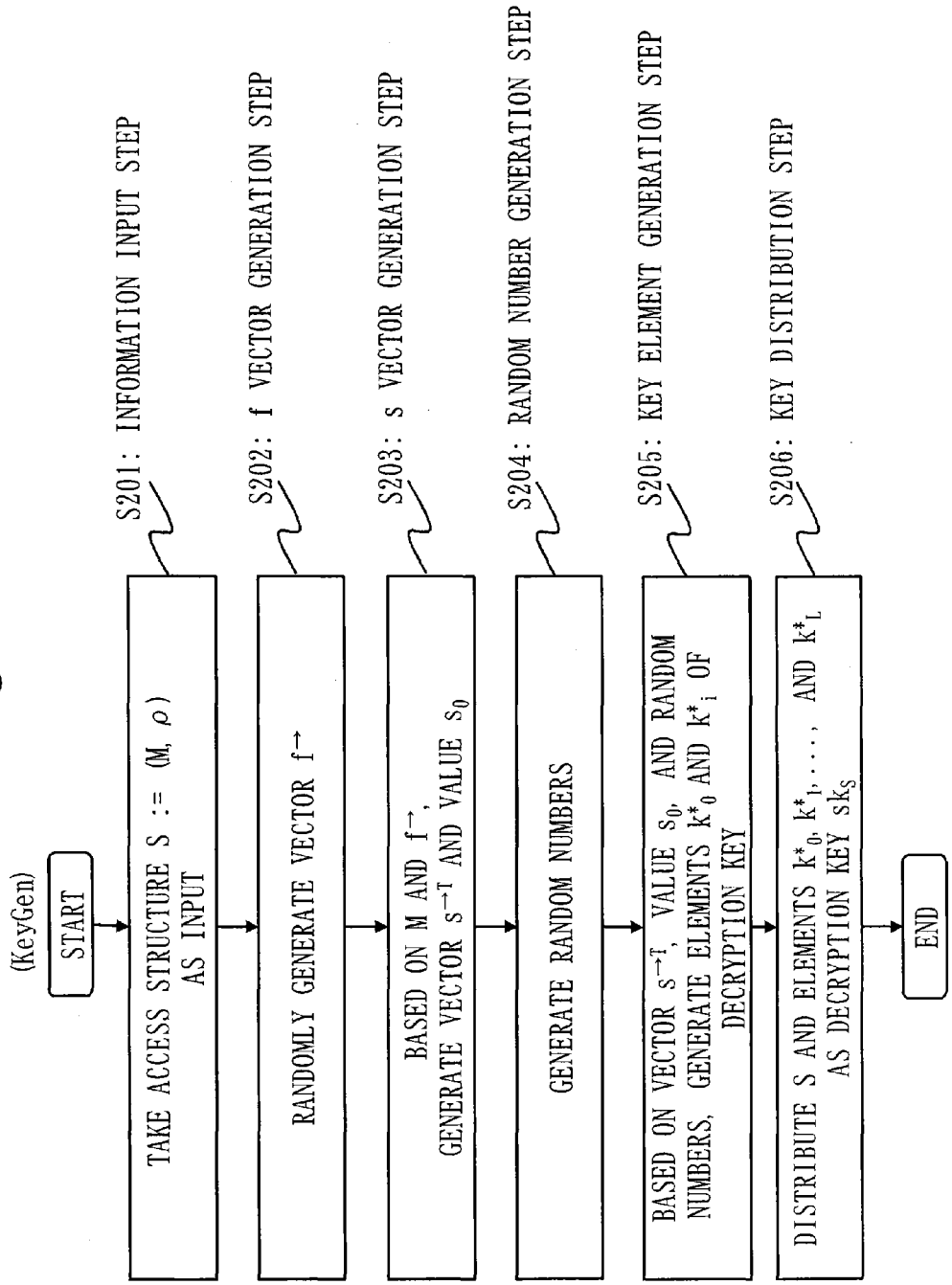
FIG. 10 is a flowchart illustrating the process of a KeyGen algorithm according to Embodiment 2.
Figure 11:
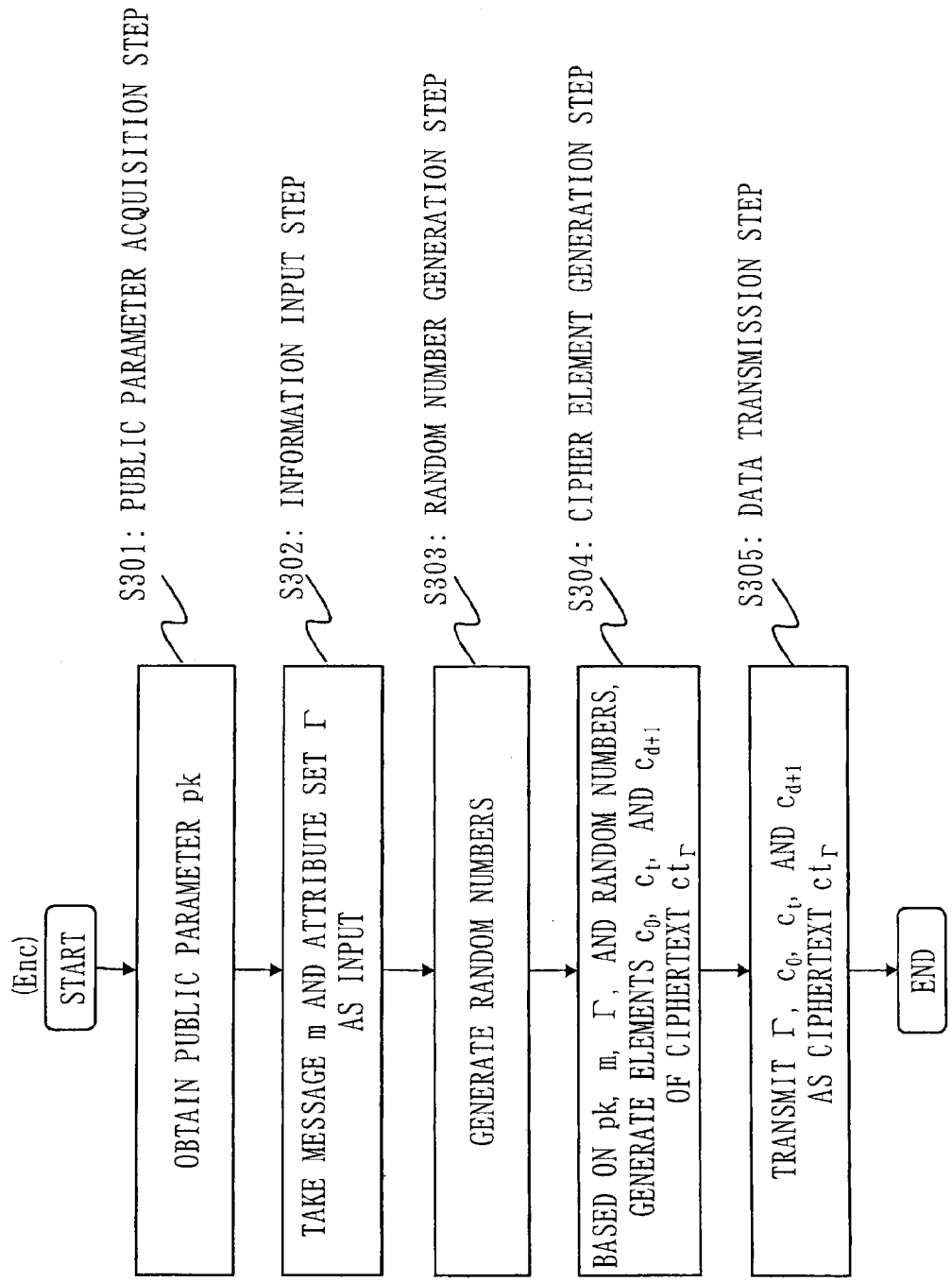
FIG. 11 is a flowchart illustrating the process of an Enc algorithm according to Embodiment 2.
Figure 12:
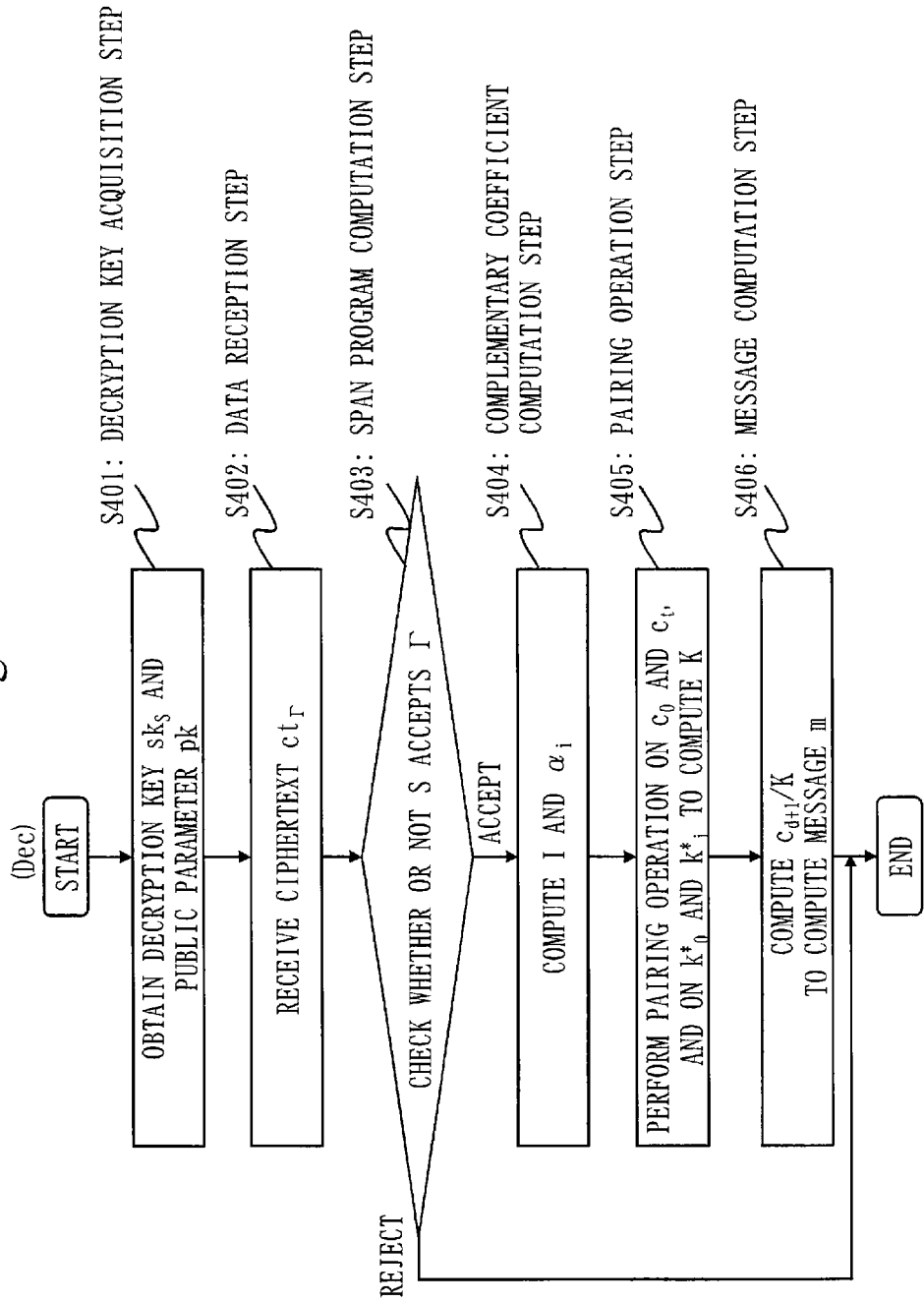
FIG. 12 is a flowchart illustrating the process of a Dec algorithm according to Embodiment 2.

FIGS. 9 and 10 show flowcharts illustrating the operation of the key generation device 100. FIG. 9 is a flowchart illustrating the process of the Setup algorithm, and FIG. 10 is a flowchart illustrating the process of the KeyGen algorithm. FIG. 11 is a flowchart illustrating the operation of the encryption device 200 and illustrating the process of the Enc algorithm. FIG. 12 is a flowchart illustrating the operation of the decryption device 300 and illustrating the process of the Dec algorithm.

In the following description, it is assumed that $x_{t,1}:=1$.

The function and operation of the key generation device 100 will be described.

The key generation device 100 includes a master key generation unit 110, a master key storage unit 120, an information input unit 130, a decryption key generation unit 140, and a key distribution unit 150. The decryption key generation unit 140 includes an f vector generation unit 141, an s vector generation unit 142, a random number generation unit 143, and a key element generation unit 144.

First, with reference to FIG. 9, the process of the Setup algorithm will be described.

(S101: Orthonormal Basis Generation Step)

Using the processing device, the master key generation unit 110 computes Formula 125, and thus generates a parameter param, a basis $B_0$ and a basis $B^*_0$, and a basis $B_1$ (basis B) and a basis $B^*_1$ (basis $B^*$).

[Formula 125]

$$\text{input } 1^\lambda \quad (1)$$

$$param_\mathbb{G} := (q, \mathbb{G}, \mathbb{G}_T, g, e) \xleftarrow{R} \mathcal{G}_{bpg}(1^\lambda) \quad (2)$$

$$\psi \xleftarrow{U} \mathbb{F}_q^\times, \quad (3)$$
$$N_0 := 1 + u_0 + 1 + w_0 + z_0, \, N_1 := 2 + n + u + w + z$$
The process (4) through (8) is executed for each $t = 0, 1$.

$$param_{\mathbb{V}_t} := (q, \mathbb{V}_t, \mathbb{G}_T, \mathbb{A}_t, e) := \mathcal{G}_{dpvs}(1^\lambda, N_t, param_\mathbb{G}) \quad (4)$$

$$X_t := (\chi_{t,i,j})_{i,j=1,\cdots,N_t} \xleftarrow{U} GL(N_t, \mathbb{F}_q) \quad (5)$$

$$X_t^* := (\vartheta_{t,i,j})_{i,j=1,\cdots,N_t} := \psi \cdot (X_t^T)^{-1} \quad (6)$$

$$b_{t,i} := (\vec{\chi}_{t,i})_{\mathbb{A}_t} = \sum_{j=1}^{N_t} \chi_{t,i,j} a_{t,j} \text{ for } i = 1, \cdots, N_t, \quad (7)$$
$$\mathbb{B}_t := (b_{t,1}, \cdots, b_{t,N_t})$$

$$b_{t,i}^* := (\vec{\vartheta}_{t,i})_{\mathbb{A}_t} = (\sum_{j=1}^{N_t} \vartheta_{t,i,j} a_{t,j} \text{ for } i = 1, \cdots, N_t, \quad (8)$$
$$\mathbb{B}_t^* := (b_{t,1}^*, \cdots, b_{t,N_t}^*)$$

$$g_T := e(g, g)^\psi, \, param := (\{param_{\mathbb{V}_t}\}_{t=0,1}, g_T) \quad (9)$$

That is, the master key generation unit 110 executes the following process.

(1) Using the input device, the master key generation unit 110 takes as input a security parameter $\lambda(1^\lambda)$.

(2) Using the processing device, the master key generation unit 110 executes the algorithm $G_{bpg}$ taking as input the security parameter $\lambda$ ($1^\lambda$) inputted in (1), and thus generates values of a parameter $param_G:=(q, G, G_T, g, e)$ of bilinear pairing groups.

(3) Using the processing device, the master key generation unit 110 generates a random number w, and sets $1+u_0+1+w_0+z_0$ in $N_0$ and $2+n+u+w+z$ in $N_1$, where n is an integer of 1 or more and $u_0$, $w_0$, $z_0$, u, w, and z are integers of 0 or more.

Then, the master key generation unit 110 executes the following process (4) through (8) for each t=0, 1.

(4) Using the processing device, the master key generation unit 110 executes the algorithm $G_{dpvs}$ taking as input the security parameter $\lambda$ ($1^\lambda$) inputted in (1), $N_t$ set in (3), and the values of $param_G:=(q, G, G_T, g, e)$ generated in (2), and thus generates values of a parameter $param_{V_t}:=(q, V_t, G_T, A_t, e)$ of dual pairing vector spaces.

(5) Using the processing device, the master key generation unit 110 takes as input $N_t$ set in (3) and $F_q$, and randomly generates a linear transformation $X_t:=(\chi_{t,i,j})_{i,j}$. Note that GL stands for general linear. In other words, GL is a general linear group, a set of square matrices with nonzero determinants, and a group under multiplication. Note that $(\chi_{t,i,j})_{i,j}$ denotes a matrix concerning the suffixes i and j of the matrix $\chi_{t,i,j}$, where $i, j=1, \ldots, N_t$.

(6) Using the processing device and based on the random number $\psi$ and the linear transformation $X_t$, the master key generation unit 110 generates $(v_{t,i,j})_{i,j}:=\psi\cdot(X_t^T)^{-1}$. Like $(\chi_{t,i,j})_{i,j}$, $(v_{t,i,j})_{i,j}$ denotes a matrix concerning the suffixes i and j of the matrix $v_{t,i,j}$, where $i, j=1, \ldots, N_t$.

(7) Using the processing device and based on the linear transformation $X_t$ generated in (5), the master key generation unit 110 generates a basis $B_t$ from the orthonormal basis $A_t$ generated in (4). Note that $x_{t,i}$ indicates the i-th row of the linear transformation $X_t$.

(8) Using the processing device and based on $(v_{t,i,j})_{i,j}$ generated in (6), the master key generation unit 110 generates a basis $B^*_t$ from the orthonormal basis $A_t$ generated in (4). Note that $v_{t,i}$ indicates the i-th row of the linear transformation $X^*_t$.

(9) Using the processing device, the master key generation unit 110 sets $e(g, g)^\psi$ in $g_T$. The master key generation unit 110 also sets $\{param_{V_t}\}_{t=0,1}$ generated in (4) and $g_T$ in param.

In brief, in (S101), the master key generation unit 110 executes an algorithm $G_{ob}$ indicated in Formula 126, and thus generates param, the basis $B_0$ and the basis $B^*_0$, and the basis $B_1$ (basis B) and the basis $B^*_1$ (basis $B^*$).

[Formula 126]

$$\mathcal{G}_{ob}(1^\lambda): param_\mathbb{G} := (q, \mathbb{G}, \mathbb{G}_T, g, e) \xleftarrow{R} \mathcal{G}_{bpg}(1^\lambda),$$

$$\psi \xleftarrow{U} \mathbb{F}_q^\times, \, N_0 := 1 + u_0 + 1 + w_0 + z_0,$$

$$N_1 := 2 + n + u + w + z, \text{ for } t = 0, 1,$$

$$param_{\mathbb{V}_t} : (q, \mathbb{V}_t, \mathbb{G}_T, \mathbb{A}_t, e) : \mathcal{G}_{dpvs}(1^\lambda, N_t, param_\mathbb{G}),$$

$$X_t := (\chi_{t,i,j})_{i,j=1,\cdots,N_t} \xleftarrow{U} GL(N_t, \mathbb{F}_q)$$

$$X_t^* := (\vartheta_{t,i,j})_{i,j=1,\cdots,N_t} := \psi \cdot (X_t^T)^{-1}, \text{ hereafter}$$

$\vec{\chi}_{t,i}$ and $\vec{\vartheta}_{t,i}$ denote the i-th rows of $X_t$ and $X_t^*$ for $i = 1, \cdots, N_t$, respectively, $$b_{t,i} := (\vec{\chi}_{t,i})_{\mathbb{A}_t} = \sum_{j=1}^{N_t} \chi_{t,i,j} a_{t,j} \text{ for } i = 1, \cdots, N_t$$

$$\mathbb{B}_t := (b_{t,1}, \cdots, b_{t,N_t}), b_{t,i}^* := (\vec{\vartheta}_{t,i})_{\mathbb{A}_t} = \sum_{j=1}^{N_t} \vartheta_{t,i,j} a_{t,j}$$

for $i = 1, \cdots, N_t$, $B_t^* := (b_{t,1}^*, \cdots, b_{t,N_t}^*)$, $g_T := e(g,g)^\psi$, $param := (\{param_{\mathbb{V}_t}\}_{t=0,1}, g_T)$, return $(param, \mathbb{B}_t, \mathbb{B}_t^*)$.

In the following description, for simplicity, the basis $B_1$ and the basis $B^*_1$ will be described as the basis B and the basis $B^*$.

(S102: Public Parameter Generation Step)

Using the processing device, the master key generation unit 110 generates a subbasis $\hat{B}_0$ of the basis $B_0$ and a subbasis $\hat{B}$ of the basis B, as indicated in Formula 127, the bases $B_0$ and B having been generated in (S101).

$$\hat{\mathbb{B}}_0 := (b_{0,1}, b_{0,1+u_0+1}, b_{0,1+u_0+1+w_0+1}, \ldots, b_{0,1+u_0+1+w_0+z_0}),$$

$$\hat{\mathbb{B}} := (b_1, \ldots, b_{2+n}, b_{2+n+u+w+1}, \ldots, b_{2+n+u+w+z}) \quad \text{[Formula 127]}$$

The master key generation unit 110 generates a public parameter pk by putting together the generated subbasis B̂$_0$ and subbasis B̂, the security parameter λ(1$^λ$) inputted in (S101), and param generated in (S101).

(S103: Master Key Generation Step)

Using the processing device, the master key generation unit 110 generates a subbasis B̂*$_0$ of the basis B*$_0$ and a subspace B̂* of the basis B*, as indicated in Formula 128, the bases B*$_0$ and B̂* having been generated in (S101).

$$\hat{\mathbb{B}}^*_0 := (b^*_{0,1}, b^*_{0,1+u_0+1}, b^*_{0,1+u_0+1+1}, \ldots, b^*_{0,1+u_0+1+w_0}),$$

$$\hat{\mathbb{B}}^* := (b^*_1, \ldots, b^*_{2+n}, b^*_{2+n+u+1}, \ldots, b^*_{2+n+u+w}) \quad \text{[Formula 128]}$$

The master key generation unit 110 generates a master key sk which is constituted by the generated subbasis B̂*$_0$ and subbasis B̂*.

(S104: Master Key Storage Step)

The master key storage unit 120 stores the parameter pk generated in (S102) in the storage device. The master key storage unit 120 also stores the master key sk generated in (S103) in the storage device.

In brief, in (S101) through (S103), the key generation device 100 executes the Setup algorithm indicated in Formula 129, and thus generates the public parameter pk and the master key sk. In (S104), the key generation device 100 stores the generated public parameter pk and master key sk in the storage device.

The public parameter is published, for example, via the network, and is made available for the encryption device 200 and the decryption device 300.

Setup(1$^λ$): [Formula 129]

$$(param, (\mathbb{B}_0, \mathbb{B}^*_0), (\mathbb{B}, \mathbb{B}^*)) \xleftarrow{R} \mathcal{G}_{ob}(1^\lambda),$$

$$\hat{\mathbb{B}}_0 := (b_{0,1}, b_{0,1+u_0+1}, b_{0,1+u_0+1+w_0+1}, \ldots, b_{0,1+u_0+1+w_0+z_0}),$$

$$\hat{\mathbb{B}} := (b_1, \ldots, b_{2+n}, b_{2+n+u+w+1}, \ldots, b_{2+n+u+w+z}),$$

$$\hat{\mathbb{B}}^*_0 := (b^*_{0,1}, b_{0,1+u_0+1}, b_{0,1+u_0+1+1}, \ldots, b_{0,1+u_0+1+w_0}),$$

$$\hat{\mathbb{B}}^* := (b^*_1, \ldots, b^*_{2+n}, b_{2+n+u+1}, \ldots, b^*_{2+n+u+w}),$$

$$\text{return } pk := (1^\lambda, param, \hat{\mathbb{B}}_0, \hat{\mathbb{B}}), sk := (\hat{\mathbb{B}}^*_0, \hat{\mathbb{B}}^*).$$

With reference to FIG. 10, the process of the KeyGen algorithm will be described.

(S201: Information Input Step)

Using the input device, the information input unit 130 takes as input the above-described access structure S:=(M, ρ). Note that the matrix M of the access structure S is to be set according to the conditions of a system to be implemented. Note also that attribute information of the user of a decryption key sk$_S$ is set in ρ of the access structure S, for example.

(S202: f Vector Generation Step)

Using the processing device, the f vector generation unit 141 randomly generates a vector $\vec{f}$ having r pieces of elements, as indicated in Formula 130.

$$\vec{f} \xleftarrow{U} \mathbb{F}_q^r \quad \text{[Formula 130]}$$

(S203: s Vector Generation Step)

Using the processing device and based on the (L rows×r columns) matrix M included in the access structure S inputted in (S201) and the vector $\vec{f}$ generated in (S202), the s vector generation unit 142 generates a vector $\vec{s}^T:=(s_1, \ldots, s_L)^T$, as indicated in Formula 131.

$$\vec{s}^T := (s_1, \ldots, s_L)^T := M \cdot \vec{f}^T \quad \text{[Formula 131]}$$

Using the processing device and based on the vector $\vec{f}$ generated in (S202), the s vector generation unit 142 also generates a value s$_0$, as indicated in Formula 132.

$$s_0 := \vec{1} \cdot \vec{f}^T \quad \text{[Formula 132]}$$

(S204: Random Number Generation Step)

Using the processing device, the random number generation unit 143 generates random numbers, as indicated in Formula 133.

$$\vec{\eta}_0 := (\eta_{0,1}, \ldots, \eta_{0,w_0}) \xleftarrow{U} \mathbb{F}_q^{w_0}, \quad \text{[Formula 133]}$$

$$\mu_i, \theta_i \xleftarrow{U} \mathbb{F}_q,$$

$$\vec{\eta}_i := (\eta_{i,1}, \ldots, \eta_{i,w}) \xleftarrow{U} \mathbb{F}_q^w \text{ for } i = 1, \ldots, L$$

(S205: Key Element Generation Step)

Using the processing device, the key element generation unit 144 generates an element k*$_0$ of the decryption key sk$_S$, as indicated in Formula 134.

$$k_0^* := (-s_0, \overbrace{0^{u_0}}^{u_0}, 1, \overbrace{\vec{\eta}_0}^{w_0}, \overbrace{0^{z_0}}^{z_0})_{\mathbb{B}_0^*} \quad \text{[Formula 134]}$$

As described above, for the basis B and the basis B* indicated in Formula 113, Formula 114 is established. Thus, Formula 134 means that $-s_0$ is set as the coefficient of a basis vector b*$_{0,1}$ of the basis B*$_0$, 0 is set as the coefficient of basis vectors b*$_{0,1+1}, \ldots,$ b*$_{0,1+u}$, 1 is set as the coefficient of a basis vector b*$_{0,1+u0+1}$, $\eta_{0,1}, \ldots, \eta_{0,w0}$ are respectively set as the coefficient of basis vectors b*$_{0,1+u0+1+1}, \ldots,$ b$_{0,1+u0+1+w0}$, and 0 is set as the coefficient of basis vectors b*$_{0,1+u0+1+w0+1}, \ldots,$ b*$_{0,1+u0+1+w0+z0}$, where u0, w0, and z0 respectively denote u$_0$, w$_0$, and z$_0$.

Using the processing device, the key element generation unit 144 also generates an element k*$_i$ of the decryption key sk$_S$ for each integer i=1, . . . , L, as indicated in Formula 135.

for $i = 1, \ldots, L,$ [Formula 135]

if $\rho(i) = (t, \vec{v}_i),$ $$k_i^* := (\overbrace{u_i(t, -1,), s_i \vec{e}_1 + \theta_i \vec{v}_i}^{2+n}, \overbrace{0^u}^{u}, \overbrace{\vec{\eta}_i}^{w}, \overbrace{0^z}^{z})_{\mathbb{B}^*},$$

if $\rho(i) = \neg(t, \vec{v}_i),$ $$k_i^* := (\overbrace{u_i(t, -1,), s_i \vec{v}_i}^{2+n}, \overbrace{0^u}^{u}, \overbrace{\vec{\eta}_i}^{w}, \overbrace{0^z}^{z})_{\mathbb{B}^*}$$

That is, like Formula 134, the meaning of Formula 135 is as explained below. When ρ(i) is a positive set (t, v$_i$), pit is set as the coefficient of a basis vector b*$_1$ of the basis B*, −μ$_i$ is set as the coefficient of a basis vector $b^*_2$, $s_i+\theta_i v_{i,1}$ is set as the coefficient of a basis vector $b^*_{2+1}$, $\theta_i v_{i,2}, \ldots, \theta_i v_{i,n}$ are respectively set as the coefficient of basis vectors $b^*_{2+2}, \ldots, b^*_{2+n}$, 0 is set as the coefficient of basis vectors $b^*_{2+n+1}, \ldots, b^*_{2+n+u}$, $\eta_{i,1}, \ldots, \eta_{i,w}$ are respectively set as the coefficient of basis vectors $b^*_{2+n+u+1}, \ldots, b^*_{2+n+u+w}$, and 0 is set as the coefficient of basis vectors $b^*_{2+n+u+w+1}, \ldots, b^*_{2+n+u+w+z}$.

On the other hand, when $\rho(i)$ is a negative set $\neg(t, v_i)$, it is set as the coefficient of the basis vector $b^*_1$ of the basis $B^*$, $-\mu_i$ is set as the coefficient of the basis vector $b^*_2$, $s_i v_{i,1}, \ldots, s_i v_{i,n}$ are respectively set as the coefficient of the basis vectors $b^*_{2+1}, \ldots, b^*_{2+n}$, 0 is set as the coefficient of the basis vectors $b^*_{2+n+1}, \ldots, b^*_{2+n+u}$, $\eta_{i,1}, \ldots, \eta_{i,w}$ are respectively set as the coefficient of the basis vectors $b^*_{2+n+u+1}, \ldots, b^*_{2+n+u+w}$, and 0 is set as the coefficient of the basis vectors $b^*_{2+n+u+w+1}, \ldots, b^*_{2+n+u+w+z}$.

(S206: Key Distribution Step)

Using the communication device and via the network, for example, the key distribution unit 150 distributes the decryption key $sk_S$ having, as elements, the access structure S inputted in (S201) and $k^*_0, k^*_1, \ldots$, and $k^*_L$ generated in (S205) to the decryption device 300 in secrecy. As a matter of course, the decryption key $sk_S$ may be distributed to the decryption device 300 by another method.

In brief, in (S201) through (S205), the key generation device 100 executes the KeyGen algorithm indicated in Formula 136, and thus generates the decryption key $sk_S$. In (S206), the key generation device 100 distributes the generated decryption key $sk_S$ to the decryption device 300.

$$KeyGen(pk, sk, \mathbb{S} := (M, \rho)):$$ [Formula 136]

$$\vec{f} \xleftarrow{U} \mathbb{F}_q^r,$$

$$s_0 := \vec{1} \cdot \vec{f}^T, \vec{s}^T := (s_1, \ldots, s_L)^T := M \cdot \vec{f}^T,$$

$$\vec{\eta}_0 \xleftarrow{U} \mathbb{F}_q^{w_0},$$

$$k_0^* := (-s_0, \overset{u_0}{0^{u_0}}, 1, \overset{w_0}{\vec{\eta}_0}, \overset{z_0}{0^{z_0}},)_{\mathbb{B}_0^*},$$

for $i = 1, \ldots, L, \mu_i, \theta_i \xleftarrow{U} \mathbb{F}_q, \vec{\eta}_i \xleftarrow{U} \mathbb{F}_q^w,$ if $\rho(i) = (t, \vec{v}_i),$ $$k_i^* := (\overset{2+n}{u_i(t, -1,), s_i\vec{e}_1 + \theta_i\vec{v}_i}, \overset{u}{0^u}, \overset{w}{\vec{\eta}_i}, \overset{z}{0^z})_{\mathbb{B}^*},$$

if $\rho(i) = \neg(t, \vec{v}_i),$ $$k_i^* := (\overset{2+n}{u_i(t, -1,), s_i\vec{v}_i}, \overset{u}{0^u}, \overset{w}{\vec{\eta}_i}, \overset{z}{0^z})_{\mathbb{B}^*},$$

return $sk_{\mathbb{S}} := (\mathbb{S}, k_0^*, k_1^*, \ldots, k_L^*).$

The function and operation of the encryption device 200 will be described.

The encryption device 200 includes a public parameter acquisition unit 210, an information input unit 220, a cipher data generation unit 230, and a data transmission unit 240. The cipher data generation unit 230 includes a random number generation unit 231 and a cipher element generation unit 232.

With reference to FIG. 11, the process of the Enc algorithm will be described.

(S301: Public Parameter Acquisition Step)

Using the communication device and via the network, for example, the public parameter acquisition unit 210 obtains the public parameter pk generated by the key generation device 100.

(S302: Information Input Step)

Using the input device, the information input unit 220 takes as input a message m to be transmitted to the decryption device 300. Using the input device, the information input unit 220 also takes as input an attribute set $\Gamma := \{(t, x_t := (x_{t,1}, \ldots, x_{t,n} \in \mathbb{F}q''))|1 \le t \le d\}$. Note that t may be at least some integers from 1 to d, instead of being all of integers from 1 to d. Note that information on the attributes of the user capable of decryption is set in the attribute set $\Gamma$, for example.

(S303: Random Number Generation Step)

Using the processing device, the random number generation unit 231 generates random numbers, as indicated in Formula 137.

$$\omega, \zeta \xleftarrow{U} \mathbb{F}_q, \vec{\varphi}_0 := (\varphi_{0,1}, \ldots, \varphi_{0,z_0}) \xleftarrow{U} \mathbb{F}_q^{z_0},$$ [Formula 137]

$$\sigma_t \xleftarrow{U} \mathbb{F}_q,$$

$$\vec{\varphi}_0 := (\varphi_{t,1}, \ldots, \varphi_{t,z}) \xleftarrow{U} \mathbb{F}_q^z \text{ for } (t, \vec{x}_t) \in \Gamma$$

(S304: Cipher Element Generation Step)

Using the processing device, the cipher element generation unit 232 generates an element $c_0$ of a ciphertext $ct_\Gamma$, as indicated in Formula 138.

$$c_0 := (\omega, \overset{u_0}{0^{u_0}}, \zeta, \overset{w_0}{0^{w_0}}, \overset{z_0}{\vec{\varphi}_0})_{\mathbb{B}_0}$$ [Formula 138]

Using the processing device, the cipher element generation unit 232 also generates an element $c_t$ of the ciphertext $ct_\Gamma$ for each integer t included in the attribute information $\Gamma$, as indicated in Formula 139.

$$c_t := (\overset{2+n}{\sigma_t(1, t), \omega\vec{x}_t}, \overset{u_0}{0^u}, \overset{w_0}{0^w}, \overset{z_0}{\vec{\varphi}_t})_{\mathbb{B}}$$ [Formula 139]

Using the processing device, the cipher element generation unit 232 also generates an element $c_{d+1}$ of the ciphertext $ct_\Gamma$, as indicated in Formula 140.

$$c_{d+1} := g_T^\zeta m$$ [Formula 140]

(S305: Data Transmission Step)

Using the communication device and via the network, for example, the data transmission unit 240 transmits the ciphertext $ct_\Gamma$ having, as elements, the attribute set $\Gamma$ inputted in (S302) and $c_0, c_t$, and $c_{d+1}$ generated in (S304) to the decryption device 300. As a matter of course, the ciphertext $ct_\Gamma$ may be transmitted to the decryption device 300 by another method.

In brief, in (S301) through (S304), the encryption device 200 executes the Enc algorithm indicated in Formula 141, and thus generates the ciphertext $ct_\Gamma$. In (S305), the encryption device 200 transmits the generated ciphertext $ct_\Gamma$ to the decryption device 300.

[Formula 141]

$$Enc(pk, m, \Gamma := \{(t, x_t := (x_{t,1}, \ldots, x_{t,n}) \in \mathbb{F}_q^n \setminus \{0\} \mid 1 \leq t \leq d)\}):$$

$$\omega, \zeta \xleftarrow{U} \mathbb{F}_q, \vec{\varphi}_0 \xleftarrow{U} \mathbb{F}_q^{z_0},$$

$$c_0 := (\omega, \overbrace{0^{u_0}}^{u_0}, \zeta, \overbrace{0^{w_0}}^{w_0}, \overbrace{\vec{\varphi}_0}^{z_0})_{\mathbb{B}_0}, \quad c_{d+1} := g_T^\zeta m,$$

$$\text{for}(t, \vec{x}_t) \in \Gamma, \sigma_t \xleftarrow{U} \mathbb{F}_q, \vec{\varphi}_t \xleftarrow{U} \mathbb{F}_q^z,$$

$$c_t := (\overbrace{\sigma_t(1, t), \omega\vec{x}_t}^{2+n}, \overbrace{0^u}^{u_0}, \overbrace{0^w}^{w_0}, \overbrace{\vec{\varphi}_t}^{z_0})_{\mathbb{B}_t},$$

$$\text{return } ct_\Gamma := (\Gamma, c_0, \{c_t\}_{(t,\vec{x}_t)\in\Gamma}, c_{d+1}).$$

The function and operation of the decryption device 300 will be described.

The decryption device 300 includes a decryption key acquisition unit 310, a data receiving unit 320, a span program computation unit 330, a complementary coefficient computation unit 340, a pairing operation unit 350, and a message computation unit 360.

With reference to FIG. 12, the process of the Dec algorithm will be described.

(S401: Decryption Key Acquisition Step)

Using the communication device and via the network, for example, the decryption key acquisition unit 310 obtains the decryption key $sk_S := (S, k_0^*, k_1^*, \ldots, k_L^*)$ distributed by the key generation device 100. The decryption key acquisition unit 310 also obtains the public parameter pk generated by the key generation device 100.

(S402: Data Reception Step)

Using the communication device and via the network, for example, the data receiving unit 320 receives the ciphertext $ct_\Gamma$ transmitted by the encryption device 200.

(S403: Span Program Computation Step)

Using the processing device, the span program computation unit 330 checks whether or not the access structure S included in the decryption key $sk_S$ obtained in (S401) accepts $\Gamma$ included in the ciphertext $ct_\Gamma$ received in (S402). The method for checking whether or not the access structure S accepts $\Gamma$ is the same as that described in "5. Concept for implementing functional encryption in Embodiment 1".

If the access structure S accepts $\Gamma$ (accept in S403), the span program computation unit 330 advances the process to (S404). If the access structure S rejects $\Gamma$ (reject in S403), the span program computation unit 330 determines that the ciphertext $ct_\Gamma$ cannot be decrypted with the decryption key $sk_S$, and ends the process.

(S404: Complementary Coefficient Computation Step)

Using the processing device, the complementary coefficient computation unit 340 computes I and a constant (complementary coefficient) $\{\alpha_i\}_{i \in I}$ such that Formula 142 is satisfied.

$$\vec{1} = \sum_{i \in I} \alpha_i M_i, \text{ where } M_i \text{ is the } i\text{-th row of } M,$$

$$\text{and } I \subseteq \{i \in \{1, \ldots, L\} \mid [\rho(i)=(t, \vec{v}_i) \wedge (t, \vec{x}_t) \in \Gamma \wedge \vec{v}_i \cdot \vec{x}_t = 0]$$

$$\vee [\rho(i)=\neg(t, \vec{v}_i) \wedge (t, \vec{x}_t) \in \Gamma \wedge \vec{v}_i \cdot \vec{x}_t \neq 0]\} \quad \text{[Formula 142]}$$

(S405: Pairing Operation Step)

Using the processing device, the pairing operation unit 350 computes Formula 143, and thus generates a session key $K = g_T^\zeta$.

$$K := e(c_0, k_0^*) \quad \text{[Formula 143]}$$

$$\sum_{i \in I \wedge \rho(i)=(t,\vec{v}_i)} e(c_t, k_i^*)\alpha_i \prod_{i \in I \wedge \rho(i)=\neg(t,\vec{v}_i)} e(c_t, k_i^*)\alpha_i / (\vec{v}_i \cdot \vec{x}_t)$$

As indicated in Formula 144, the key $K = g_T^\zeta$ can be obtained by computing Formula 143.

$$e(c_0, k_0^*) \cdot \prod_{i \in I \wedge \rho(i)=(t,\vec{v}_i)} e(c_t, k_i^*) \quad \text{[Formula 144]}$$

$$\alpha_i \cdot \prod_{i \in I \wedge \rho(i)=\neg(t,\vec{v}_i)} e(c_t, k_i^*)\alpha_i / (\vec{v}_i \cdot \vec{x}_i) =$$

$$g_T^{-\omega s_0 + \zeta} \prod_{i \in I \wedge \rho(i)=(t,\vec{v}_i)} g_T^{\omega \alpha_i s_i} \prod_{i \in I \wedge \rho(i)=\neg(t,\vec{v}_i)} g_T^{\omega \alpha_i s_i (\vec{v}_i \cdot \vec{x}_i)/(\vec{v}_i \cdot \vec{x}_i)} =$$

$$g_T^{\omega(-s_0 + \sum_{i \in I} \alpha_i s_i) + \zeta} + g_T^\zeta.$$

(S406: Message Computation Step)

Using the processing device, the message computation unit 360 computes $m' = c_{d+1}/K$, and thus generates a message m' (=m). Note that $c_{d+1}$ is $g_T^\zeta m$, as indicated in Formula 142, and that K is $g_T^\zeta$. Hence, the message m can be obtained by computing $m' = c_{d+1}/K$.

In brief, in (S401) through (S406), the decryption device 300 executes the Dec algorithm indicated in Formula 145, and thus generates the message m' (=m).

$$Dec(pk, sk_S := (\mathbb{S}, k_1^*, \ldots, k_L^*), \quad \text{[Formula 145]}$$

$$ct_\Gamma := (\Gamma, \{c_t\}_{\vec{x}_t \in \Gamma}, c_{d+1})):$$

If $\mathbb{S} := (M, \rho)$ accepts $\Gamma := \{(t, \vec{x}_t)\}$, then compute I and $\{\alpha_i\}_{i \in I}$ such that $$\vec{1} = \sum_{i \in I} \alpha_i M_i,$$

where $M_i$ is the $i$-th row of $M$, and $I \subseteq \{i \in \{1, \ldots, L\}$ $\mid [\rho(i) = (t, \vec{v}_i) \wedge (t, \vec{x}_t) \in \Gamma \wedge \vec{v}_i \cdot \vec{x}_t = 0] \vee [\rho(i) =$ $\neg (t, \vec{v}_i) \wedge (t, \vec{x}_t) \in \Gamma \wedge \vec{v}_i \cdot \vec{x}_t \neq 0]\}$ $$K := e(c_0, k_0^*) \sum_{i \in I \wedge \rho(i)=(t,\vec{v}_i)} e(c_t, k_i^*)\alpha_i$$

$$\prod_{i \in I \wedge \rho(i)=\neg(t,\vec{v}_i)} e(c_t, k_i^*)\alpha_i / (\vec{v}_i \cdot \vec{x}_t),$$

return $m' := c_{d+1}/K$.

As described above, in the cryptographic system 10 according to Embodiment 2, $\mu_t t$ and $-\mu_t$ are respectively set as the coefficient of the basis vectors $b_1^*$ and $b_2^*$ for the element $k_i^*$ of the decryption key $sk_S$. In the cryptographic system 10, $\sigma_t$ and $\sigma_t t$ are respectively set as the coefficient of the basis vectors $b_1$ and $b_2$ for the element $c_t$ of the ciphertext $ct_\Gamma$.

Because of these arrangements, when a pairing operation is performed on the element $k^*_i$ and the element $c_t$ for the corresponding index t, an inner-product of 0 is obtained for portions constituted by the basis vectors $b^*_1$ and $b^*_2$ and the basis vectors $b_1$ and $b_2$, which are thus canceled out. That is, when a pairing operation is performed on the element $k^*_i$ and the element $c_t$ for the corresponding index t, the index parts that are set as the coefficients of the basis vectors (portions constituted by the basis vectors $b^*_1$ and $b^*_2$ and the basis vectors $b_1$ and $b_2$) are canceled out, and a result of the pairing operation for the remaining portions can be obtained.

In the cryptographic system 10 according to Embodiment 2, the index parts are provided, so that the bases that are used for every attribute category can be constructed as the common bases (basis B and basis B*). As a result, only the basis B and the basis B* need to be included in a public parameter, eliminating the need for reissuing the public parameter when an attribute category is to be added at a later stage.

In the cryptographic system 10 according to Embodiment 2, the public parameter and the master secret key are of smaller sizes compared with those in the functional encryption scheme described in Non-Patent Literature 29. Therefore, calculations using the public parameter and the master secret key can be performed efficiently.

For the index parts, it is required that 0 be obtained as a result of an inner-product operation of the index parts. Therefore, although the 2-dimensional index parts, namely the basis vectors $b^*_1$ and $b^*_2$ and the basis vectors $b_1$ and $b_2$, are employed in the above description, the index parts are not limited to 2-dimensional and may be 3-dimensional or higher-dimensional. The values assigned to the index parts are not limited to those described above, and a different assignment arrangement may be employed.

The functional encryption scheme has been described above. As indicated in Formula 146 through Formula 149, however, the functional encryption scheme described above can be modified into an attribute-based encryption scheme. Note that $N_0$ is 1+1+1+1+1=5 and $N_1$ is 2+2+8+2+2=16 in Formula 146 through Formula 149. That is, $u_0=1, w_0=1, z_0=1, n=2, u=8, w=2,$ and $z=2$. Even in this case, security can be proven.

[Formula 146]

$$\text{Setup}(1^\lambda):$$

$$(param, (\hat{\mathbb{B}}_0, \hat{\mathbb{B}}^*_0), (\hat{\mathbb{B}}, \hat{\mathbb{B}}^*)) \xleftarrow{R} \mathcal{G}_{ob}(1^\lambda), \; /\!*N = 16 *\!/$$

$$\hat{\mathbb{B}}_0 := (b_{0,1}, b_{0,3}, b_{0,5}), \hat{\mathbb{B}} := (b_1, \ldots, b_4, b_{15}, b_{16}),$$

$$\hat{\mathbb{B}}^*_0 := (b_{0,1}, b_{0,3}, b_{0,4}), \hat{\mathbb{B}}^* := (b^*_1, \ldots, b^*_{4}, b^*_{13}, b^*_{14}),$$

return $pk := (1^\lambda, param, \hat{\mathbb{B}}_0, \hat{\mathbb{B}}), sk := (\hat{\mathbb{B}}^*_0, \hat{\mathbb{B}}^*)$.

$$\mathcal{G}_{ob}(1^\lambda):$$

$$param_{\mathbb{G}} := (q, \mathbb{G}, \mathbb{G}_T, g, e) \xleftarrow{R} \mathcal{G}_{bpg}(1^\lambda),$$

$$\psi \xleftarrow{U} \mathbb{F}^x_q,$$

$$N_0 := 5, N_1 := 16,$$

for $t = 0, 1,$ $$param_{\mathbb{V}_t} := (q, \mathbb{V}_t, \mathbb{G}_T, \mathbb{A}_t, e) := \mathcal{G}_{dpvs}(1^\lambda, N_t, param_{\mathbb{G}}),$$

$$X_t := (\chi_{t,i,j})_{i,j=1,\ldots,N_t} \xleftarrow{U} GL(N_t, \mathbb{F}_q),$$

-continued $$X^*_t := (\vartheta_{t,i,j})_{i,j=1,\ldots,N_t} := \psi \cdot (X^T_t)^{-1},$$

hereafter, $\vec{\chi}_{t,i}$ and $\vec{\vartheta}_{t,i}$ denote the i-th rows of $X_t$ and $X^*_t$ for $i = 1, \ldots, N_t$, respectively, $$b_{t,i} := (\vec{\chi}_{t,i})_{\mathbb{A}_t} = \sum_{j=1}^{N_t} \chi_{t,i,j} a_{t,j} \text{ for } i = 1, \ldots, N_t,$$

$$\mathbb{B}_t := (b_{t,1}, \ldots, b_{t,N_t}),$$

$$b^*_{t,i} := (\vec{\vartheta}_{t,i})_{\mathbb{A}_t} = \sum_{j=1}^{N_t} \vartheta_{t,i,j} a_{t,j} \text{ for } i = 1, \ldots, N_t,$$

$$\mathbb{B}^*_t := (b^*_{t,1}, \ldots, b^*_{t,N_t}),$$

$$g_T := e(g,g)^\psi, param := (\{param_{\mathbb{V}_t}\}_{t=0,1}, g_T),$$

return($param, \mathbb{B}, \mathbb{B}^*$).

[Formula 147]

$$KeyGen(pk, sk, \mathbb{S} := (M, \rho)):$$

$$\vec{f} \xleftarrow{U} \mathbb{F}^r_q, s_0 := \vec{1} \cdot \vec{f}^T, \vec{s}^T := (s_1, \ldots, s_L)^T := M \cdot \vec{f}^T,$$

$$\eta_0 \xleftarrow{U} \mathbb{F}_q, k^*_0 := (-s_0, 0, 1, \eta_0, 0)_{\mathbb{B}^*_0}, \text{ for } i = 1, \ldots, L,$$

$$\mu_i, \theta_i, \eta_{i,1}, \eta_{i,2} \xleftarrow{U} \mathbb{F}_q,$$

if $\rho(i) = (t, v_i),$ $$k^*_i := (\overbrace{\mu_i(t, -1,)}^{4}, \overbrace{s_i + \theta_i v_i - \theta_i}^{}, \overbrace{0^8}^{8}, \overbrace{\eta_{i,1}, \eta_{i,2}}^{2}, \overbrace{0^2}^{2})_{\mathbb{B}^*},$$

if $\rho(i) = \neg(t, v_i),$ $$k^*_i := (\overbrace{\mu_i(t, -1,)}^{4}, \overbrace{s_i(v_i, -1)}^{}, \overbrace{0^8}^{8}, \overbrace{\eta_{i,1}, \eta_{i,2}}^{2}, \overbrace{0^2}^{2})_{\mathbb{B}^*},$$

return $sk_{\mathbb{S}} := (\mathbb{S}, k^*_0, k^*_1, \ldots, k^*_L).$

[Formula 148]

$$Enc(pk, m, \Gamma := \{(t, x_t) \mid 1 \leq t \leq d\}):$$

$$\omega, \zeta, \varphi_0 \xleftarrow{U} \mathbb{F}_q, c_0 := (\omega, 0, \zeta, 0, \varphi_0)_{\mathbb{B}_0}, c_{d+1} := g^\zeta_T m,$$

for $(t, x_t) \in \Gamma, \sigma_t, \varphi_{t,1}, \varphi_{t,2} \xleftarrow{U} \mathbb{F}_q,$ $$c_t := (\overbrace{\sigma_i(1,t)}^{4}, \overbrace{\omega(1, x_t)}^{}, \overbrace{0^8}^{8}, \overbrace{0^2}^{2}, \overbrace{\varphi_{t,1}, \varphi_{t,2}}^{2})_{\mathbb{B}},$$

return $ct_\Gamma := (\Gamma, c_0, \{c_t\}_{(t,x_t) \in \Gamma}, c_{d+1}).$

[Formula 149]

$$Dec(pk, sk_{\mathbb{S}} := (\mathbb{S}, k^*_1, \ldots, k^*_L),$$

$$ct_\Gamma := (\Gamma, \{c_t\}_{x_t \in \Gamma}, c_{d+1})):$$

If $\mathbb{S} := (M, \rho)$ accepts $\Gamma := \{(t, x_t)\},$ then compute $I$ and $\{\alpha_i\}_{i \in I}$ such that $\vec{1} = \sum_{i \in I} \alpha_i M_i,$ where $M_i$ is the i-th row of $M$, and $$I \subseteq \Big\{ i \in \{1, \ldots, L\} \mid [\rho(i) = (t, v_i) \land (t, x_t) \in \Gamma] \lor [\rho(i) =$$

$$\neg(t, v_i) \land (t, x_t) \in \Gamma \land v_i \neq x_t] \Big\},$$

-continued $$K := e(c_0, k_0^*) \cdot \prod_{i \in I \wedge \rho(i)=(t,v_i)} e(c_t, k_t^*)^{\alpha_i} \prod_{i \in I \wedge \rho(i)=\neg(t,v_i)} e(c_t, k_t^*)^{\alpha_i/(v_i \cdot x_i)},$$

$$\text{return } m' := c_{d+1}/K.$$

Embodiment 3

Like Embodiment 2, this embodiment describes a narrowly-defined cryptographic processing scheme. In particular, this embodiment describes a ciphertext-policy functional encryption (CP-FE) scheme.

Note that cipher-text policy means that a policy, namely an access structure, is embedded in a ciphertext.

First, the construction of the CP-FE scheme will be described.

Second, the configuration of a cryptographic system 10 that implements the CP-FE scheme will be described.

Third, the CP-FE scheme will be described in detail.

<1. Construction of CP-FE Scheme>

The CP-FE scheme consists of four algorithms: Setup, KeyGen, Enc, and Dec.

(Setup)

A Setup algorithm is a probabilistic algorithm that takes as input a security parameter $\lambda$, and outputs a public parameter pk and a master key sk.

(KeyGen)

A KeyGen algorithm is a probabilistic algorithm that takes as input an attribute set $\Gamma := \{(t, x_t) | x_t \in F_q^n, 1 \leq t \leq d\}$, the public parameter pk, and the master key sk, and outputs a decryption key $sk_\Gamma$.

(Enc)

An Enc algorithm is a probabilistic algorithm that takes as input a message m, an access structure $S := (M, \rho)$, and the public parameter pk, and outputs a ciphertext $ct_S$.

(Dec)

A Dec algorithm is an algorithm that takes as input the ciphertext $ct_S$ encrypted under the access structure S, the decryption key $sk_\Gamma$ for the attribute set $\Gamma$, and the public parameter pk, and outputs the message m or a distinguished symbol $\perp$.

<2. Configuration of Cryptographic System 10 that Implements CP-FE Scheme>

Figure 13:
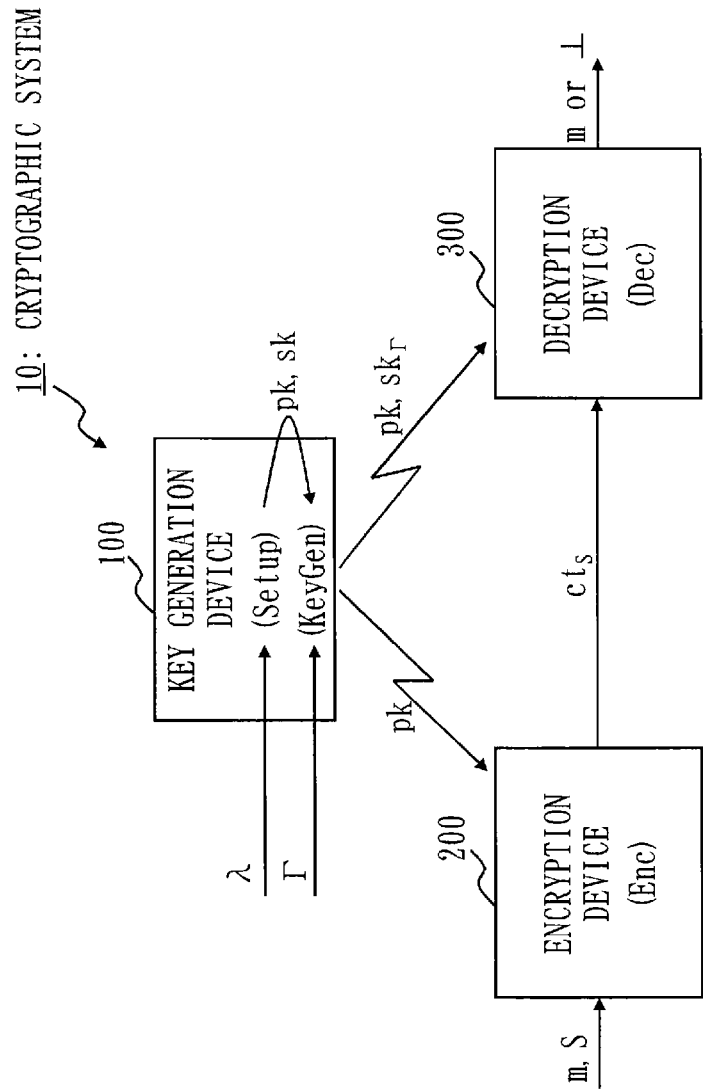
FIG. 13 is a configuration diagram of a cryptographic system 10 that implements a CP-FE scheme according to Embodiment 3.

FIG. 13 is a configuration diagram of the cryptographic system 10 that implements the CP-FE scheme according to Embodiment 3.

The cryptographic system 10 includes a key generation device 100, an encryption device 200, and a decryption device 300.

The key generation device 100 executes the Setup algorithm taking as input a security parameter $\lambda$, and thus generates a public parameter pk and a master key sk. Then, the key generation device 100 publishes the generated public parameter pk. The key generation device 100 also executes the KeyGen algorithm taking as input an attribute set $\Gamma$, and thus generates a decryption key $sk_\Gamma$, and distributes the decryption key $sk_\Gamma$ to the decryption device 300 in secrecy.

The encryption device 200 executes the Enc algorithm taking as input a message m, an access structure S, and the public parameter pk, and thus generates a ciphertext $ct_S$. The encryption device 200 transmits the generated ciphertext $ct_S$ to the decryption device 300.

The decryption device 300 executes the Dec algorithm taking as input the public parameter pk, the decryption key $sk_S$, and the ciphertext $ct_S$, and outputs the message m or a distinguished symbol $\perp$.

<3. CP-FE Scheme in Detail>

With reference to FIGS. 14 to 19, the CP-FE scheme will be described, and the function and operation of the cryptographic system 10 that implements the CP-FE scheme will be described.

Figure 14:
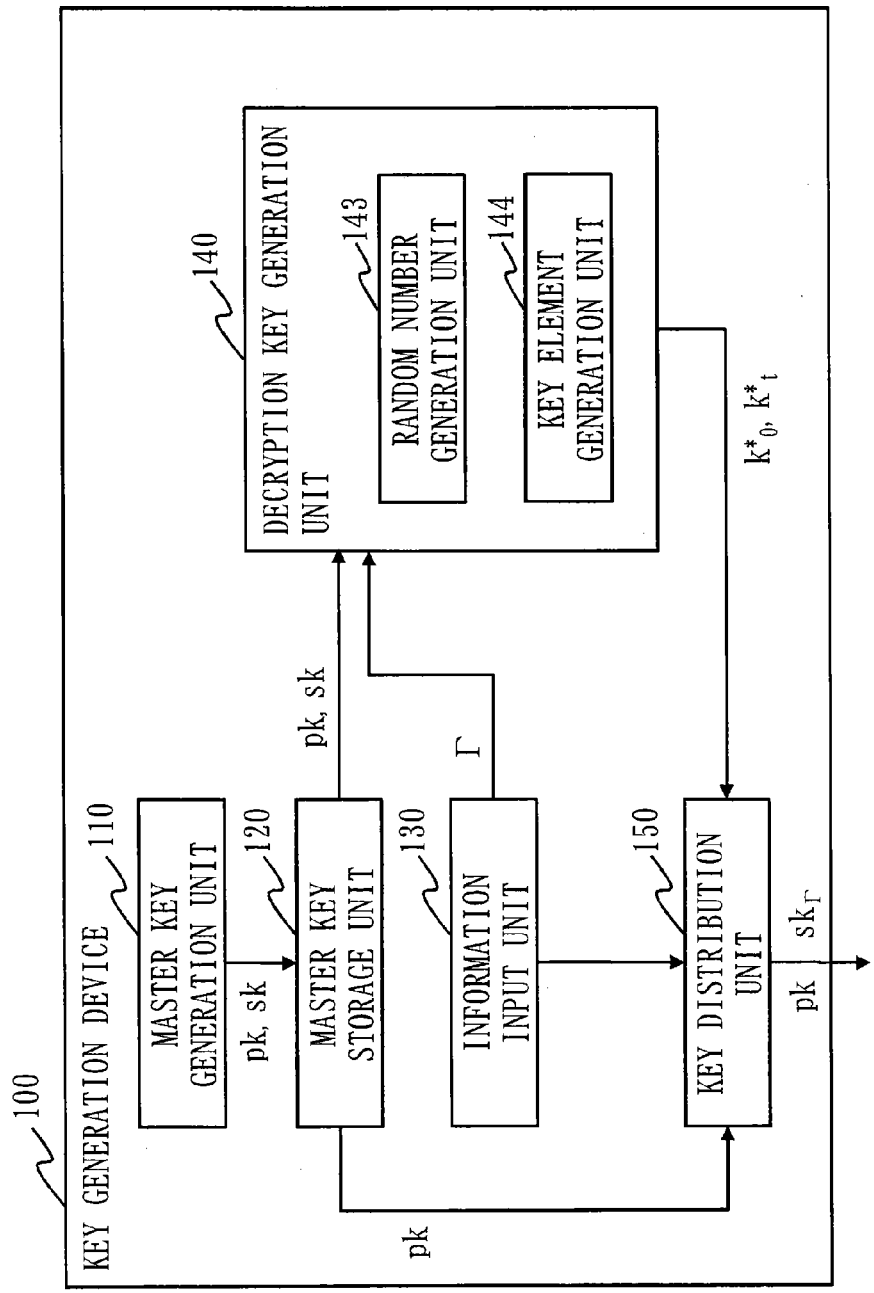
FIG. 14 is a configuration diagram of a key generation device 100 according to Embodiment 3.
Figure 15:
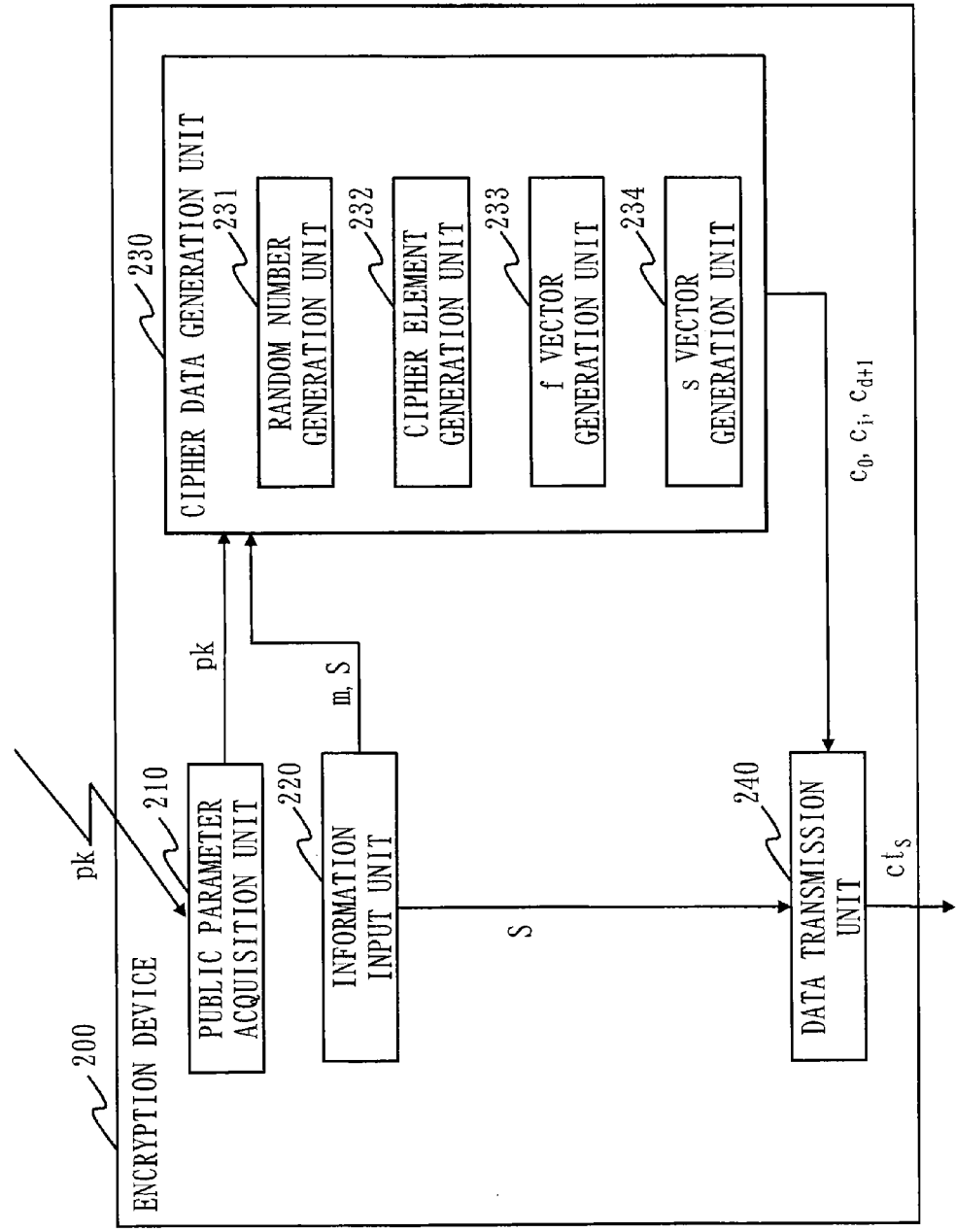
FIG. 15 is a configuration diagram of an encryption device 200 according to Embodiment 3.
Figure 16:
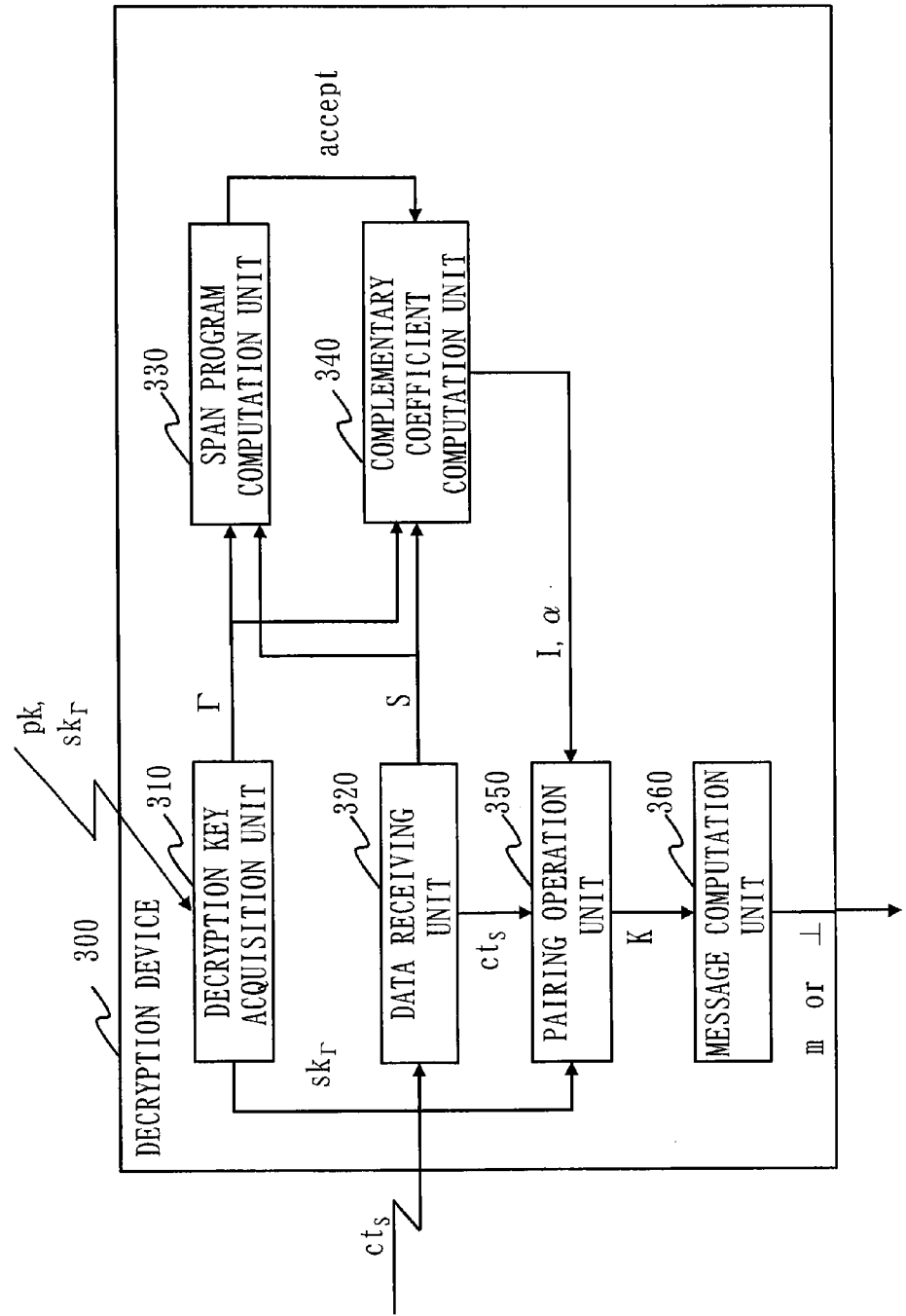
FIG. 16 is a configuration diagram of a decryption device 300 according to Embodiment 3.

FIG. 14 is a configuration diagram of the key generation device 100 according to Embodiment 3. FIG. 15 is a configuration diagram of the encryption device 200 according to Embodiment 3. FIG. 16 is a configuration diagram of the decryption device 300 according to Embodiment 3.

Figure 17:
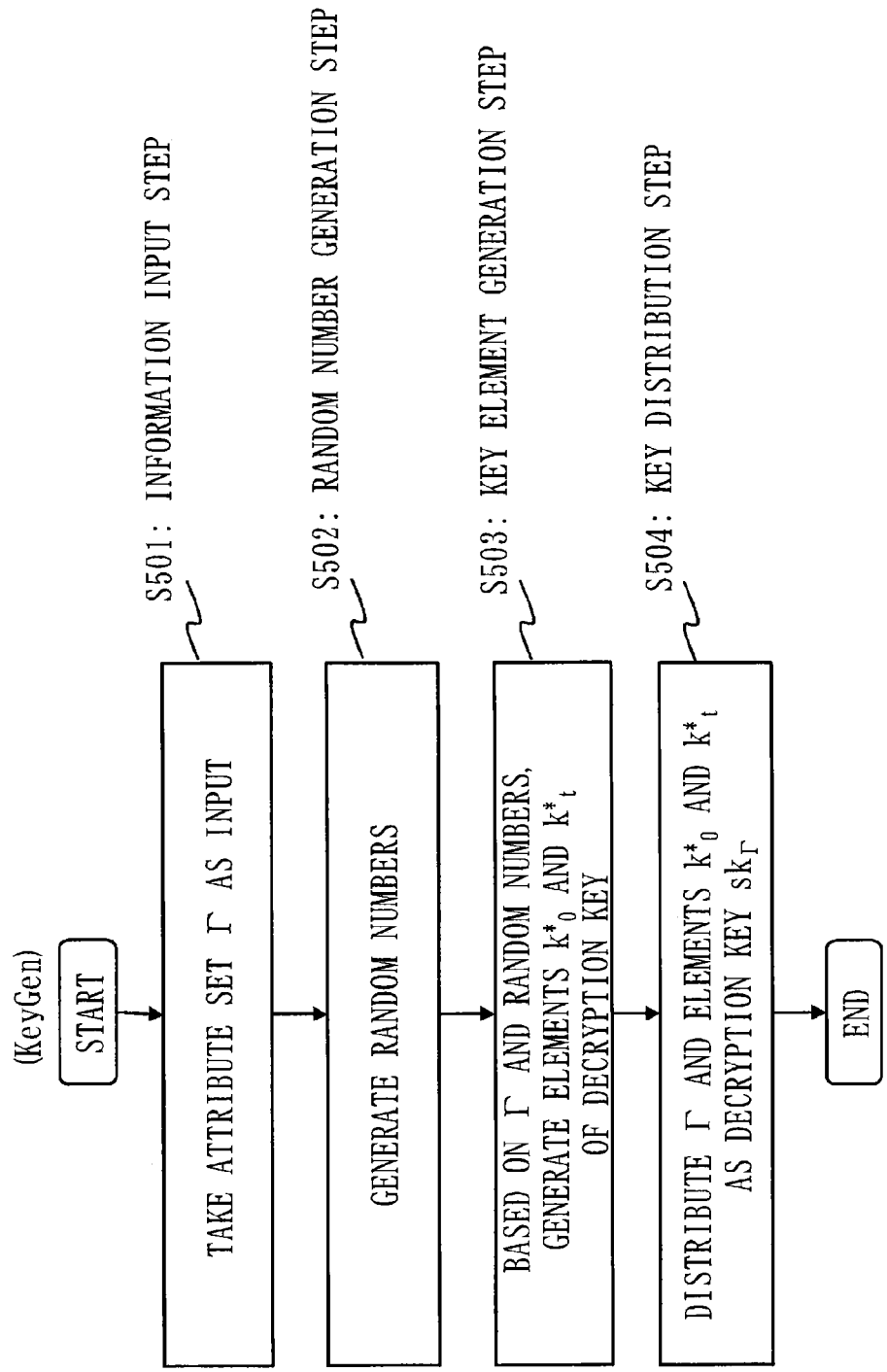
FIG. 17 is a flowchart illustrating the process of a KeyGen algorithm according to Embodiment 3.
Figure 18:
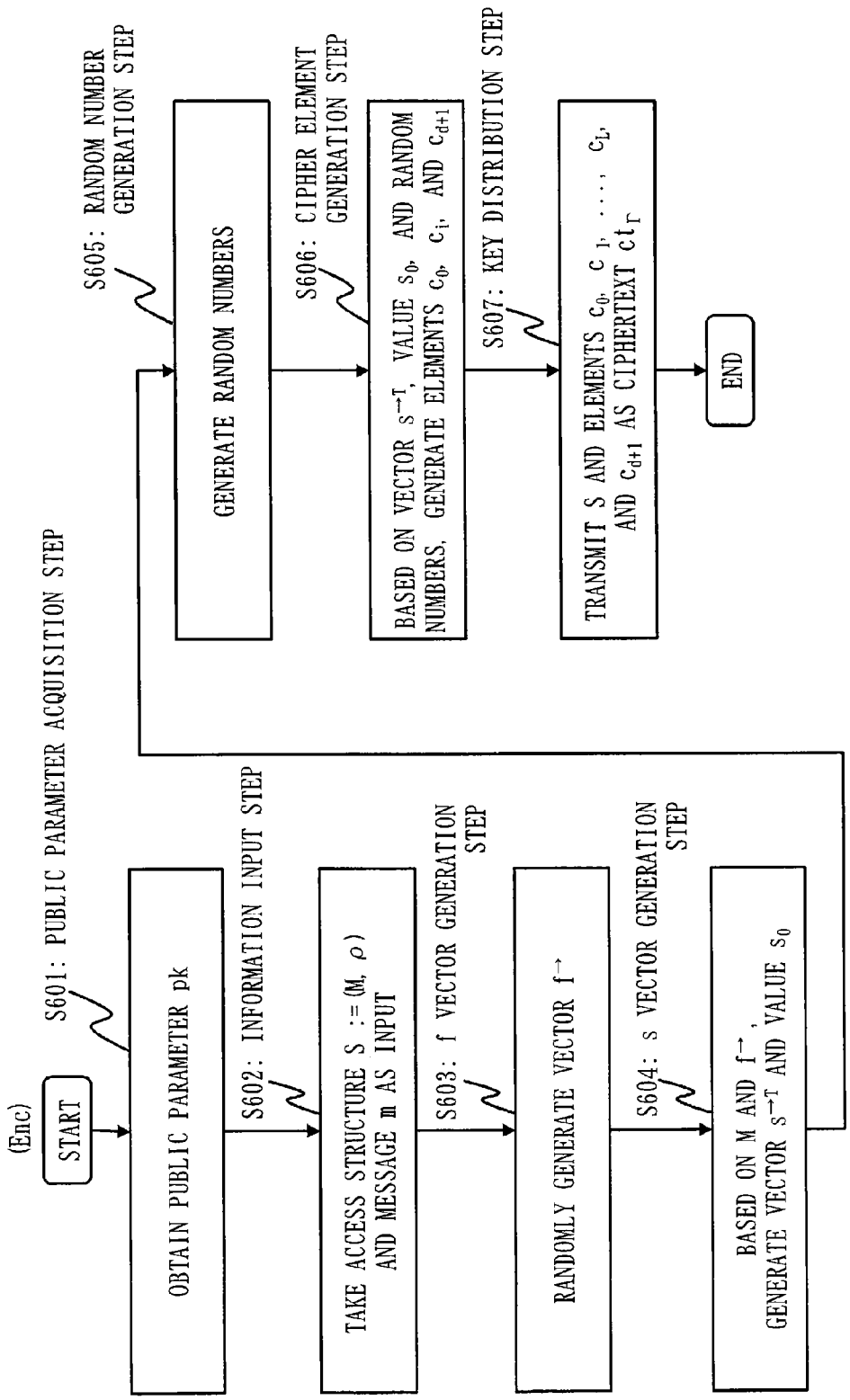
FIG. 18 is a flowchart illustrating the process of an Enc algorithm according to Embodiment 3.
Figure 19:
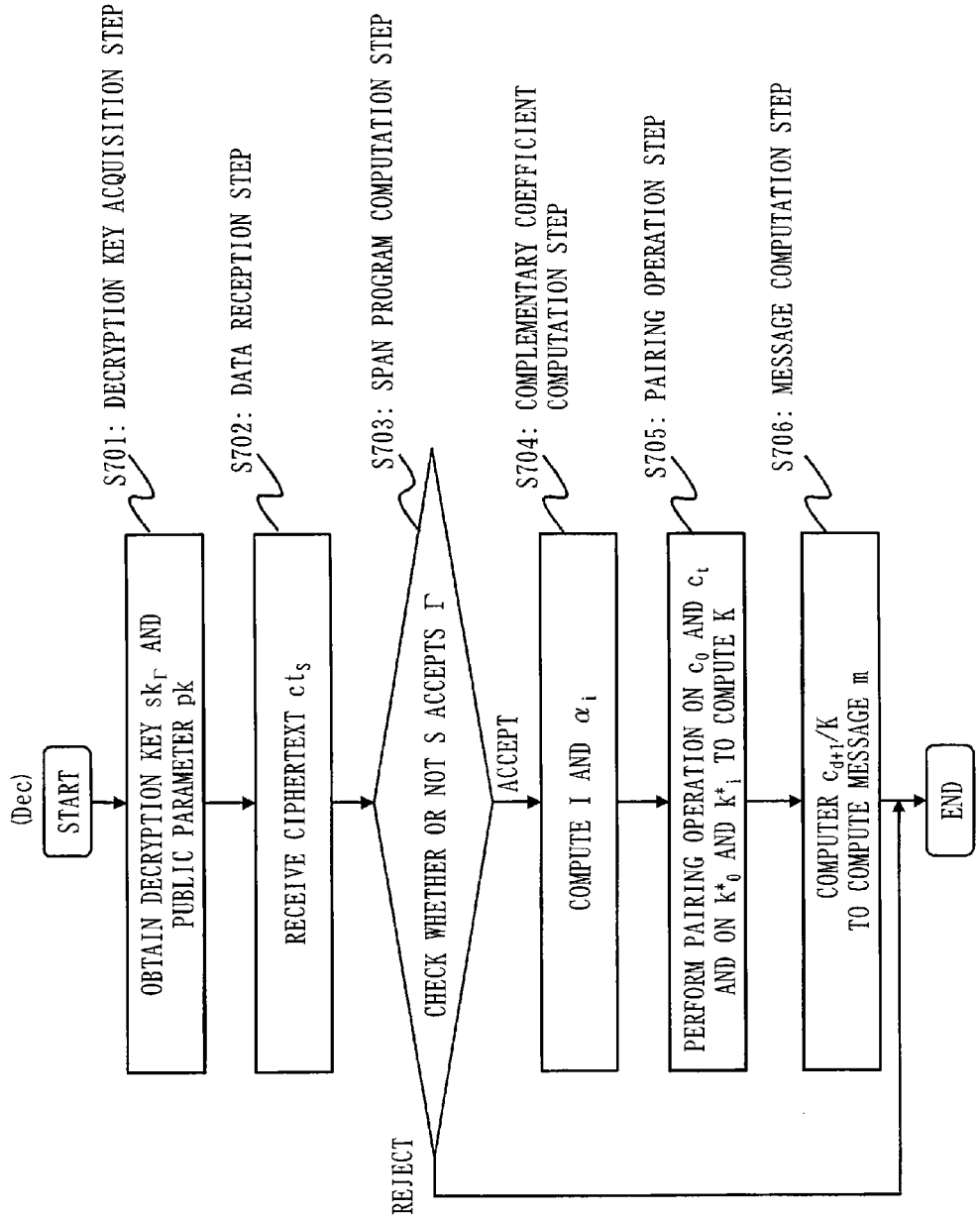
FIG. 19 is a flowchart illustrating the process of a Dec algorithm according to Embodiment 3.

FIG. 17 is a flowchart illustrating the operation of the key generation device 100 and illustrating the process of the KeyGen algorithm. FIG. 18 is a flowchart illustrating the operation of the encryption device 200 and illustrating the process of the Enc algorithm. FIG. 19 is a flowchart illustrating the operation of the decryption device 300 and illustrating the process of the Dec algorithm.

In the following description, it is assumed that $x_{t,1} := 1$.

The process of the Setup algorithm is the same as the process described in Embodiment 2, and thus will not be described.

The function and operation of the key generation device 100 will be described.

The key generation device 100 includes a master key generation unit 110, a master key storage unit 120, an information input unit 130, a decryption key generation unit 140, and a key distribution unit 150. The decryption key generation unit 140 includes a random number generation unit 143 and a key element generation unit 144.

With reference to FIG. 17, the process of the KeyGen algorithm will be described.

(S501: Information Input Step)

Using the input device, the information input unit 130 takes as input an attribute set $\Gamma := \{(t, x_t := (x_{t,1}, \ldots, x_{t,n} \in F_q^n))$ $1 \leq t \leq d\}$. Note that attribute information of the user of a decryption key $sk_\Gamma$ is set in the attribute set $\Gamma$, for example.

(S502: Random Number Generation Step)

Using the processing device, the random number generation unit 143 generates random numbers, as indicated in Formula 150.

$$\omega \xleftarrow{U} \mathbb{F}_q, \vec{\varphi}_0 := (\varphi_{0,1}, \ldots, \varphi_{0,w_0}) \xleftarrow{U} \mathbb{F}_q^{w_0}, \quad \text{[Formula 150]}$$

$$\sigma_t \xleftarrow{U} \mathbb{F}_q, \vec{\varphi}_t := (\varphi_{t,1}, \ldots, \varphi_{t,w}) \xleftarrow{U} \mathbb{F}_q^w \text{ for } (t, \vec{x}_t) \in \Gamma$$

(S503: Key Element Generation Step)

Using the processing device, the key element generation unit 144 generates an element $k^*_0$ of the decryption key $sk_\Gamma$, as indicated in Formula 151.

$$k_0^* := (\omega, \overbrace{0^{u_0}}^{u_0}, 1, \vec{\varphi}_0, \overbrace{0^{z_0}}^{z_0},)_{\mathbb{B}_0^*} \quad \text{[Formula 151]}$$

Using the processing device, the key element generation unit 144 also generates an element $k^*_t$ of the decryption key $sk_\Gamma$ for each integer t included in the attribute set $\Gamma$, as indicated in Formula 152.

$$k_t^* := (\sigma_t(1,t), \omega\vec{x}_t, \overset{u}{0^u}, \overset{w}{\vec{\varphi}_t}, \overset{z}{0^z})_{\mathbb{B}^*}^{2+n} \quad \text{[Formula 152]}$$

(S504: Key Distribution Step)

Using the communication device and via the network, for example, the key distribution unit 150 distributes the decryption key $sk_\Gamma$ having, as elements, the attribute set $\Gamma$ inputted in (S501) and $k^*_0$ and $k^*_t$ generated in (S503) to the decryption device 300 in secrecy. As a matter of course, the decryption key $sk_\Gamma$ may be distributed to the decryption device 300 by another method.

In brief, in (S501) through (S503), the key generation device 100 executes the KeyGen algorithm indicated in Formula 153, and thus generates the decryption key $sk_\Gamma$. In (S504), the key generation device 100 distributes the generated decryption key $sk_\Gamma$ to the decryption device 300.

$$\text{KeyGen}(pk, sk, \quad \text{[Formula 153]}$$

$$\Gamma := \{(t, \vec{x}_t := (x_{1,t}, \ldots, x_{t,n}) \in \mathbb{F}_q^n \setminus \{\vec{0}\}) \mid 1 \leq t \leq d\}):$$

$$\omega \xleftarrow{U} \mathbb{F}_q, \vec{\varphi}_0 \xleftarrow{U} \mathbb{F}_q^{w_0},$$

$$k_0^* := (\omega, \overset{u_0}{0^{u_0}}, 1, \overset{w_0}{\vec{\varphi}_0}, \overset{z_0}{0^{z_0}},)_{\mathbb{B}_0^*},$$

for $(t, \vec{x}_t) \in \Gamma$, $\sigma_t \xleftarrow{U} \mathbb{F}_q$, $\vec{\varphi}_t \xleftarrow{U} \mathbb{F}_q^w$, $$k_t^* := (\sigma_t(1,t), \omega\vec{x}_t, \overset{u}{0^u}, \overset{w}{\vec{\varphi}_t}, \overset{z}{0^z})_{\mathbb{B}^*}^{2+n},$$

return $sk_\Gamma := (\Gamma, k_0^*, \{k_t^*\}_{(t,\vec{x}_t) \in \Gamma})$.

The function and operation of the encryption device 200 will be described.

The encryption device 200 includes a public parameter acquisition unit 210, an information input unit 220, a cipher data generation unit 230, and a data transmission unit 240. The cipher data generation unit 230 includes a random number generation unit 231, a cipher element generation unit 232, an f vector generation unit 233, and an s vector generation unit 234.

With reference to FIG. 18, the process of the Enc algorithm will be described.

(S601: Public Parameter Acquisition Step)

Using the communication device and via the network, for example, the public parameter acquisition unit 210 obtains the public parameter pk generated by the key generation device 100.

(S602: Information Input Step)

Using the input device, the information input unit 220 takes as input an access structure $S:=(M, \rho)$. Note that the access structure S is to be set according to the conditions of a system to be implemented. Note also that attribute information of the user capable of decryption is set in $\rho$ of the access structure S, for example.

Using the input device, the information input unit 220 also takes as input a message m to be transmitted to the decryption device 300.

(S603: f Vector Generation Step)

Using the processing device, the f vector generation unit 233 randomly generates a vector f having r pieces of elements, as indicated in Formula 154.

$$\vec{f} \xleftarrow{U} \mathbb{F}_q^r \quad \text{[Formula 154]}$$

(S604: s Vector Generation Step)

Using the processing device and based on an (L rows×r columns) matrix M included in the access structure S inputted in (S602) and the vector f generated in (S603), the s vector generation unit 234 generates a vector $s^T:=(s_1, \ldots, s_L)^T$, as indicated in Formula 155.

$$\vec{s}^T := (s_1, \ldots, s_L)^T := M \cdot \vec{f}^T \quad \text{[Formula 155]}$$

Using the processing device and based on the vector f generated in (S603), the s vector generation unit 234 also generates a value $s_0$, as indicated in Formula 156.

$$s_0 := \vec{1} \cdot \vec{f}^T \quad \text{[Formula 156]}$$

(S605: Random Number Generation Step)

Using the processing device, the random number generation unit 231 generates random numbers, as indicated in Formula 157.

$$\zeta \xleftarrow{U} \mathbb{F}_q, \vec{\eta}_0 := (\eta_{0,1}, \cdots, \eta_{0,z_0}) \xleftarrow{U} \mathbb{F}_q^{z_0}, \quad \text{[Formula 157]}$$

for $i = 1, \cdots, L$ if $\rho(i) = (t, \vec{v}_i)$, $\mu_i, \theta_i \xleftarrow{U} \mathbb{F}_q$, $\vec{\eta}_i := (\eta_{i,1}, \cdots, \eta_{i,z}) \xleftarrow{U} \mathbb{F}_q^z,$ if $\rho(i) = \neg(t, \vec{v}_i)$, $\mu_i, \xleftarrow{U} \mathbb{F}_q$, $\vec{\eta}_i := (\eta_{i,1}, \cdots, \eta_{i,z}) \xleftarrow{U} \mathbb{F}_q^z$ (S606: Cipher Element Generation Step)

Using the processing device, the cipher element generation unit 232 generates an element $c_0$ of cipher data c, as indicated in Formula 158.

$$c_0 := (-s_0, \overset{u_0}{0^{u_0}}, \zeta, \overset{w_0}{0^{w_0}}, \overset{z_0}{\vec{\eta}_0})_{\mathbb{B}_0} \quad \text{[Formula 158]}$$

Using the processing device, the cipher element generation unit 232 also generates an element $c_i$ of the cipher data c for each integer $i=1, \ldots, L$, as indicated in Formula 159.

for $i = 1, \cdots, L$, [Formula 159]

if $\rho(i) = (t, \vec{v}_i)$, $$c_i := (\mu_i(t, -1), s_i \vec{e}_1 + \theta_i \vec{v}_i, \overset{u}{0^u}, \overset{w}{0^w}, \overset{z}{\vec{\eta}_i})_\mathbb{B}^{2+n},$$

if $\rho(i) = \neg(t, \vec{v}_i)$, $$c_i := (\mu_i(t, -1), s_i \vec{v}_i, \overset{u}{0^u}, \overset{w}{0^w}, \overset{z}{\vec{\eta}_i})_\mathbb{B}^{2+n}$$

Using the processing device, the cipher element generation unit 232 also generates an element $c_{d+1}$ of the cipher data c, as indicated in Formula 160.

$$c_{d+1} := g_T^\zeta m \qquad \text{[Formula 160]}$$

(S607: Data Transmission Step)

Using the communication device and via the network, for example, the data transmission unit 240 transmits a ciphertext $ct_S$ having, as elements, the access structure S inputted in (S602) and $c_0, c_1, \ldots, c_L$, and $c_{d+1}$ generated in (S606) to the decryption device 300. As a matter of course, the ciphertext $ct_S$ may be transmitted to the decryption device 300 by another method.

In brief, in (S601) through (S606), the encryption device 200 executes the Enc algorithm indicated in Formula 161, and thus generates the ciphertext $ct_S$. In (S607), the encryption device 200 transmits the generated ciphertext $ct_S$ to the decryption device 300.

$$Enc(pk, m, \mathbb{S} := (M, \rho)): \qquad \text{[Formula 161]}$$

$$f \xleftarrow{U} \mathbb{F}_q^r,$$

$$s_0 := \vec{1} \cdot \vec{f}^T, \vec{s}^T := (s_1, \cdots, s_L)^T := M \cdot \vec{f}^T,$$

$$\zeta \xleftarrow{U} \mathbb{F}_q, \vec{\eta}_0 \xleftarrow{U} \mathbb{F}_q^{z_0},$$

$$c_0 := (-s_0, \overbrace{0^{u_0}}^{u_0}, \zeta, \overbrace{0^{w_0}}^{w_0}, \overbrace{\vec{\eta}_0}^{z_0},)_{B_0},$$

for $i = 1, \cdots, L$, if $\rho(i) = (t, \vec{v}_i)$, $\mu_i, \theta_i \xleftarrow{U} \mathbb{F}_q, \vec{\eta}_i \xleftarrow{U} \mathbb{F}_q^z,$ $$c_i := (\overbrace{\mu_i(t, -1), s_i \vec{e}_1 + \theta_i \vec{v}_i}^{2+n}, \overbrace{0^u}^{u}, \overbrace{0^w}^{w}, \overbrace{\vec{\eta}_i}^{z})_B,$$

if $\rho(i) = \neg (t, \vec{v}_i)$, $\mu_i \xleftarrow{U} \mathbb{F}_q, \vec{\eta}_i \xleftarrow{U} \mathbb{F}_q^z,$ $$c_i := (\overbrace{\mu_i(t, -1), s_i \vec{v}_1}^{2+n}, \overbrace{0^u}^{u}, \overbrace{0^w}^{w}, \overbrace{\vec{\eta}_i}^{z})_B,$$

$$c_{d+1} := g_T^\zeta m,$$

return $ct_\mathbb{S} := (\mathbb{S}, c_0, c_1, \cdots, c_L, c_{d+1}).$

The function and operation of the decryption device 300 will be described.

The decryption device 300 includes a decryption key acquisition unit 310, a data receiving unit 320, a span program computation unit 330, a complementary coefficient computation unit 340, a pairing operation unit 350, and a message computation unit 360.

With reference to FIG. 15, the process of the Dec algorithm will be described.

(S701: Decryption Key Acquisition Step)

Using the communication device and via the network, for example, the decryption key acquisition unit 310 obtains the decryption key $sk_\Gamma$ distributed by the key generation device 100. The decryption key acquisition unit 310 also obtains the public parameter pk generated by the key generation device 100.

(S702: Data Reception Step)

Using the communication device and via the network, for example, the data receiving unit 320 receives the ciphertext $ct_S$ transmitted by the encryption device 200.

(S703: Span Program Computation Step)

Using the processing device, the span program computation unit 330 checks whether or not the access structure S included in the ciphertext $ct_S$ obtained in (S702) accepts Γ included in the decryption key $sk_\Gamma$ received in (S701). The method for checking whether or not the access structure S accepts Γ is the same as that described in "5. Concept for implementing functional encryption in Embodiment 1".

If the access structure S accepts Γ (accept in S703), the span program computation unit 330 advances the process to (S704). If the access structure S rejects Γ (reject in S703), the span program computation unit 330 determines that the ciphertext $ct_S$ cannot be decrypted with the decryption key $sk_\Gamma$ and ends the process.

(S704) through (S706) are substantially the same as (S404) through (S406) in Embodiment 2 shown in FIG. 12.

In brief, in (S701) through (S706), the encryption device 200 executes the Dec algorithm indicated in Formula 162, and thus generates the message m' (=m).

$$Dec(pk, sk_\Gamma := (\Gamma, k_0^*, \{k_t^*\}_{(t,\vec{x}_t) \in \Gamma}), \qquad \text{[Formula 162]}$$

$$ct_\mathbb{S} := (\mathbb{S}, c_0, c_1, \cdots, c_L, c_{d+1})):$$

If $\mathbb{S} := (M, \rho)$ accepts $\Gamma := \{(t, \vec{x}_t)\}$, then compute $I$ and $\{\alpha_i\}_{i \in I}$ such that $$\vec{1} = \sum_{i \in I} \alpha_i M_i,$$

where $M_i$ is the i-th row of $M$, and $I \subseteq \{i \in \{1, \ldots, L\} \mid [\rho(i) =$ $(t, \vec{v}_i) \wedge (t, \vec{x}_i) \in \Gamma \wedge \vec{v}_i \cdot \vec{x}_i = 0] \vee [\rho(i) =$ $\neg (t, \vec{v}_i) \wedge (t, \vec{x}_i) \in \wedge \vec{v}_i \cdot \vec{x}_i \neq 0]\}.$ $$K := e(c_0, k_0^*) \prod_{i \in I \wedge \rho(i) = (t, \vec{v}_i)} e(c_i, k_t^*)\alpha_i$$

$$\prod_{i \in I \wedge \rho(i) = \neg(t, \vec{v}_i)} e(c_i, k_t^*)\alpha_i / (\vec{v}_i \cdot \vec{x}_t)$$

return $m' := c_{d+1} / K.$

As described above, as in the cryptographic system 10 according to Embodiment 2, in the cryptographic system 10 according to Embodiment 3, the index parts are provided, so that the bases that are used for every attribute category can be constructed as the common bases (basis B and basis B*). As a result, only the basis B and the basis B* need to be included in a public parameter, eliminating the need for reissuing the public parameter when an attribute category is to be added at a later stage.

As in Embodiment 2, for the index parts, it is required that 0 be obtained as a result of an inner-product operation of the index parts. Therefore, although the 2-dimensional index parts, namely the basis vectors $b^*_1$ and $b^*_2$ and the basis vectors $b_1$ and $b_2$, are employed in the above description, the index parts are not limited to 2-dimensional and may be 3-dimensional or higher-dimensional. The values assigned to the index parts are not limited to those described above, and a different assignment arrangement may be employed.

The functional encryption scheme has been described above. As indicated in Formula 163 through Formula 167, however, the functional encryption scheme can be modified into an attribute-based encryption scheme. Note that $N_0$ is $1+1+1+1+1=5$ and $N_1$ is $2+2+8+2+2=16$ in Formula 163 through Formula 167. That is, $u_0=1$, $w_0=1$, $z_0=1$, $n=2$, $u=8$, $w=2$, and $z=2$. Even in this case, security can be proven.

[Formula 163]

$Setup(1^\lambda)$: $(param, (\mathbb{B}_0, \mathbb{B}_0^*), (\mathbb{B}, \mathbb{B}^*)) \xleftarrow{R} \mathcal{G}_{ob}(1^\lambda)$,

/∗ $N = 16$ ∗/

$\hat{\mathbb{B}}_0 := (b_{0,1}, b_{0,3}, b_{0,5})$, $\hat{\mathbb{B}} := (b_1, \cdots, b_4, b_{15}, b_{16})$, $\hat{\mathbb{B}}_0^* := (b_{0,1}^*, b_{0,3}^*, b_{0,4}^*)$, $\hat{\mathbb{B}}^* := (b_1^*, \cdots, b_4^*, b_{13}^*, b_{14}^*)$, $pk := (1^\lambda, param, \hat{\mathbb{B}}_0, \hat{\mathbb{B}})$, $sk := (\hat{\mathbb{B}}_0^*, \hat{\mathbb{B}}^*)$, return $pk, sk$.

$\mathcal{G}_{ob}(1^\lambda)$: $param_{\mathbb{G}} := (q, \mathbb{G}, \mathbb{G}_T, g, e) \xleftarrow{R} \mathcal{G}_{bpg}(1^\lambda)$, $\psi \xleftarrow{U} \mathbb{F}_q^\times$, $N_0 := 5, N_1 := 16$, for $t = 0, 1$, $param_{\mathbb{V}_t} := (q, \mathbb{V}_t, \mathbb{G}_T, \mathbb{A}_t, e) := \mathcal{G}_{dpvs}(1^\lambda, N_t, param_{\mathbb{G}})$, $X_t := (\chi_{t,i,j})_{i,j=1,\cdots,N_t} \xleftarrow{U} GL(N_t, \mathbb{F}_q)$, $X_t^* := (\vartheta_{t,i,j})_{i,j=1,\cdots,N_t} := \psi \cdot (X_t^T)^{-1}$, hereafter, $\vec{\chi}_{t,i}$ and $\vec{\vartheta}_{t,i}$ denote the i-th rows of $X_t$ and $X_t^*$ for $i = 1, \cdots, N_t$, respectively, $b_{t,i} := (\vec{\chi}_{t,i})_{\mathbb{A}_t} = \sum_{j=1}^{N_t} \chi_{t,i,j} a_{t,j}$ for $i = 1, \cdots, N_t$, $\mathbb{B}_t := (b_{t,1}, \cdots, b_{t,N_t})$, $b_{t,i}^* := (\vec{\vartheta}_{t,i})_{\mathbb{A}_t} = \sum_{j=1}^{N_t} \vartheta_{t,i,j} a_{t,j}$ for $i = 1, \cdots, N_t$, $\mathbb{B}_t^* := (b_{t,1}^*, \cdots, b_{t,N_t}^*)$, $g_T := e(g, g)^\psi$, $param := (\{param_{\mathbb{V}_t}\}_{t=0,1}, g_T)$, return $(param, \mathbb{B}, \mathbb{B}^*)$.

[Formula 164]

$KeyGen(pk, sk, \Gamma := \{(t, x_t) | 1 \le t \le d\})$:

$\omega, \varphi_0 \xleftarrow{U} \mathbb{F}_q$, $k_0^* := (\omega, 0, 1, \varphi_0, 0)_{\mathbb{B}_0^*}$, for $(t, x_t) \in \Gamma, \sigma_t, \varphi_{t,1}, \varphi_{t,2} \xleftarrow{U} \mathbb{F}_q$, $k_t^* := (\overbrace{\sigma_t(1, t), \omega(1, x_t)}^{4}, \overbrace{0^8}^{8}, \overbrace{\varphi_{t,1}, \varphi_{t,2}}^{2}, \overbrace{0^2}^{2})_{\mathbb{B}^*}$, return $sk_\Gamma := (\Gamma, k_0^*, \{k_t^*\}_{(t,x_t)\in\Gamma})$.

[Formula 165]

$Enc(pk, m, \mathbb{S} := (M, \rho))$:

$\vec{f} \xleftarrow{U} \mathbb{F}_q^r$, $s_0 := \vec{1} \cdot \vec{f}^T$, $\vec{s}^T := (s_1, \cdots, s_L)^T := M \cdot \vec{f}^T$, $\zeta, \eta_0 \xleftarrow{U} \mathbb{F}_q$, $c_0 := (-s_0, 0, \zeta, 0, \eta_0)_{\mathbb{B}_0}$, for $i = 1, \cdots, L$, if $\rho(i) = (t, v_i), \mu_i, \theta_i, \eta_{i,1}, \eta_{i,2} \xleftarrow{U} \mathbb{F}_q$, $c_i := (\overbrace{\mu_i(t, -1), s_i + \theta_i v_i, -\theta_i}^{4}, \overbrace{0^8}^{8}, \overbrace{0^2}^{2}, \overbrace{\eta_{i,1}, \eta_{i,2}}^{2})_{\mathbb{B}}$, if $\rho(i) = \neg(t, v_i), \mu_i, \eta_{i,1}, \eta_{i,2} \xleftarrow{U} \mathbb{F}_q$, $c_i := (\overbrace{\mu_i(t, -1), s_i(v_i, -1)}^{4}, \overbrace{0^8}^{8}, \overbrace{0^2}^{2}, \overbrace{\eta_{i,1}, \eta_{i,2}}^{2})_{\mathbb{B}}$, $c_{d+1} := g_T^\zeta m$, return $ct_{\mathbb{S}} := (\mathbb{S}, c_0, c_1, \cdots, c_L, c_{d+1})$.

[Formula 166]

$Dec(pk, sk_\Gamma := (\Gamma, k_0^*, \{k_t^*\}_{(t,x_t)\in\Gamma}),$ $ct_{\mathbb{S}} := (\mathbb{S}, c_0, c_1, \cdots, c_L, c_{d+1}))$:

If $\mathbb{S} := (M, \rho)$ accepts $\Gamma := \{(t, x_t)\}$, then compute $I$ and $\{\alpha_i\}_{i \in I}$ such that $\vec{1} = \sum_{i \in I} \alpha_i M_i$, where $M_i$ is the i-th row of $M$, and $I \subseteq \{i \in \{1, \cdots, L\} \mid [\rho(i) =$
$(t, v_i) \wedge (t, x_t) \in \Gamma \wedge v_i = x_t] \vee [\rho(i) =$
$\neg(t, v_i) \wedge (t, x_t) \in \Gamma \wedge v_i \ne x_t]\}$.

$K := e(c_0, k_0^*) \prod_{i \in I \wedge \rho(i)=(t,v_i)} e(c_i, k_t^*)^{\alpha_i}$ $\prod_{i \in I \wedge \rho(i)=\neg(t,v_i)} e(c_i, k_t^*)^{\alpha_i/(v_i - x_i)}$ return $m' := c_{d+1}/K$.

In Embodiment 2, the KP-FE scheme has been described. In Embodiment 3, the CP-FE scheme has been described. As with these schemes, the unified-policy (UP-FE) scheme described in Non-Patent Literature 30 may be constructed such that there is no need to reissue a public parameter when an attribute category is to be added.

Embodiment 4

Like Embodiments 2 and 3, this embodiment describes a narrowly-defined cryptographic processing scheme. In particular, this embodiment describes a hierarchical inner-product predicate encryption (HIPE) scheme.

The HIPE scheme is an inner-product predicate encryption scheme which is capable of delegation. Delegation means that a user who has a higher-level key generates a lower-level key having more limited capabilities than the user's (higher-level) key. The limited capabilities mean that the lower-level key can decrypt only some of ciphertexts that can be decrypted with the higher-level key. As explained in Embodiment 1, the inner-product predicate encryption scheme corresponds to a case where the design of the access structure in the functional encryption scheme is limited.

The HIPE scheme includes a first scheme which is efficient, and a second scheme which is less efficient than the first scheme, but guarantees security of even attribute information that is set in a ciphertext (see Non-Patent Literature 29). Here, as an example of the second scheme, a scheme which allows for addition of an attribute category without reissuing a public parameter will be described. However, by making similar modifications to the algorithms described in Non-Patent Literature 29, the first scheme can also be constructed to allow for addition of an attribute category without reissuing a public parameter.

First, the construction of the HIPE scheme will be described.

Second, the configuration of a cryptographic system 10 that implements the HIPE scheme will be described.

Third, the HIPE scheme will be described in detail.

<1. Construction of HIPE Scheme>

The HIPE scheme consists of five algorithms: Setup, KeyGen, Enc, Dec, and $Delegate_L$.

(Setup)

A Setup algorithm is a probabilistic algorithm that takes as input a security parameter $1^\lambda$, and outputs a master public key pk and a master secret key sk. The master secret key sk is a top-level key.

(KeyGen)

A KeyGen algorithm is a probabilistic algorithm that takes as input the master public key pk, the master secret key sk, and predicate information $(v_1, \ldots, v_L)$ $(1 \leq L \leq d)$, and outputs an L-th-level secret key $sk_L$.

(Enc)

An Enc algorithm is a probabilistic algorithm that takes as input the master public key pk, attribute information $(x_1, \ldots, x_h)$ $(1 \leq h \leq d)$, and a message m, and outputs a ciphertext ct.

(Dec)

A Dec algorithm is a probabilistic algorithm that takes as input the master public key pk, the L-th-level secret key $sk_L$, and the ciphertext ct, and outputs the message m or a distinguished symbol $\perp$.

(Delegate$_L$)

Delegate$_L$ is a probabilistic algorithm that takes as input the master public key pk, the L-th-level secret key $sk_L$, and (L+1)-th level predicate information $v_{L+1}$ $(L+1 \leq d)$, and outputs an (L+1)-th-level secret key $sk_{L+1}$. That is, the Delegate$_L$ algorithm outputs a lower-level secret key.

<2. Configuration of Cryptographic System 10 that Implements HIPE Scheme>

Figure 20:
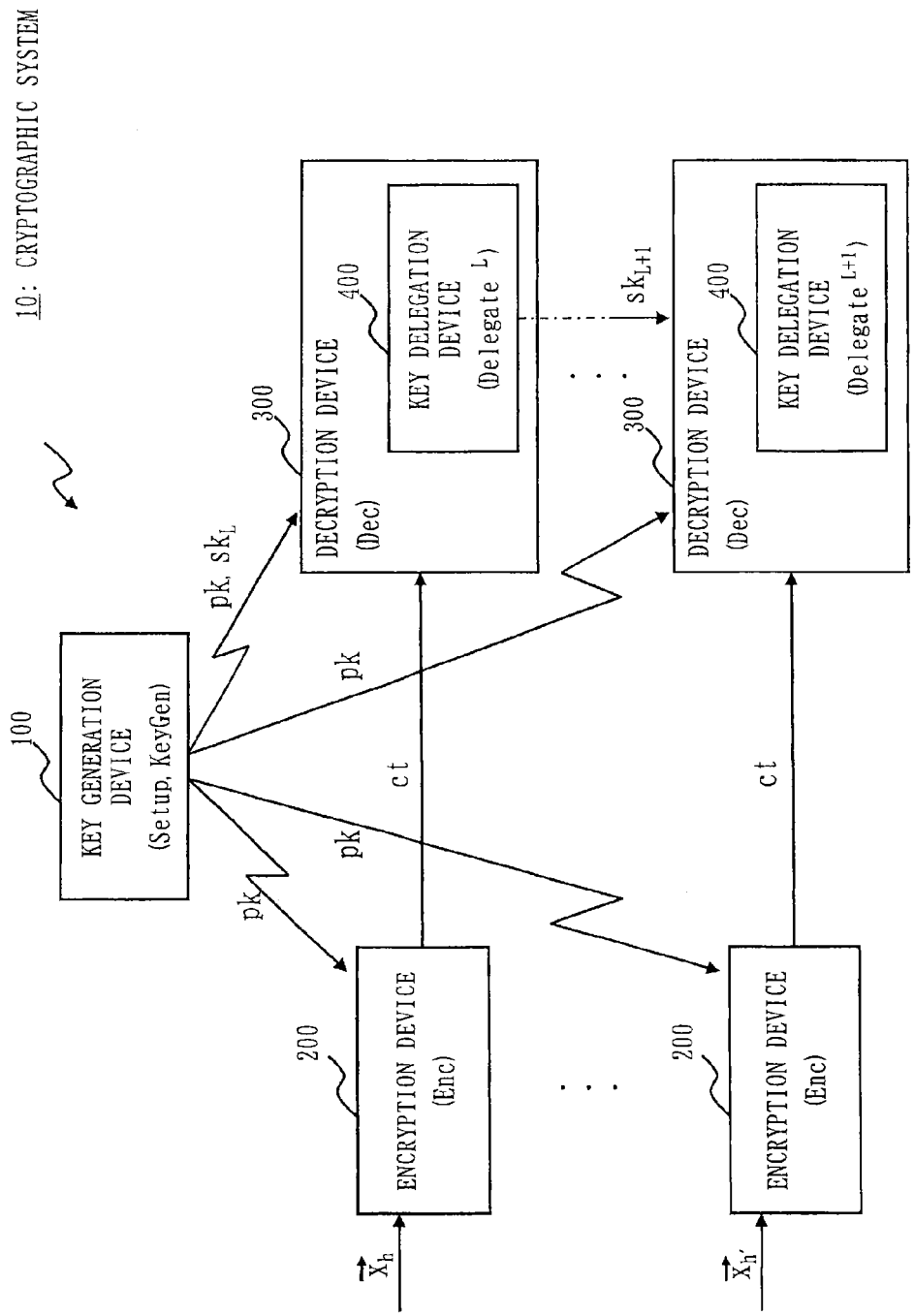
FIG. 20 is a configuration diagram of a cryptographic system 10 that implements an HIPE scheme according to Embodiment 4.

FIG. 20 is a configuration diagram of the cryptographic system 10 that implements the HIPE scheme according to Embodiment 4.

The cryptographic system 10 includes a key generation device 100, an encryption device 200, a decryption device 300, and a key delegation device 400. It is assumed in the following description that the decryption device 300 includes the key delegation device 400. However, the key delegation device 400 may be provided separately from the decryption device 300.

The key generation device 100 executes the Setup algorithm taking as input a security parameter $\lambda$, and thus generates a master public key pk and a master secret key sk. Then, the key generation device 100 publishes the generated master public key pk. The key generation device 100 also executes the KeyGen algorithm taking as input the master public key pk, the master secret key sk, and predicate information $(v_1, \ldots, v_L)$ $(1 \leq L \leq d)$, and thus generates an L-th-level secret key $sk_L$, and distributes the L-th-level secret key $sk_L$ to the L-th level decryption device 300 in secrecy.

The encryption device 200 executes the Enc algorithm taking as input the master public key pk, attribute information $(x_1, \ldots, x_h)$ $(1 \leq h \leq d)$, and a message m, and thus generates a ciphertext ct. The encryption device 200 transmits the generated ciphertext ct to the decryption device 300.

The decryption device 300 executes the Dec algorithm taking as input the master public key pk, the L-th-level secret key $sk_L$, and the ciphertext ct, and outputs the message m or a distinguished symbol 1.

The key delegation device 400 executes the Delegate$_L$ algorithm taking as input the master public key pk, the L-th-level secret key $sk_L$, and (L+1)-th-level predicate information $v_{L+1}$ $(L+1 \leq d)$, and thus generates an (L+1)-th-level secret key $sk_{L+1}$, and distributes the (L+1)-th-level secret key $sk_{L+1}$ to the (L+1)-th-level decryption device 300 in secrecy.

<3. HIPE Scheme in Detail>

With reference to FIGS. 21 to 29, the HIPE scheme and the operation and function of the cryptographic system 10 that implements the HIPE scheme according to Embodiment 4 will be described.

Figure 21:
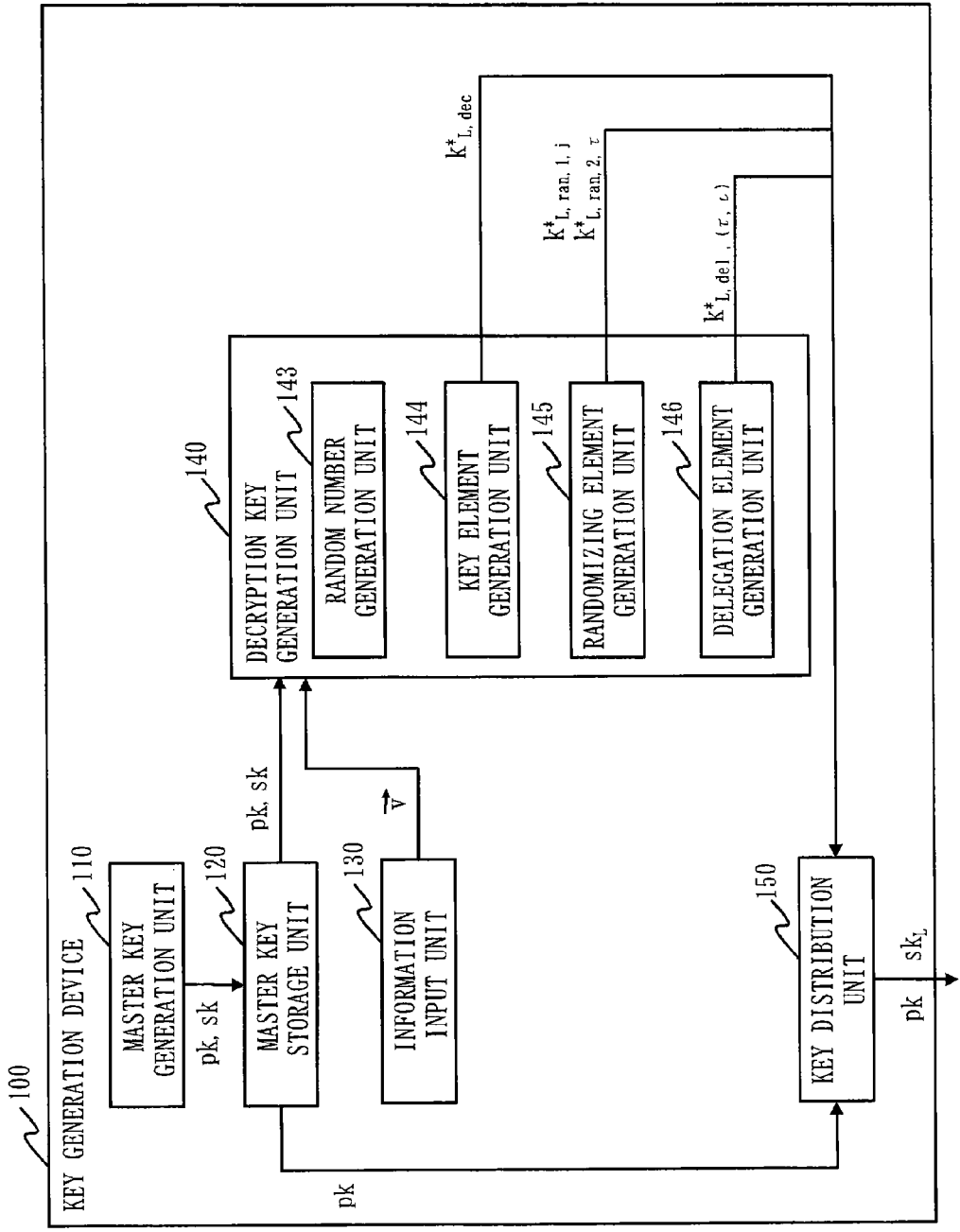
FIG. 21 is a configuration diagram of a key generation device 100 according to Embodiment 4.
Figure 22:
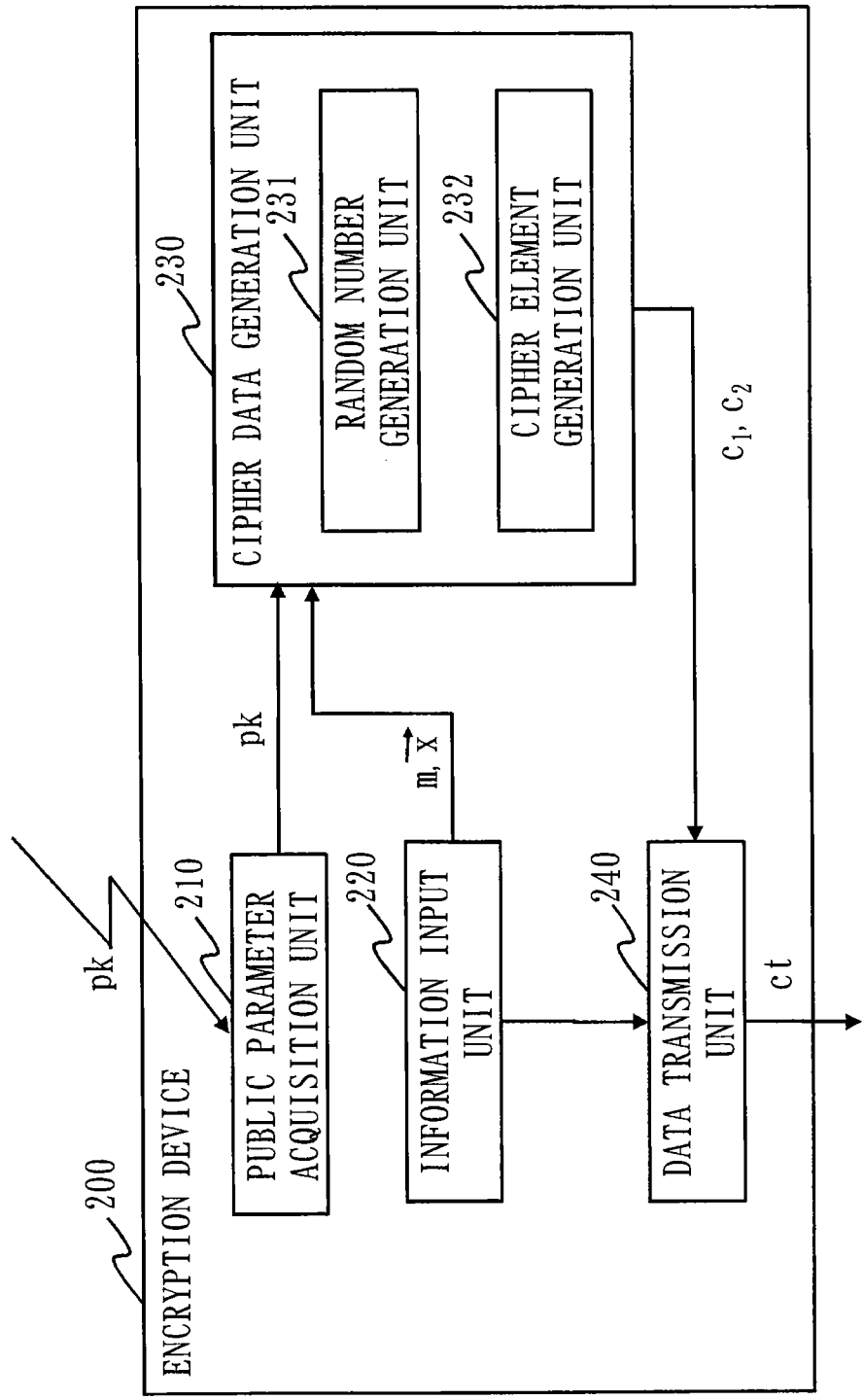
FIG. 22 is a configuration diagram of an encryption device 200 according to Embodiment 4.
Figure 23:
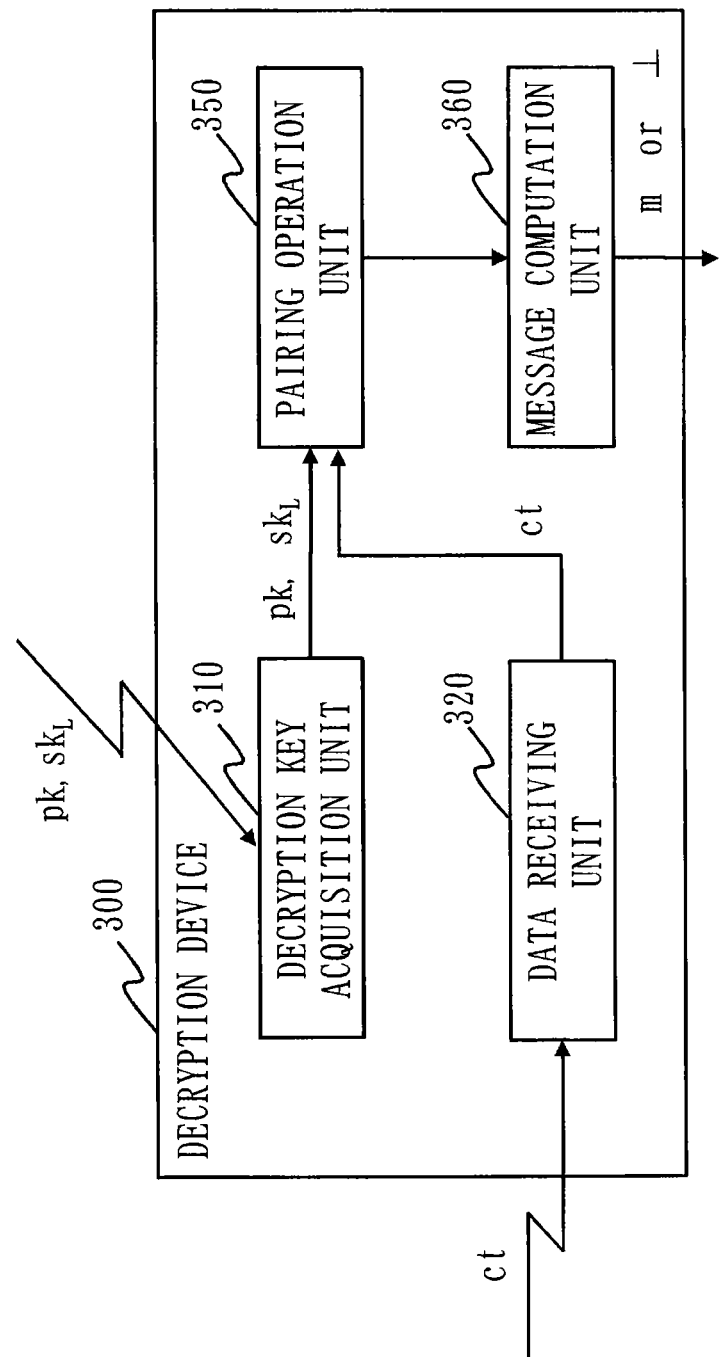
FIG. 23 is a configuration diagram of a decryption device 300 according to Embodiment 4.
Figure 24:
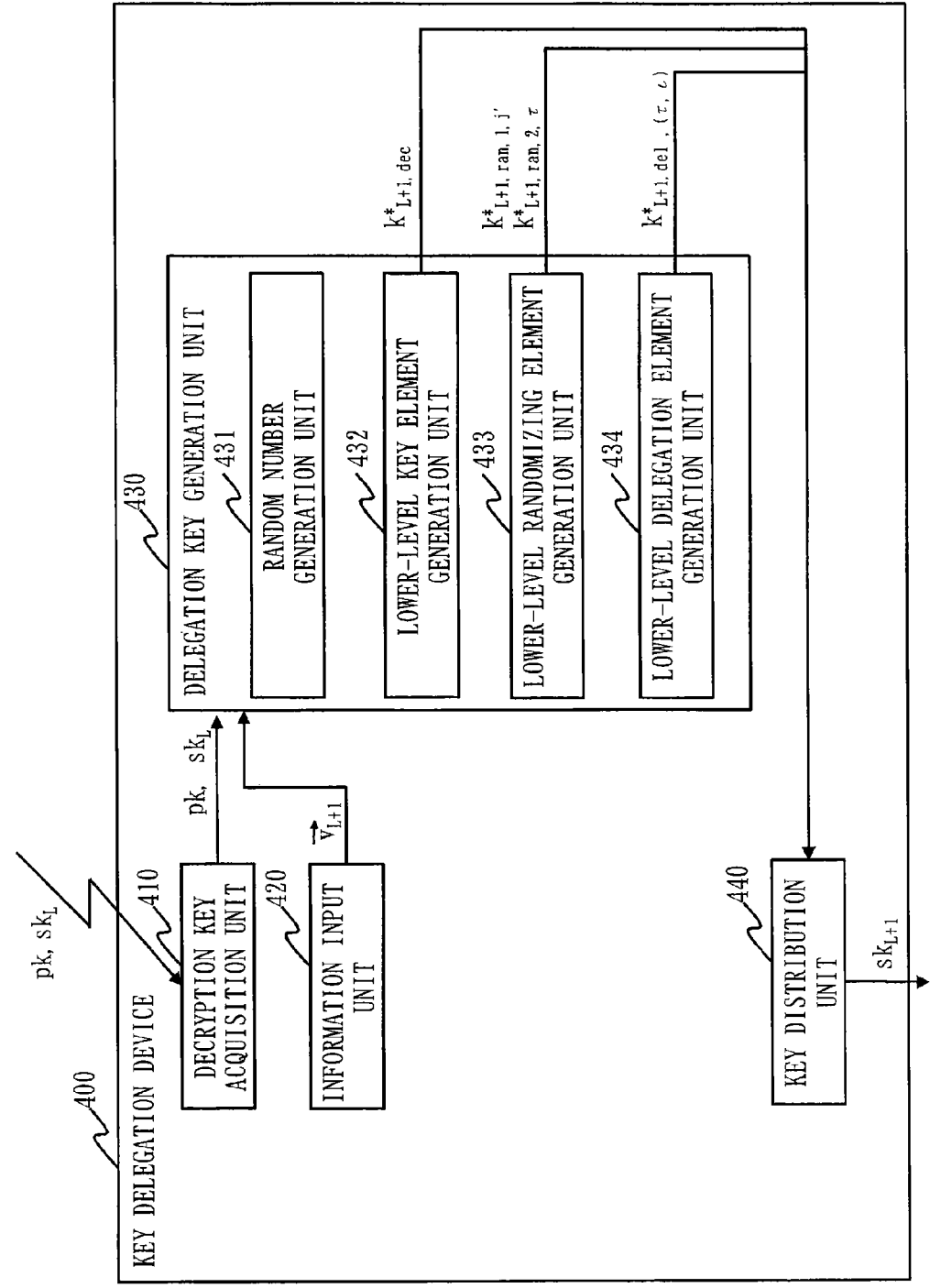
FIG. 24 is a configuration diagram of a key delegation device 400 according to Embodiment 4.

FIG. 21 is a configuration diagram of the key generation device 100 according to Embodiment 4. FIG. 22 is a configuration diagram of the encryption device 200 according to Embodiment 4. FIG. 23 is a configuration diagram of the decryption device 300 according to Embodiment 4. FIG. 24 is a configuration diagram of the key delegation device 400 according to Embodiment 4.

Figure 25:
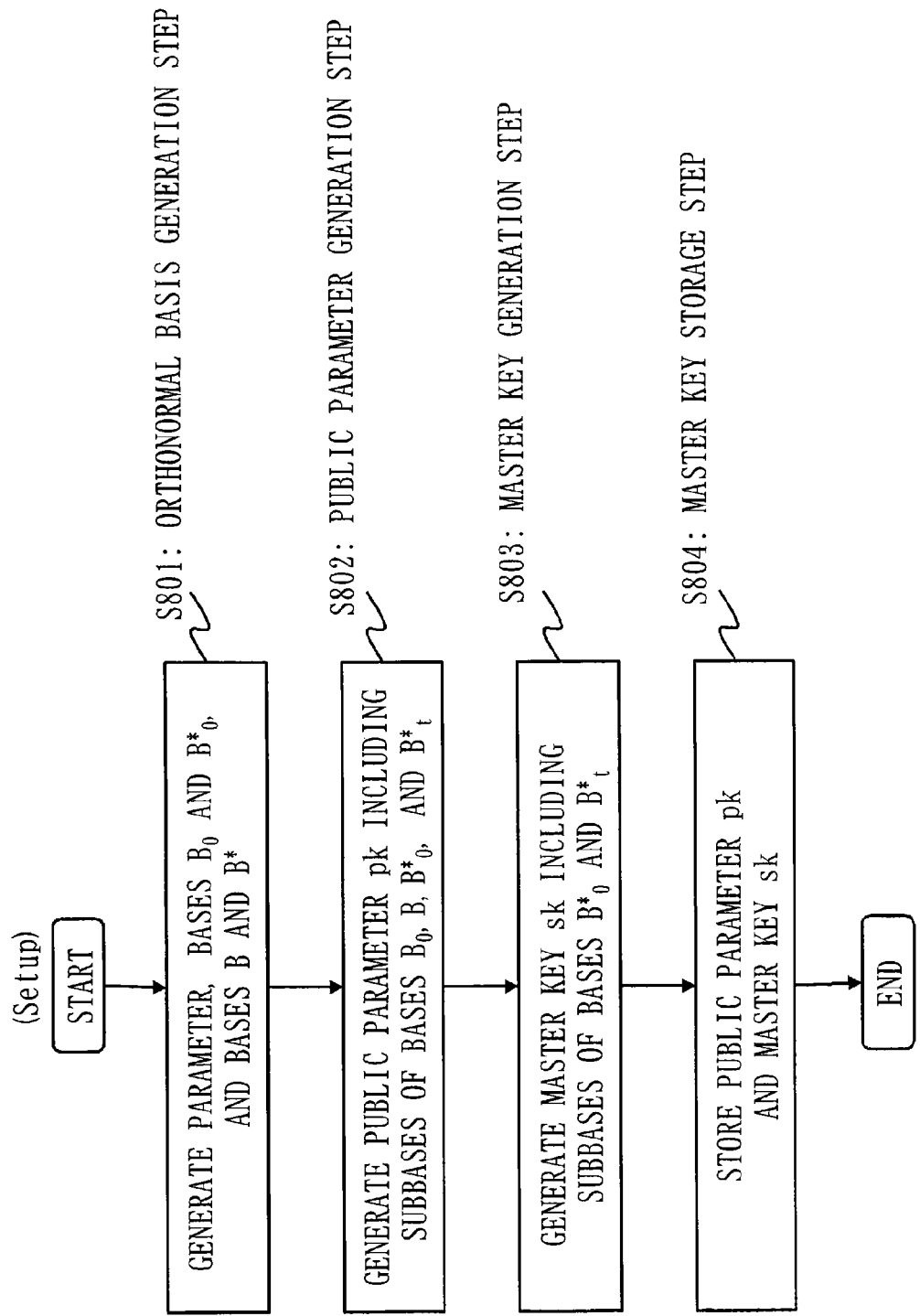
FIG. 25 is a flowchart illustrating the process of a Setup algorithm according to Embodiment 4.
Figure 26:
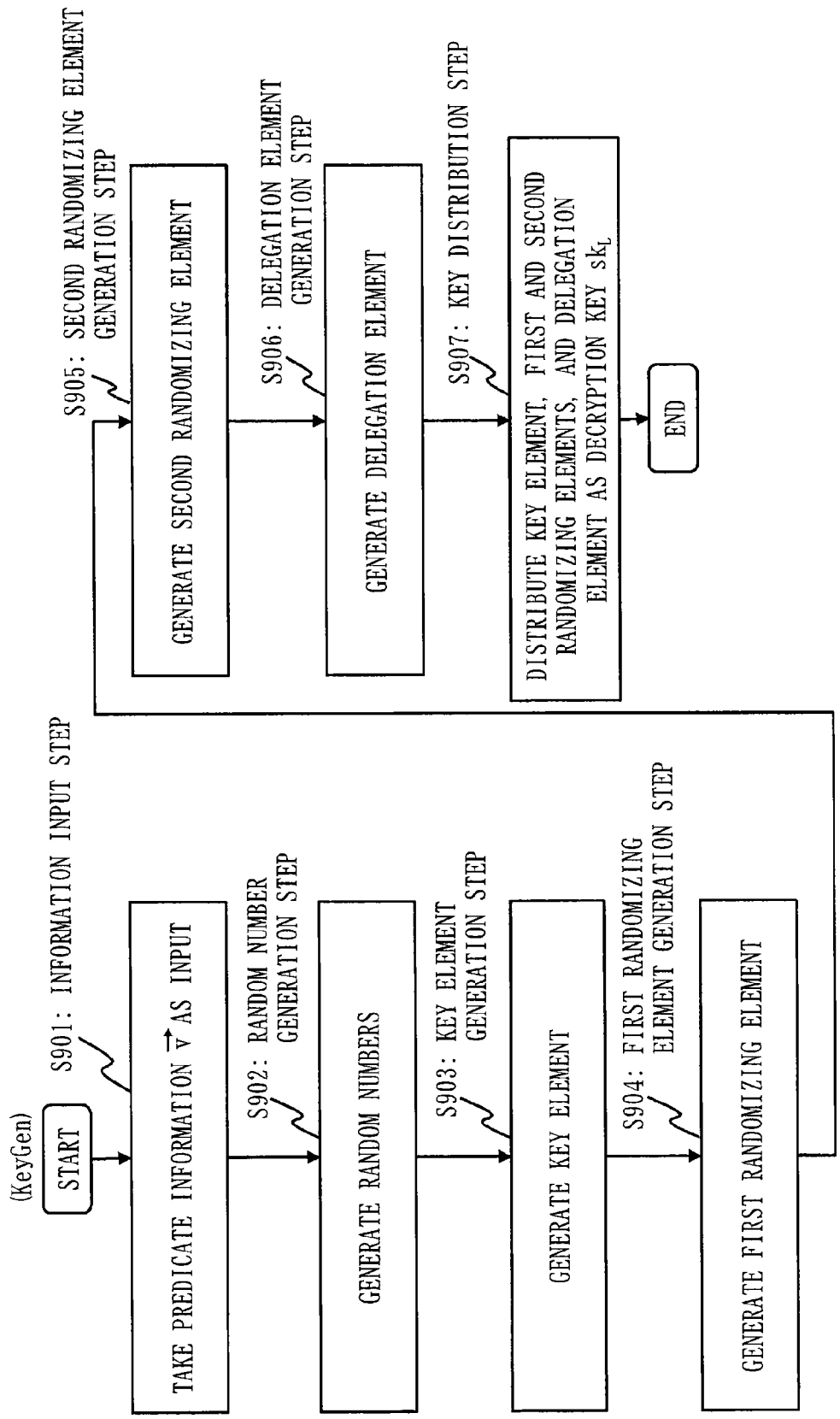
FIG. 26 is a flowchart illustrating the process of a KeyGen algorithm according to Embodiment 4.
Figure 27:
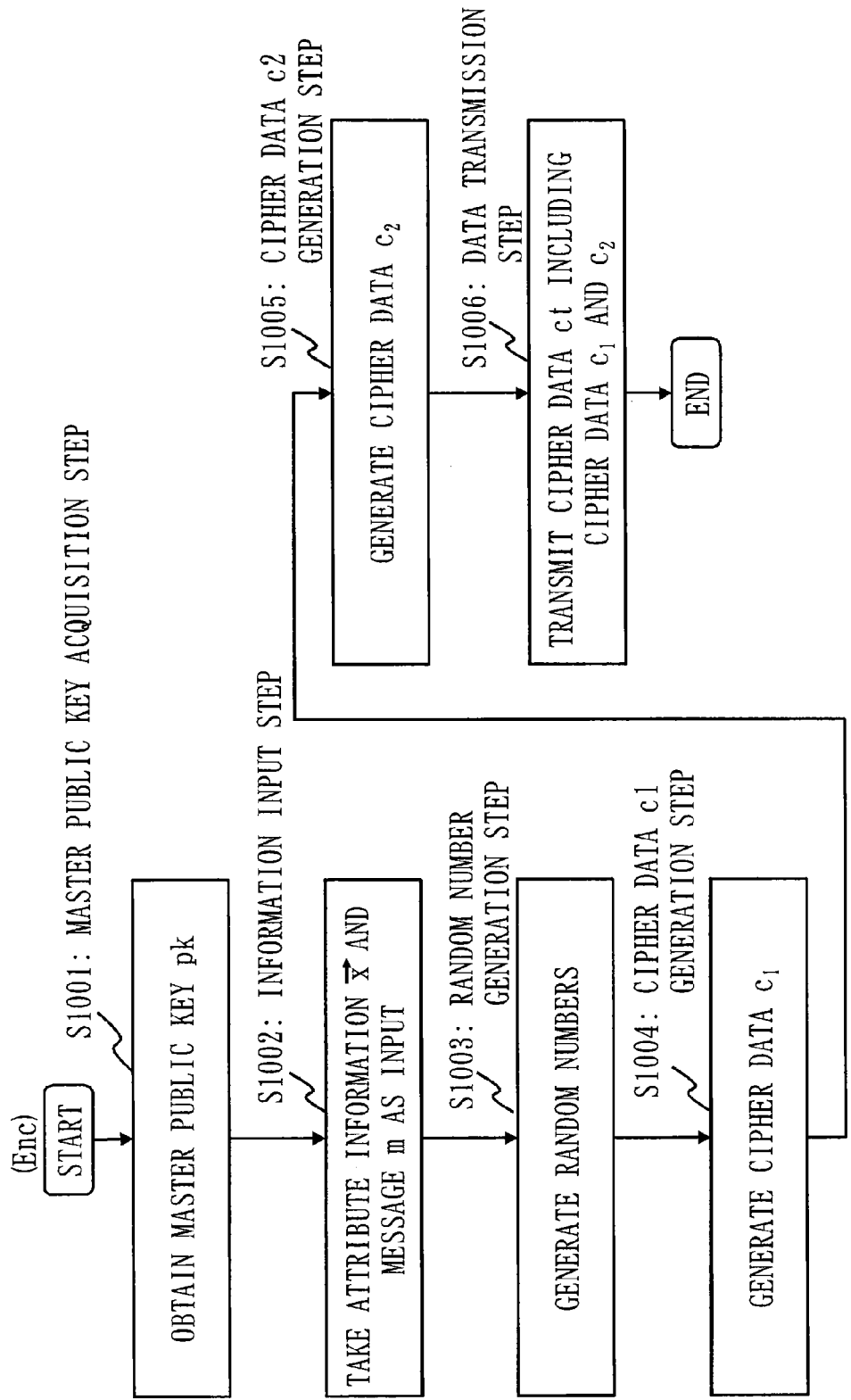
FIG. 27 is a flowchart illustrating the process of an Enc algorithm according to Embodiment 4.
Figure 28:
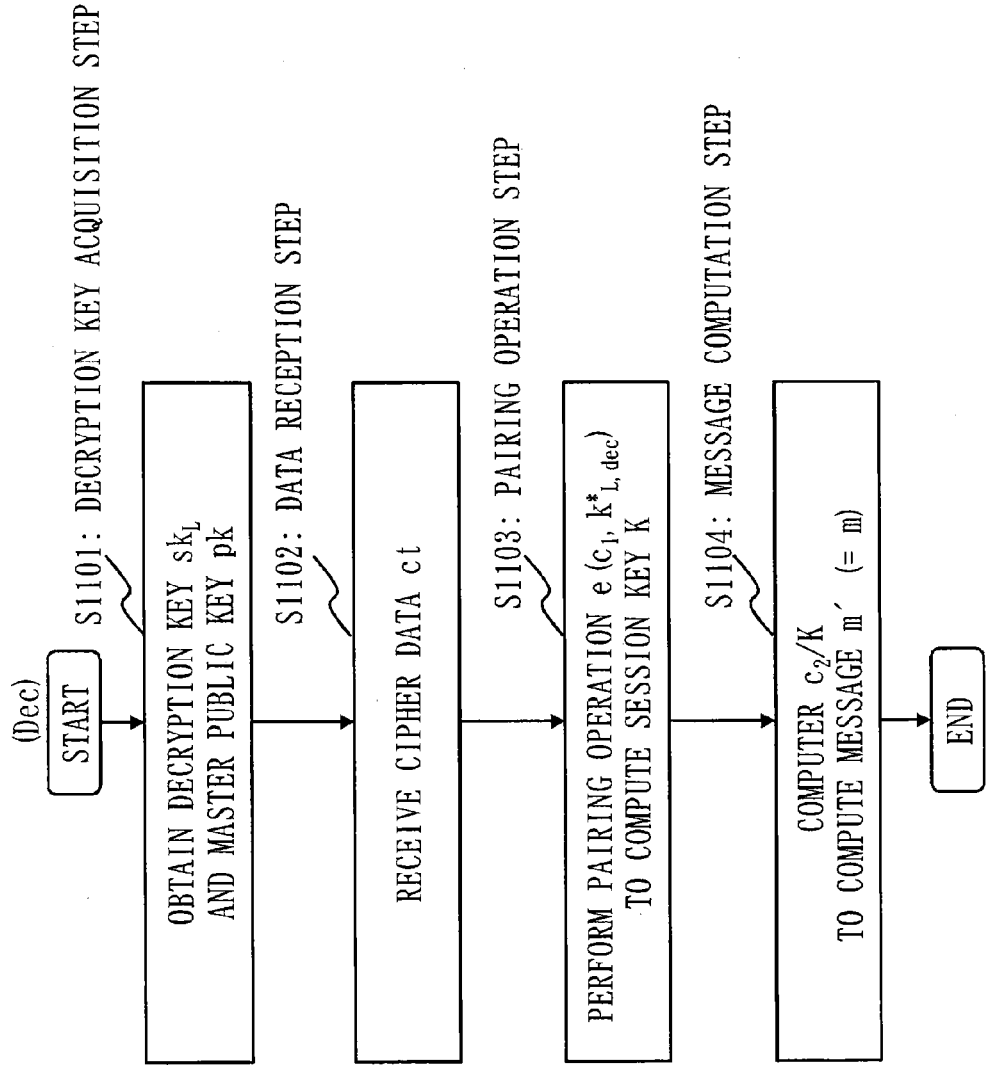
FIG. 28 is a flowchart illustrating the process of a Dec algorithm according to Embodiment 4.
Figure 29:
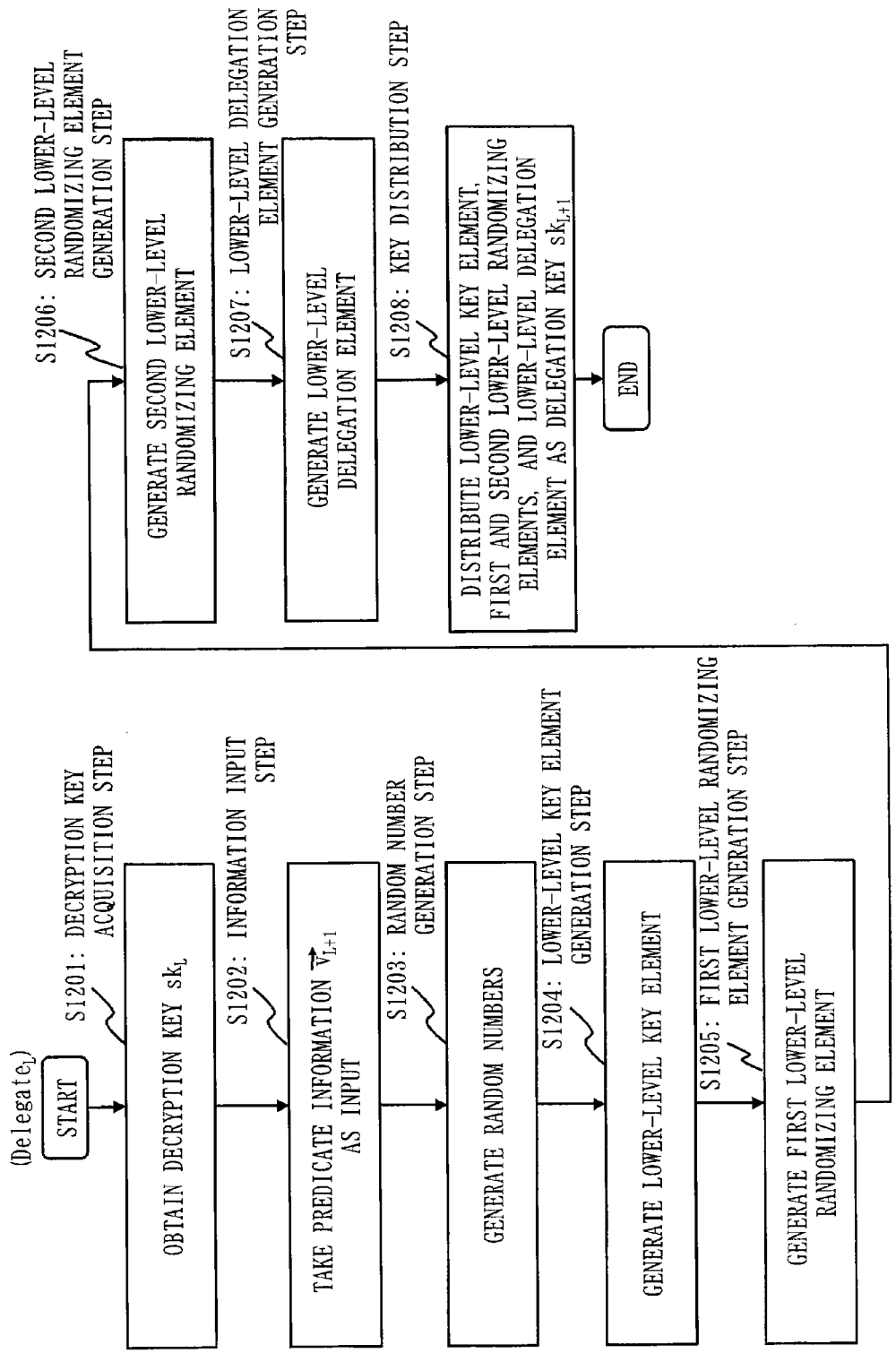
FIG. 29 is a flowchart illustrating the process of a Delegate$_L$ algorithm according to Embodiment 4.

FIGS. 25 and 26 show flowcharts illustrating the operation of the key generation device 100. FIG. 25 is a flowchart illustrating the process of the Setup algorithm. FIG. 26 is a flowchart illustrating the process of the KeyGen algorithm. FIG. 27 is a flowchart illustrating the operation of the encryption device 200 and illustrating the process of the Enc algorithm. FIG. 28 is a flowchart illustrating the operation of the decryption device 300 and illustrating the process of the Dec algorithm. FIG. 29 is a flowchart illustrating the operation of the key delegation device 400 and illustrating the process of the Delegate$_L$ algorithm.

The function and operation of the key generation device 100 will be described.

The key generation device 100 includes a master key generation unit 110, a master key storage unit 120, an information input unit 130, a decryption key generation unit 140, and a key distribution unit 150. The decryption key generation unit 140 includes a random number generation unit 143, a key element generation unit 144, a randomizing element generation unit 145, and a delegation element generation unit 146.

With reference to FIG. 25, the process of the Setup algorithm will be described.

S801 is substantially the same as (S101) in Embodiment 2 shown in FIG. 9.

(S802: Public Parameter Generation Step)

Using the processing device, the master key generation unit 110 generates a subbasis $\hat{B}_0$ of the basis $B_0$, a subbasis $\hat{B}$ of the basis B, a subbasis $\hat{B}^*_{0,pk}$ of the basis $B^*_0$, and a subbasis $\hat{B}^*_{pk}$ of the basis $B^*$, as indicated in Formula 167, the bases $B_0$, $\hat{B}$, B, and $B^*_0$ having been generated in (S801).

$$\hat{\mathbb{B}}_0 := (b_{0,1}, b_{0,1+u_0+1}, b_{0,1+u_0+1+w_0+1}, \ldots, b_{0,1+u_0+1+w_0+z_0}),$$

$$\hat{\mathbb{B}} := (b_1, \ldots, b_{2+n}, b_{2+n+u+w+1}, \ldots, b_{2+n+u+w+z}),$$

$$\hat{\mathbb{B}}^*_{0,pk} = b^*_{0,1+u_0+1+1}, \ldots, b^*_{0,1+u_0+1+w_0},$$

$$\hat{\mathbb{B}}^*_{pk} := (b^*_1, b^*_2, b^*_{2+n+u+1}, \ldots, b^*_{2+n+u+w}) \quad \text{[Formula 167]}$$

The master key generation unit 110 generates a public parameter pk by putting together the generated subbasis $\hat{B}_0$, subbasis $\hat{B}$, subbasis $\hat{B}^*_{0,pk}$, and subbasis $\hat{B}^*_{pk}$, the security parameter $\lambda(1^\lambda)$ inputted in (S801), and param generated in (S801).

(S803: Master Key Generation Step)

Using the processing device, the master key generation unit 110 generates a subbasis $\hat{B}^*_{0,sk}$ of the basis $B^*_0$ and a subbasis $\hat{B}^*_{sk}$ of the basis $B^*$, as indicated in Formula 168, the bases $B^*_0$ and $B^*$ having been generated in (S801).

$$\hat{\mathbb{B}}^*_{0,sk} := (b^*_{0,1}, b^*_{0,1+u_0+1}),$$

$$\hat{\mathbb{B}}^*_{sk} = (b^*_{2+1}, \ldots, b^*_{2+n}) \quad \text{[Formula 168]}$$

The master key generation unit 110 generates a master key sk which is constituted by the generated subbasis $\hat{B}^*_0$ and subbasis $\hat{B}^*$.

(S804: Master Key Storage Step)

The master key storage unit 120 stores the public parameter pk generated in (S802) in the storage device. The master key storage unit 120 also stores the master key sk generated in (S803) in the storage device.

In brief, in (S801) through (S803), the key generation device 100 executes the Setup algorithm indicated in Formula 169, and thus generates the public parameter pk and the master key sk. In (S804), the key generation device 100 stores the generated public parameter pk and master key sk in the storage device.

The public parameter is published via the network, for example, and is made available for the encryption device 200 and the decryption device 300.

$$\text{Setup}(1^\lambda): \quad (\text{param}, (\mathbb{B}_0, \mathbb{B}_0^*), (\mathbb{B}, \mathbb{B}^*)) \xleftarrow{R} \mathcal{G}_{ob}(1^\lambda),$$

$$\hat{\mathbb{B}}_0 :=$$

$$(b_{0,1}, b_{0,1+u_0+1}, b_{0,1+u_0+1+w_0+1}, \cdots, b_{0,1+u_0+1+w_0+z_0}),$$

$$\hat{\mathbb{B}} := (b_1, \cdots, b_{2+n}, b_{2+n+u+w+1}, \cdots, b_{2+n+u+w+z}),$$

$$\hat{\mathbb{B}}_{0,pk}^* := b_{0,1+u_0+1+1}^*, \cdots, b_{0,1+u_0+1+w_0}^*,$$

$$\hat{\mathbb{B}}_{0,sk}^* := (b_{0,1}^*, b_{0,1+u_0+1}^*),$$

$$\hat{\mathbb{B}}_{pk}^* := (b_1^*, b_2^*, b_{2+n+u+1}^*, \cdots, b_{2+n+u+w}^*),$$

$$\hat{\mathbb{B}}_{sk}^* := (b_{2+1}^*, \cdots, b_{2+n}^*),$$

$$\text{return } pk := (1^\lambda, \text{param}, \hat{\mathbb{B}}_0, \hat{\mathbb{B}}, \hat{\mathbb{B}}_{0,pk}^*, \hat{\mathbb{B}}_{pk}^*),$$

$$sk := (\hat{\mathbb{B}}_{0,sk}^*, \hat{\mathbb{B}}_{sk}^*).$$

[Formula 169]

With reference to FIG. 26, the process of the KeyGen algorithm to be executed by the key generation device 100 will be described.

(S901: Information Input Step)

Using the input device, the information input unit 130 takes as input predicate information $(v_1, \ldots, v_L)$. Note that $v_i := v_{i,1}, \ldots, v_{i,n}$ for each integer $i=1, \ldots, L$. Note that the attribute of the user of the key is input as the predicate information.

(S902: Random Number Generation Step)

Using the processing device, the random number generation unit 143 generates random numbers, as indicated in Formula 170.

$$\text{for } j=1, \cdots, 2L; \tau = L+1, \cdots, d; i = 1, \cdots, n;$$

$$\psi, \mu_{dec,t}, \mu_{ran,1,j,t}, s_{dec,t}, s_{ran,1,j,t},$$

$$\theta_{dec,t}, \theta_{ran,1,j,t} \xleftarrow{U} \mathbb{F}_q \text{ for } t = 1, \cdots, L,$$

$$\mu_{del,(\tau,\iota),t}, \mu_{ran,2,\tau,t}, s_{del,(\tau,\iota),t}, s_{ran,2,\tau,t},$$

$$\theta_{del,(\tau,\iota),t}, \theta_{ran,2,\tau,t} \xleftarrow{U} \mathbb{F}_q \text{ for } t = 1, \cdots, L+1,$$

$$\vec{\eta}_{dec,0} := \eta_{dec,0,1}, \cdots, \eta_{dec,0,w_0},$$

$$\vec{\eta}_{ran,1,j,0} := \eta_{ran,1,j,0,1}, \cdots, \eta_{ran,1,j,0,w_0},$$

$$\vec{\eta}_{del,(\tau,\iota),0} := \eta_{del,(\tau,\iota),0,1}, \cdots, \eta_{del,(\tau,\iota),0,w_0},$$

$$\vec{\eta}_{ran,2,\tau,0} := \eta_{ran,2,\tau,0,1}, \cdots, \eta_{ran,2,\tau,0,w_0} \xleftarrow{U} \mathbb{F}_q^{w_0},$$

$$\vec{\eta}_{dec,t} := \eta_{dec,t,1}, \cdots, \eta_{dec,t,w},$$

$$\vec{\eta}_{ran,1,j,t} := \eta_{ran,1,j,t,1}, \cdots,$$

$$\eta_{ran,1,j,t,w} \xleftarrow{U} \mathbb{F}_q^w \text{ for } t = 1, \cdots, L,$$

$$\vec{\eta}_{del,(\tau,\iota),t} := \eta_{del,(\tau,\iota),t,1}, \cdots, \eta_{del,(\tau,\iota),t,w},$$

$$\vec{\eta}_{ran,2,\tau,t} := \eta_{ran,2,\tau,t,1}, \cdots,$$

$$\eta_{ran,2,\tau,t,w} \xleftarrow{U} \mathbb{F}_q^w \text{ for } t = 1, \cdots, L+1$$

[Formula 170]

The random number generation unit 143 also sets $s_{dec,0}$, $s_{ran,1,j,0}$, $s_{ran,2,\tau,0}$, and $s_{del,(\tau,\iota),0}$, as indicated in Formula 171.

$$s_{dec,0} := \Sigma_{t=1}^L s_{dec,t},$$

$$s_{ran,1,j,0} := \Sigma_{t=1}^L s_{ran,1,j,t},$$

$$s_{ran,2,\tau,0} := \Sigma_{t=1}^{L+1} s_{ran,2,\tau,t},$$

$$s_{del,(\tau,\iota),0} := \Sigma_{t=1}^{L+1} s_{del,(\tau,\iota),t}$$

[Formula 171]

(S903: Key Element Generation Step)

Using the processing device, the key element generation unit 144 generates a key element $k^*_{L,dec}$ which is an element of the decryption key $sk_L$, as indicated in Formula 172.

$$k^*_{L,dec} := ((-s_{dec,0}, 0^{u_0}, 1, \vec{\eta}_{dec,0}, 0^{z_0}) \mathbb{B}_{*0}),$$

$$(\mu_{dec,t}(t,-1), s_{dec,t}\vec{e}_1 + \theta_{dec,t}\vec{v}_t, 0^u, \vec{\eta}_{dec,t}, 0^z) \mathbb{B}_*$$

$$:t=1, \ldots, L)$$

[Formula 172]

(S904: First Randomizing Element Generation Step)

Using the processing device, the randomizing element generation unit 145 generates a first randomizing element $k^*_{L,ran,1,j}$ which is an element of the decryption key $sk_L$, for each integer $j=1, \ldots, 2L$, as indicated in Formula 173.

$$k^*_{L,ran,1,j} := ((-s_{ran,1,j,0}, 0^{u_0}, 0, \vec{\eta}_{ran,1,j,0}, 0^{z_0}) \mathbb{B}_{*0},$$

$$(\mu_{ran,1,j,t}(t,-1), s_{ran,1,j,t}\vec{e}_1 + \theta_{ran,1,j,t}\vec{v}_t, 0^u,$$

$$\vec{\eta}_{ran,1,j,t}, 0^z) \mathbb{B}_*: t=1, \ldots, L)$$

[Formula 173]

(S905: Second Randomizing Element Generation Step)

Using the processing device, the randomizing element generation unit 145 generates a second randomizing element $k^*_{L,ran,2,\tau}$ which is an element of the decryption key $sk_L$, for each integer $\tau = L+1, \ldots, d$, as indicated in Formula 174.

$$k^*_{L,ran,2,\tau} := ((-s_{ran,2,\tau,0}, 0^{u_0}, 0, \vec{\eta}_{ran,2,\tau,0}, 0^{z_0}) \mathbb{B}_{*0},$$

$$(\mu_{ran,2,\tau,t}(t,-1), s_{ran,2,\tau,t}\vec{e}_1 + \theta_{ran,2,\tau,t}\vec{v}_t, 0^u,$$

$$\vec{\eta}_{ran,2,\tau,t}, 0^z) \mathbb{B}_*: t=1, \ldots, L,$$

$$(\mu_{ran,2,\tau,L+1}(\tau,-1), s_{ran,2,\tau,L+1}\vec{e}_1, 0^u, \vec{\eta}_{ran,2,\tau,L+1}, 0^z) \mathbb{B}_*)$$ [Formula 174]

(S906: Delegation Element Generation Step)

Using the processing device, the delegation element generation unit 146 generates a delegation element $k^*_{L,del,(\tau,\iota)}$ which is an element of the decryption key $sk_L$, for each integer $\tau = L+1, \ldots, d$, and each integer $\iota = 1, 2$ with respect to each integer $\tau$, as indicated in Formula 175.

$$k^*_{L,del,(\tau,\iota)} := ((-s_{del,(\tau,\iota),0}, 0^{u_0}, 0, \vec{\eta}_{del,(\tau,\iota),0}, 0^{z_0}) \mathbb{B}_{*0},$$

$$(\mu_{del,(\tau,\iota),t}(t,-1), s_{del,(\tau,\iota),t}\vec{e}_1 + \theta_{del,(\tau,\iota),t}\vec{v}_t, 0^u,$$

$$\vec{\eta}_{del,(\tau,\iota),t}, 0^z) \mathbb{B}_*: t=1, \ldots, L,$$

$$(\mu_{del,(\tau,\iota),L+1}(\tau,-1), s_{del,(\tau,\iota),L+1}\vec{e}_1 + \psi\vec{e}_\iota, 0^u,$$

$$\vec{\eta}_{del,(\tau,2),L+1}, 0^z) \mathbb{B}_*)$$

[Formula 175]

(S907: Key Distribution Step)

Using the communication device and via the network, for example, the key distribution unit 150 distributes the decryption key $sk_L$ having, as elements, the key element $k^*_{L,dec}$, the first randomizing element $k^*_{L,ran,1,j}$, the second randomizing element $k^*_{L,ran,2,\tau}$, and the delegation element $k^*_{L,del,(\tau,\iota)}$ to the decryption device 300 in secrecy. As a matter of course, the decryption key $sk_L$ may be distributed to the decryption device 300 by another method.

In brief, in (S901) through (S906), the key generation device 100 executes the KeyGen algorithm indicated in Formula 176 and Formula 177, and thus generates the decryption key $sk_L$. In (S907), the key generation device 100 distributes the generated decryption key $sk_L$ to the decryption device 300.

$$KeyGen(pk, sk, (\vec{v}_1, \cdots, \vec{v}_L) \in \mathbb{F}_q^n \times \cdots \times \mathbb{F}_q^n):$$ [Formula 176]

for $j = 1, \cdots, 2L; \tau = L+1, \cdots, d; t = 1, \cdots, n;$ $\psi, \mu_{dec,t}, \mu_{ran,1,j,t}, s_{dec,t}, s_{ran,1,j,t},$ $\theta_{dec,t}, \theta_{ran,1,j,t} \xleftarrow{U} \mathbb{F}_q$ for $t = 1, \cdots, L,$ $\mu_{del,(\tau,t),t}, \mu_{ran,2,\tau,t}, s_{del,(\tau,t),t}, s_{ran,2,\tau,t},$ $\theta_{del,(\tau,t),t}, \theta_{ran,2,\tau,t} \xleftarrow{U} \mathbb{F}_q$ for $t = 1, \cdots, L+1,$ $s_{dec,0} := \sum_{t=1}^{L} s_{dec,t}, \; s_{del,(\tau,t),0} := \sum_{t=1}^{L+1} s_{del,(\tau,t),t},$ $s_{ran,1,j,0} := \sum_{t=1}^{L} s_{ran,1,j,t}, \; s_{ran,2,\tau,0} := \sum_{t=1}^{L+1} s_{ran,2,\tau,t},$ $\vec{\eta}_{dec,0}, \vec{\eta}_{ran,1,j,0}, \vec{\eta}_{del,(\tau,t),0}, \vec{\eta}_{ran,2,\tau,0} \xleftarrow{U} \mathbb{F}_q^{w_0},$ $\vec{\eta}_{dec,t}, \vec{\eta}_{ran,1,j,t} \xleftarrow{U} \mathbb{F}_q^{w}$ for $t = 1, \cdots, L,$ $\vec{\eta}_{del,(\tau,t),t}, \vec{\eta}_{ran,2,\tau,t} \xleftarrow{U} \mathbb{F}_q^{w}$ for $t = 1, \cdots, L+1,$ $k^*_{L,dec} := ((-s_{dec,0}, 0^{u_0}, 1, \vec{\eta}_{dec,0}, 0^{z_0})_{\mathbb{B}^*_0},$ [Formula 177]

$(\mu_{dec,t}(t,-1), s_{dec,t}\vec{e}_1 + \theta_{dec,t}\vec{v}_t, 0^u, \vec{\eta}_{dec,t}, 0^z)_{\mathbb{B}^*}$:

$t = 1, \cdots, L),$ $k^*_{L,del,(\tau,t)} := ((-s_{del,(\tau,t),0}, 0^{u_0}, 0, \vec{\eta}_{del,(\tau,t),0}, 0^{z_0})_{\mathbb{B}^*_0},$ $(\mu_{del,(\tau,t),t}(t,-1), s_{del,(\tau,t),t}\vec{e}_1 + \theta_{del,(\tau,t),t}\vec{v}_t,$ $0^u, \vec{\eta}_{del,(\tau,t),t}, 0^z)_{\mathbb{B}^*}: t = 1, \cdots, L,$ $(\mu_{del,(\tau,t),L+1}(\tau,-1), s_{del,(\tau,1),L+1}\vec{e}_1 + \psi\vec{e}_t,$ $0^u, \vec{\eta}_{del,(\tau,2),L+1}, 0^z)_{\mathbb{B}^*})$ $k^*_{L,ran,1,j} := ((-s_{ran,1,j,0}, 0^{u_0}, 0, \vec{\eta}_{ran,1,j,0}, 0^{z_0})_{\mathbb{B}^*_0},$ $(\mu_{ran,1,j,t}(t,-1), s_{ran,1,j,t}\vec{e}_1 + \theta_{ran,1,j,t}\vec{v}_t,$ $0^u, \vec{\eta}_{ran,1,j,t}, 0^z)_{\mathbb{B}^*}: t = 1, \cdots, L),$ $k^*_{L,ran,2,\tau} := ((-s_{ran,2,\tau,0}, 0^{u_0}, 0, \vec{\eta}_{ran,2,\tau,0}, 0^{z_0})_{\mathbb{B}^*_0},$ $(\mu_{ran,2,\tau,t}(t,-1), s_{ran,2,\tau,t}\vec{e}_1 + \theta_{ran,2,\tau,t}\vec{v}_t,$ $0^u, \vec{\eta}_{ran,2,\tau,t}, 0^z)_{\mathbb{B}^*}: t = 1, \cdots, L,$ $(\mu_{ran,2,\tau,L+1}(\tau,-1), s_{ran,2,\tau,L+1}\vec{e}_1, 0^u, \vec{\eta}_{ran,2,\tau,L+1}, 0^z)_{\mathbb{B}^*}),$ $sk_L := k^*_{L,dec}, \{k^*_{L,del,(\tau,t)}\}_{\tau=L+1,\cdots,d;t=1,2},$ $\{k^*_{L,ran,1,j}, k^*_{L,ran,2,t}\}_{j=1,\cdots,2L;\tau=L+1,\cdots,d},$ return $sk_L$.

The function and operation of the encryption device 200 will be described.

The encryption device 200 includes a public parameter acquisition unit 210, an information input unit 220, a cipher data generation unit 230, and a data transmission unit 240. The cipher data generation unit 230 includes a random number generation unit 231 and a cipher element generation unit 232.

With reference to FIG. 27, the process of the Enc algorithm to be executed by the encryption device 200 will be described.

(S1001: Master Public Key Acquisition Step)

Using the communication device and via the network, for example, the public parameter acquisition unit 210 obtains the master public key pk generated by the key generation device 100.

(S1002: Information Input Step)

Using the input device, the information input unit 220 takes as input attribute information $(x_1, \ldots, x_L)$, where $x_i := x_{i,1}, \ldots, x_{i,L}$ for each integer $i = 1, \ldots, L$. Note that the attribute of a person capable of decrypting an encrypted message is input as the attribute information.

Using the input device, the information input unit 220 also takes as input a message m to be encrypted.

(S1003: Random Number Generation Step)

Using the processing device, the random number generation unit 231 generates random numbers, as indicated in Formula 178.

$$\omega, \zeta \xleftarrow{U} \mathbb{F}_q, \vec{\varphi}_0 := \varphi_{0,1}, \cdots, \varphi_{0,z_0} \xleftarrow{U} \mathbb{F}_q^{z_0},$$ [Formula 178]

$$\vec{\varphi}_t := \varphi_{t,1}, \cdots, \varphi_{t,z} \xleftarrow{U} \mathbb{F}_q^z, \sigma_t \xleftarrow{U} \mathbb{F}_q \text{ for } t = 1, \cdots, L$$

(S1004: Cipher Element c1 Generation Step)

Using the processing device, the cipher element generation unit 232 generates a cipher element $c_1$ which is an element of a ciphertext ct, as indicated in Formula 179.

$$c_1 := ((\omega, 0^{u_0}, \zeta, 0^{w_0}, \vec{\varphi}_0)_{\mathbb{B}_0}, (\sigma_t(1,t), \omega\vec{x}_t, 0^u, 0^w, \vec{\varphi}_t)_{\mathbb{B}}: t=1, \ldots, L)$$ [Formula 179]

(S1005: Cipher Element c2 Generation Step)

Using the processing device, the cipher element generation unit 232 generates a cipher element $c_2$ which is an element of the ciphertext ct, as indicated in Formula 180.

$$c_2 := g_T^\zeta m$$ [Formula 180]

(S1006: Data Transmission Step)

Using the communication device and via the network, for example, the data transmission unit 240 transmits the ciphertext ct including the cipher element $c_1$ and the cipher element $c_2$ to the decryption device 300. As a matter of course, the ciphertext ct may be transmitted to the decryption device 300 by another method.

In brief, in (S1001) through (S1005), the encryption device 200 executes the Enc algorithm indicated in Formula 181, and thus generates the ciphertext ct. In (S1006), the encryption device 200 transmits the generated ciphertext ct to the decryption device 300.

$$Enc(pk, m \in \mathbb{G}_T, (\vec{x}_1, \cdots, \vec{x}_L) \in \mathbb{F}_q^n \times \cdots \times \mathbb{F}_q^n):$$ [Formula 181]

$\omega, \zeta \xleftarrow{U} \mathbb{F}_q, \vec{\varphi}_0 \xleftarrow{U} \mathbb{F}_q^{z_0},$ for $t = 1, \cdots, L,$ $\vec{\varphi}_t \xleftarrow{U} \mathbb{F}_q^z, \sigma_t \xleftarrow{U} \mathbb{F}_q,$ $c_1 := ((\omega, 0^{u_0}, \zeta, 0^{w_0}, \vec{\varphi}_0)_{\mathbb{B}_0},$ $(\sigma_t(1,t), \omega\vec{x}_t, 0^u, 0^w, \vec{\varphi}_t)_{\mathbb{B}}: t = 1, \cdots, L),$ $c_2 := g_T^\zeta m, ct := (c_1, c_2),$ return $ct$.

The function and operation of the decryption device 300 will be described.

The decryption device 300 includes a decryption key acquisition unit 310, a data receiving unit 320, a pairing operation unit 350, and a message computation unit 360.

With reference to FIG. 28, the process of the Dec algorithm to be executed by the decryption device 300 will be described.

(S1101: Decryption Key Acquisition Step)

Using the communication device and via the network, for example, the decryption key acquisition unit 310 obtains the decryption key $sk_L$. The decryption key acquisition unit 310 also obtains the public parameter pk generated by the key generation device 100.

(S1102: Data Reception Step)

Using the communication device and via the network, for example, the data receiving unit 320 receives the ciphertext ct transmitted by the encryption device 200.

(S1103: Pairing Operation Step)

Using the processing device, the pairing operation unit 350 performs a pairing operation indicated in Formula 182, and thus computes a session key $K = g_T^\zeta$.

$$e(c_1, k^*_{L,dec}) \quad \text{[Formula 182]}$$

(S1104: Message Computation Step)

Using the processing device, the message computation unit 360 computes a message m' (=m) by dividing the cipher element c2 by the session key K.

In brief, in (S1101) through (S1104), the decryption device 300 executes the Dec algorithm indicated in Formula 183, and thus computes the message m' (=m).

$$Dec(pk, k^*_{L,dec}, ct):$$

$$m' := c_2/e(c_1, k^*_{L,dec}),$$

return m'. [Formula 183]

The function and operation of the key delegation device 400 will be described.

The key delegation device 400 includes a decryption key acquisition unit 410, an information input unit 420, a delegation key generation unit 430, and a key distribution unit 440. The delegation key generation unit 430 includes a random number generation unit 431, a lower-level key element generation unit 432, a lower-level randomizing element generation unit 433, and a lower-level delegation element generation unit 434.

With reference to FIG. 29, the process of the Delegate$_L$ algorithm to be executed by the key delegation device 400 will be described.

(S1201: Decryption Key Acquisition Step)

Using the communication device and via the network, for example, the decryption key acquisition unit 410 obtains the decryption key $sk_L$. The decryption key acquisition unit 410 also obtains the public parameter pk generated by the key generation device 100.

(S1202: Information Input Step)

Using the input device, the information input unit 420 takes as input predicate information $v_{L+1} := (v_{L+1,i} (i=1, \ldots, n_{L+1}))$. Note that the attribute of a person to whom the key is to be delegated is input as the predicate information.

(S1203: Random Number Generation Step)

Using the processing device, the random number generation unit 431 generates random numbers, as indicated in Formula 184.

for [Formula 184]

$j' = 1, \ldots, 2(L+1);$ $\tau = L+2, \ldots, d; t = 1, \ldots, n;$

-continued $\mu'_{del,(\tau,t)}, \mu'_{ran,2,\tau}, \phi_{del,(\tau,t)}, \phi_{ran,2,\tau}, \psi' \xleftarrow{U} \mathbb{F}_q,$ $p^*_{dec}, p^*_{del,(\tau,t)}, p^*_{ran,1,j'},$ $$p^*_{ran,2,\tau} \xleftarrow{R} CoreDel_L(pk, sk_L, v_{L+1}),$$

where $CoreDel_L(pk, sk_L, v_{L+1}):$ $\mu'_t, \xi, \alpha_j \xleftarrow{U} \mathbb{F}_q$ for $t = 1, \ldots, L+1;$ $j = 1, \ldots, 2L+1,$ return $$p^* := \sum_{t=1}^{L+1} \mu'_t (tb^*_1 - b^*_2)^{(t)} + \xi \left( \sum_{i=1}^{n} v_{L+1,i} k^*_L, del(L+1, i) \right) +$$

$$\sum_{j=1}^{2L} \alpha_j k^*_{L,ran,1,j} + \alpha_{2L+1} k^*_{L,ran,2,L+1},$$

$r^*_{dec}, r^*_{ran,1,j'} \xleftarrow{U} \text{span}\langle (b^*_{0,1+u_0+1+1}, \ldots, b^*_{0,1+u_0+1+w_0})^{(0)},$ $\{(b^*_{2+n+u+1}, \ldots, b^*_{2+n+u+w})^{(t)}\} t = 1, \ldots, L+1\rangle,$ $r^*_{del,(\tau,t)}, r^*_{ran,2,\tau} \xleftarrow{U} \text{span}\langle (b^*_{0,1+u_0+1+1}, \ldots, b^*_{0,1+u_0+1+w_0})^{(0)},$ $\{(b^*_{2+n+u+1}, \ldots, b^*_{2+n+u+w})^{(t)}\} t = 1, \ldots, L+1\rangle,$ (S1204: Lower-Level Key Element Generation Step)

Using the processing device, the lower-level key element generation unit 432 generates a lower-level key element $k^*_{L+1,dec}$ which is an element of a delegation key $sk_{L+1}$, as indicated in Formula 185.

$$k^*_{L+1,dec} := k^*_{L,dec} + p^*_{dec} + r^*_{dec} \quad \text{[Formula 185]}$$

(S1205: First Lower-Level Randomizing Element Generation Step)

Using the processing device, the lower-level randomizing element generation unit 433 generates a first lower-level randomizing element $k^*_{L+1,ran,1,j'}$ which is an element of the delegation key $sk_{L+1}$, for each integer $j'=1, \ldots, 2(L+1)$, as indicated in Formula 186.

$$k^*_{L+1,ran,1,j'} := p^*_{ran,1,j'} + r^*_{ran,1,j'} \quad \text{[Formula 186]}$$

(S1206: Second Lower-Level Randomizing Element Generation Step)

Using the processing device, the lower-level randomizing element generation unit 433 generates a second lower-level randomizing element $k^*_{L+1,ran,2,\tau}$ which is an element of the delegation key $sk_{L+1}$, for each integer $\tau = L+2, \ldots, d$, as indicated in Formula 187.

$$k^*_{L+1,ran,2,\tau} := p^*_{ran,2,\tau} + \mu'_{ran,2,\tau} (\tau b^*_1 - b^*_2)^{(\tau)}$$

$$+ \phi_{ran,2,\tau} k^*_{L,ran,2,\tau} + r^*_{ran,2,\tau} \quad \text{[Formula 187]}$$

(S1207: Lower-Level Delegation Element Generation Step)

Using the processing device, the lower-level delegation element generation unit 434 generates a lower-level delegation element $k^*_{L+1,del,(\tau,t)}$ which is an element of the delegation key $sk_{L+1}$, for each integer $\tau=L+2,\ldots,d$ and each integer $\iota=1,\ldots,n$ with respect to each integer z, as indicated in Formula 188.

$$k^*_{L+1,del(\tau,\iota)} := p^*_{del(\tau,\iota)} + \mu'_{del(\tau,\iota)}(\tau b^*_1 - b^*_2)^{(\tau)}$$

$$+ \phi_{del,(\tau,\iota)} k^*_{L,ran,2,\tau} + \psi' k^*_{L,del(\tau,\iota)} + r^*_{del(\tau,\iota)} \quad \text{[Formula 188]}$$

(S1208: Key Distribution Step)

Using the communication device and via the network, for example, the key distribution unit 150 distributes the delegation key $sk_{L+1}$ (lower-level decryption key) having, as elements, the lower-level key element $k^*_{L+1,dec}$, the first lower-level randomizing element $k^*_{L+1,ran,1,j'}$, the second lower-level randomizing element $k^*_{L+1,ran,2,\tau}$, and the lower-level delegation element $k^*_{L+1,del,(\tau,\iota)}$ to the lower-level decryption device 300 in secrecy. As a matter of course, the delegation key $sk_{L+1}$ may be distributed to the lower-level decryption device 300 by another method.

In brief, in (S1201) through (S1207), the key delegation device 400 executes the Delegate$_L$ algorithm indicated in Formula 189, and thus generates the delegation key $sk_{L+1}$. In (S1208), the key delegation device 400 distributes the generated delegation key $sk_{L+1}$ to the lower-level decryption device 300.

$Delegate_L(pk, sk_L, \vec{v}_{L+1})$: [Formula 189]

for $j' = 1, \ldots, 2(L+1);$ $\tau = L+2, \ldots, d; \iota = 1, \ldots, n;$ $\mu'_{del(\tau,\iota)}, \mu'_{ran,2,\tau}, \phi_{del,(\tau,\iota)}, \phi_{ran,2,\tau}, \psi' \xleftarrow{U} \mathbb{F}_q,$ $p^*_{dec}, p^*_{del,(\tau,\iota)}, p^*_{ran,1,j'},$ $p^*_{ran,2,\tau} \xleftarrow{R} CoreDel_L(pk, sk_L, v_{L+1}),$ where $CoreDel_L(pk, sk_L, v_{L+1})$:

$\mu'_t, \xi, \alpha_j \xleftarrow{U} \mathbb{F}_q$ for $t = 1, \ldots, L+1;$ $j = 1, \ldots, 2L+1,$ return $p^* := \sum_{t=1}^{L+1} \mu'_t (tb^*_1 - b^*_2)^{(t)} + \xi \left( \sum_{i=1}^{n} v_{L+1,i} k^*_{L,del(L+1,i)} \right) +$ $\sum_{j=1}^{2L} \alpha_j k^*_{L,ran,1,j} + \alpha_{2L+1} k^*_{L,ran,2,L+1},$ $r^*_{dec}, r^*_{ran,1,j'} \xleftarrow{U} \text{span} \langle (b^*_{0,1+u_0+1+1}, \ldots, b^*_{0,1+u_0+1+w_0})^{(0)},$ $\{(b^*_{2+n+u+1}, \ldots, b^*_{2+n+u+w})^{(t)}\}_{t=1,\ldots,L+1} \rangle,$ $r^*_{del,(\tau,\iota)}, r^*_{ran,2,\tau} \xleftarrow{U} \text{span}$ $\langle (b^*_{0,1+u_0+1+1}, \ldots, b^*_{0,1+u_0+1+w_0})^{(0)},$ $\{(b^*_{2+n+u+1}, \ldots, b^*_{2+n+u+w})^{(t)}\}_{t=1,\ldots,L+1,\tau} \rangle,$ $k^*_{L+1,dec} := k^*_{L,dec} + p^*_{dec} + r^*_{dec},$ $k^*_{L+1,dec(\tau,\iota)} := p^*_{del(\tau,\iota)} + \mu'_{del(\tau,\iota)}(\tau b^*_1 - b^*_2)^{(\tau)} +$ $\phi_{del,(\tau,\iota)} k^*_{L,ran,2,\tau} + \psi' k^*_{L,del(\tau,\iota)} + r^*_{del(\tau,\iota)},$ -continued $k^*_{L+1,ran,1,j'} := p^*_{ran,1,j'} + r^*_{ran,1,j'},$ $k^*_{L+1,ran,2,\tau} := p^*_{ran,2,\tau} +$ $\mu^*_{ran,2,\tau}(\tau b^*_1 - b^*_2)^{(\tau)} + \phi_{ran,2,\tau} k^*_{L,ran,2,\tau} + r^*_{ran,2,\tau},$ $sk_{L+1} := (k^*_{L+1,dec}, \{k^*_{L+1,del(\tau,\iota)}\}_{\tau=L+2,\ldots,d;\iota=1,2},$ $\{k^*_{L,ran,1,j'}, k^*_{L,ran,2,\tau}\}_{j'=1,\ldots,2(L+1);\tau=L+2,\ldots,d}),$ return $sk_{L+1}.$ As described above, as in the cryptographic systems 10 according to Embodiments 2 and 3, in the cryptographic system 10 according to Embodiment 4, the index parts are provided, so that the bases that are used for every attribute category can be constructed as the common bases (basis B and basis B*). As a result, only the basis B and the basis B* need to be included in a public parameter, eliminating the need for reissuing the public parameter when an attribute category is to be added at a later stage.

As in Embodiments 2 and 3, for the index parts, it is required that 0 be obtained as a result of an inner-product operation of the index parts. Therefore, although the 2-dimensional index parts, namely the basis vectors $b^*_1$ and $b^*_2$ and the basis vectors $b_1$ and $b_2$, are employed in the above description, the index parts are not limited to 2-dimensional and may be 3-dimensional or higher-dimensional. The values assigned to the index parts are not limited to those described above, and a different assignment arrangement may be employed.

The HIPE scheme based on the functional encryption scheme has been described above. As indicated in Formula 190 through Formula 195, however, the scheme can be modified into an HIPE scheme based on the attribute-based encryption scheme. Note that $N_0$ is $1+1+1+1+1=5$, and $N_1$ is $2+2+8+2+2=16$ in Formula 190 through Formula 195. That is, $u_0=1$, $w_0=1$, $z_0=1$, $n=2$, $u=8$, $w=2$, and $z=2$. Even in this case, security can be proven.

$Setup(1^\lambda)$: [Formula 190]

$(param, (\mathbb{B}_0, \mathbb{B}^*_0), (\mathbb{B}, \mathbb{B}^*)) \xleftarrow{R} \mathcal{G}_{ob}(1^\lambda),$ $\hat{\mathbb{B}}_0 := (b_{0,1}, b_{0,3}, b_{0,5}),$ $\hat{\mathbb{B}} := (b_1, \ldots, b_4, b_{15}, b_{16}),$ $\hat{\mathbb{B}}^*_{0,pk} := b^*_{0,4}, \hat{\mathbb{B}}^*_{0,sk} := (b^*_{0,1}, b^*_{0,3}),$ $\hat{\mathbb{B}}^*_{pk} := (b^*_1, b^*_2, b^*_{13}, b^*_{14}), \hat{\mathbb{B}}^*_{sk} := (b^*_3, b^*_4),$ return $pk := \left(1^\lambda, param, \hat{\mathbb{B}}_0, \hat{\mathbb{B}}, \hat{\mathbb{B}}^*_{0,pk}, \hat{\mathbb{B}}^0_{pk}\right), sk := (\hat{\mathbb{B}}^*_{0,sk}, \hat{\mathbb{B}}^*_{sk}).$ $\mathcal{G}_{ob}(1^\lambda):$ $param_\mathbb{G} := (q, \mathbb{G}, \mathbb{G}_T, g, e) \xleftarrow{R} \mathcal{G}_{bpg}(1^\lambda),$ $\psi \xleftarrow{R} \mathbb{F}^\times_q,$ $N_0 := 5,$ $N_1 := 16,$ for $t = 0, 1,$ -continued $param_{\mathbb{V}_t} :=$ $(q, \mathbb{V}_t, \mathbb{G}_T, \mathbb{A}_t, e) := \mathcal{G}_{dpvs}(1^\lambda, N_t, param_{\mathbb{G}}),$ $X_t := (\chi_{t,i,j})_{i,j=1,\ldots,N_t} \xleftarrow{U} GL(N_t, \mathbb{F}_q),$ $X_t^* := (\vartheta_{t,i,j})_{i,j=1,\ldots,N_t} := \psi \cdot (X_t^T)^{-1},$ hereafter, $\vec{\chi}_{t,i}$ and $\vec{\vartheta}_{t,i}$ denote the $i$-$th$ rows of $X_t$ and $X_t^*$ for $i = 1, \ldots, N_t,$ respectively, $b_{t,i} := (\vec{\chi}_{t,i})_{\mathbb{A}_t} = \sum_{j=1}^{N_t} \chi_{t,i,j} a_{t,j}$ for $i = 1, \ldots, N_t,$ $\mathbb{B}_t := (b_{t,1}, \ldots, b_{t,N_t}),$ $b_{t,i}^* := (\vec{\vartheta}_{t,i})_{\mathbb{A}_t} = \sum_{j=1}^{N_t} \vartheta_{t,i,j} a_{t,j}$ for $i = 1, \ldots, N_t,$ $\mathbb{B}_t^* := (b_{t,1}^*, \ldots, b_{t,N_t}^*),$ $g_T := e(g,g)^\psi,$ $param := (\{param_{\mathbb{V}_t}\}_{t=0,1}, g_T),$ return $(param, \mathbb{B}, \mathbb{B}^*).$ $KeyGen(pk, sk, (v_1, \ldots, v_L) \in \mathbb{F}_q^L):$ [Formula 191]

for $j = 1, \ldots, 2L;$ $\tau = L+1, \ldots, d;$ $\iota = 1, 2;$ $\psi, \mu_{dec,t}, \mu_{ran,1,j,t}, s_{dec,t}, s_{ran,1,j,t},$ $\theta_{dec,t}, \theta_{ran,1,j,t} \xleftarrow{U} \mathbb{F}_q$ for $t = 1, \ldots, L,$ $\mu_{del,(\tau,\iota),t}, \mu_{ran,2,\tau,t}, s_{del,(\tau,\iota),t}, s_{ran,2,\tau,t},$ $\theta_{del,(\tau,\iota),t}, \theta_{ran,2,\tau,t} \xleftarrow{U} \mathbb{F}_q$ for $t = 1, \ldots, L+1,$ $s_{dec,0} := \sum_{t=1}^{L} s_{dec,t}, \quad s_{del,(\tau,\iota),0} := \sum_{t=1}^{L} s_{del,(\tau,\iota),t},$ $s_{ran,1,j,0} := \sum_{t=1}^{L} s_{ran,1,j,t}, \quad s_{ran,2,\tau,0} := \sum_{t=1}^{L+1} s_{ran,2,\tau,t},$ $\vec{\eta}_{dec,t}, \vec{\eta}_{ran,1,j,t} \xleftarrow{U} \mathbb{F}_q^2$ for $t = 0, \ldots, L,$ $\vec{\eta}_{del,(\tau,\iota),t}, \vec{\eta}_{ran,2,\tau,t} \xleftarrow{U} \mathbb{F}_q^2$ for $t = 0, \ldots, L+1,$ -continued $k_{L,dec}^* := \big((-s_{dec,0}, 0, 1, \eta_{dec,0}, 0)_{\mathbb{B}_0^*},$ [Formula 192]

$(\mu_{dec,t}(t,-1), s_{dec,t} + \theta_{dec,t} v_t, -\theta_{dec,t}, 0^8, \vec{\eta}_{dec,t}, 0^2)_{\mathbb{B}^*}$ $: t = 1, \ldots, L\big),$ $k_{L,del(\tau,\iota)}^* := \big((-s_{del,(\tau,\iota),0}, 0, 0, \eta_{del,(\tau,\iota),0}, 0)_{\mathbb{B}_0^*}$ $(\mu_{del,(\tau,\iota),t}(t,-1)s_{del,(\tau,\iota),t} + \theta_{del,(\tau,\iota),t} v_t,$ $-\theta_{del,(\tau,\iota),t}, 0^8, \vec{\eta}_{del,(\tau,\iota),t}, 0^2)_{\mathbb{B}^*} : t = 1, \ldots,$ $L, (\mu_{del,(\tau,\iota),L+1}(\tau,-1), \pi_{del,(\tau,\iota),L+1,1}, \pi_{del,(\tau,\iota),L+1,2},$ $0^8, \vec{\eta}_{del,(\tau,2),L+1}, 0^2)\eta_{del,(\tau,2),L+1}, 0^2)_{\mathbb{B}^*}\big)$ where, $(\pi_{del,(\tau,\iota),L+1,1}, \pi_{del,(\tau,\iota),L+1,2}) :=$ $\begin{cases} (s_{del,(\tau,1),L+1} + \psi, 0) & \text{if } \iota = 1, \\ (s_{del,(\tau,2),L+1}, \psi) & \text{if } \iota = 2, \end{cases}$ $k_{L,ran,1,j}^* := \big((-s_{ran,1,j,0}, 0, 0, \eta_{ran,1,j,0}, 0)_{\mathbb{B}_0^*},$ $(\mu_{ran,1,j,t}(t,-1), s_{ran,1,j,t} + \theta_{ran,1,j,t} v_t, -\theta_{ran,1,j,t},$ $0^8, \vec{\eta}_{ran,1,j,t}, 0^2)_{\mathbb{B}^*} : t = 1, \ldots, L\big),$ $k_{L,ran,2,\tau}^* := \big((-s_{ran,2,\tau,0}, 0, 0, \eta_{ran,2,\tau,0}, 0)_{\mathbb{B}_0^*},$ $(\mu_{ran,2,\tau,t}(t,-1), s_{ran,2,\tau,t} + \theta_{ran,2,\tau,t} v_t,$ $-\theta_{ran,2,\tau,t}, 0^8, \vec{\eta}_{ran,2,\tau,t}, 0^2)_{\mathbb{B}^*} : t = 1,$ $\ldots, L, (\mu_{ran,2,\tau,L+1}(\tau,-1), s_{ran,2,\tau,L+1}, 0,$ $0^8, \vec{\eta}_{ran,2,\tau,L+1}, 0^2)_{\mathbb{B}^*}\big),$ $sk_L := \big(k_{L,dec}^*, \{k_{L,del(\tau,\iota)}^*\}_{\tau=L+1,\ldots,d;\iota=1,2},$ $\{k_{L,ran,1,j}^*, k_{L,ran,2,\tau}^*\}_{j=1,\ldots,2L;\tau=L+1,\ldots,d}\big),$ return $sk_L.$ $Enc(pk, m \in \mathbb{G}_T, (x_1, \ldots, x_L) \in \mathbb{F}_q^L):$ [Formula 193]

$\omega, \zeta, \varphi_0, \varphi_{t,1}, \varphi_{t,2}, \sigma_t \xleftarrow{U} \mathbb{F}_q$ for $t = 1, \ldots, L,$ $c_1 := \big((\omega, 0, \zeta, 0, \varphi_0)_{\mathbb{B}_0},$ $(\sigma_t(1,t)\omega(1,x_t), 0^8, 0^2, \varphi_{t,1}, \varphi_{t,2})_{\mathbb{B}} : t = 1,$ $\ldots, L\big),$ $c_2 := g_T^\zeta m,$ $ct := (c_1, c_2),$ return $ct.$ $Dec(pk, k_{L,dec}^*, ct):$ [Formula 194]

$m' := c_2 / e(c_1, k_{L,dec}^*),$ return $m'.$

-continued

Delegate$_L$(pk, sk$_L$, v$_{L+1}$):   [Formula 195]

for $j' = 1, \ldots, 2(L+1)$;

$\tau = L+2, \ldots, d; \iota = 1, 2$;

$\mu'_{del,(\tau,\iota)}, \mu'_{ran,2,\tau}, \phi_{del,(\tau,\iota)}, \phi_{ran,2,\tau}, \psi' \xleftarrow{U} \mathbb{F}_q$, $p^*_{dec}, p^*_{del,(\tau,\iota)}, p^*_{ran,1,j'}$, $p^*_{ran,2,\tau} \xleftarrow{R} CoreDel_L(pk, sk_L, v_{L+1})$, where CoreDel$_L$(pk, sk$_L$, v$_{L+1}$):

$\mu'_t, \xi, \alpha_j \xleftarrow{U} \mathbb{F}_q$ for $t = 1, \ldots, L+1$;

$j = 1, \ldots, 2L+1$, return $p^* := \sum_{t=1}^{L+1} \mu'_t (tb_1^* - b_2^*)^{(t)} + \xi(v_{L+1} k^*_{L,del(L+1,1)} - k^*_{L,del(L+1,2)}) +$ $\sum_{j=1}^{2L} \alpha_j k^*_{L,ran,1,j} + \alpha_{2L+1} k^*_{L,ran,2,L+1}$, $r^*_{dec}, r^*_{ran,1,j'} \xleftarrow{U} \text{span}\langle (b^*_{0,4})^{(0)}, \{(b^*_{13})^{(t)}, (b^*_{14})^{(t)}\}_{t=1,\ldots,L+1}\rangle$, $r^*_{del,(\tau,\iota)}$, $r^*_{ran,2,\tau} \xleftarrow{U} \text{span}\langle (b^*_{0,4})^{(0)}, \{(b^*_{13})^{(t)}, (b^*_{14})^{(t)}\}_{t=1,\ldots,L+1,\tau}\rangle$, $k^*_{L+1,dec} := k^*_{L,dec} + p^*_{dec} + r^*_{dec}$, $k^*_{L+1,dec(\tau,\iota)} := p^*_{del(\tau,\iota)} + \mu'_{del(\tau,\iota)} (\tau b_1^* - b_2^*)^{(\tau)} +$ $\phi_{del,(\tau,\iota)} k^*_{L,ran,2,\tau} + \psi' k^*_{L,del(\tau,\iota)} + r^*_{del(\tau,\iota)}$, $k^*_{L+1,ran,1,j'} := p^*_{ran,1,j'} + r^*_{ran,1,j'}$, $k^*_{L+1,ran,2,\tau} := p^*_{ran,2,\tau} +$ $\mu^*_{ran,2,\tau} (\tau b_1^* - b_2^*)^{(\tau)} + \phi_{ran,2,\tau} k^*_{L,ran,2,\tau} + r^*_{ran,2,\tau}$, $sk_{L+1} := (k^*_{L+1,dec}, \{k^*_{L+1,del(\tau,\iota)}\}_{\tau=L+2,\ldots,d;\iota=1,2},$ $\{k^*_{L,ran,1,j'}, k^*_{L,ran,2,\tau}\}_{j'=1,\ldots,2(L+1);\tau=L+2,\ldots,d})$, return sk$_{L+1}$.

Embodiment 5

This embodiment describes a signature scheme. In particular, this embodiment describes a signature scheme based on the CP-FE scheme described in Embodiment 3.

First, the construction of the signature scheme will be described.

Second, the configuration of a cryptographic system 10 that implements the signature scheme will be described.

Third, the signature scheme will be described in detail.

<1. Construction of Signature Scheme>

The signature scheme consists of four algorithms: Setup, KeyGen, Sig, and Ver.

(Setup)

A Setup algorithm is a probabilistic algorithm that takes as input a security parameter $\lambda$, and outputs a public parameter pk and a master key sk.

(KeyGen)

A KeyGen algorithm is a probabilistic algorithm that takes as input an attribute set $\Gamma := \{(t, x_t) | x_t \in \mathbb{F}_q^{n_t}, 1 \leq t \leq d\}$, the public parameter pk, and the master key sk, and outputs a signature key sk$_\Gamma$.

(Sig)

A Sig algorithm is a probabilistic algorithm that takes as input a message m, the signature key sk$_\Gamma$, an access structure $S := (M, \rho)$, and the public parameter pk, and outputs signature data sig.

(Ver)

A Ver algorithm is an algorithm that takes as input the message m, the access structure $S := (M, \rho)$, the signature data sig, and the public parameter pk, and outputs a value "1" indicating success of verification of the signature, or a value "0" indicating failure of verification of the signature.

<2. Configuration of Cryptographic System 10 that Implements Signature Scheme>

Figure 30:
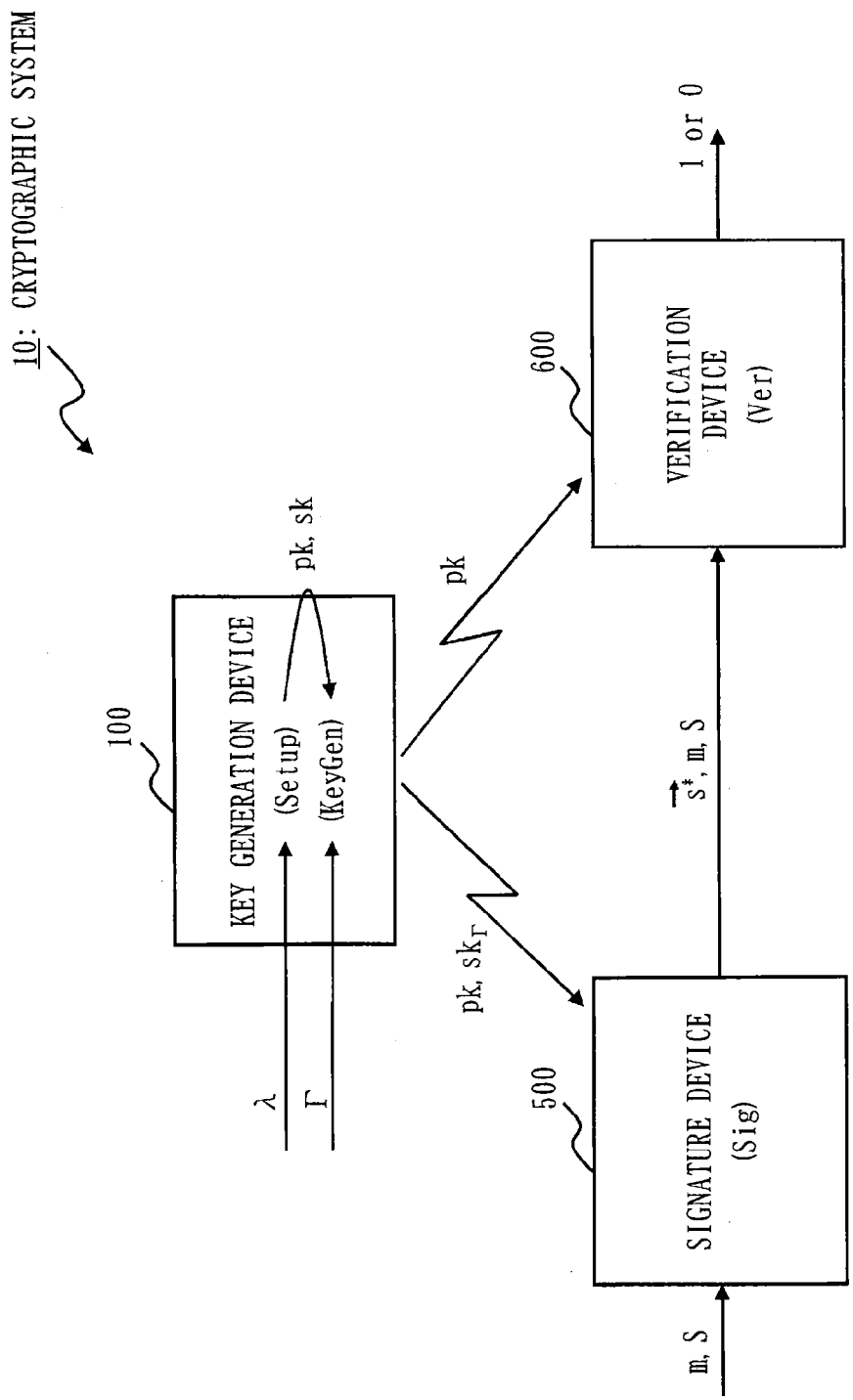
FIG. 30 is a configuration diagram of a cryptographic system 10 that implements a signature scheme according to Embodiment 5.

FIG. 30 is a configuration diagram of the cryptographic system 10 that implements the signature scheme according to Embodiment 5.

The cryptographic system 10 includes a key generation device 100, a signature device 500, and a verification device 600.

The key generation device 100 executes the Setup algorithm taking as input a security parameter $\lambda$, and thus generates a public parameter pk and a master key sk. Then, the key generation device 100 publishes the generated public parameter pk. The key generation device 100 also executes the KeyGen algorithm taking as input an attribute set $\Gamma$, and thus generates a signature key sk$_\Gamma$, and distributes the signature key sk$_\Gamma$ to the signature device 500 in secrecy.

The signature device 500 executes the Sig algorithm taking as input a message m, an access structure S, the public parameter pk, and the signature key sk$_\Gamma$, and thus generates signature information s*. The signature device 500 transmits the generated signature information s*, the message m, and the access structure S to the verification device 600.

The verification device 600 executes the Ver algorithm taking as input the signature information s*, the message m, the access structure S, and the public parameter pk, and outputs a value "1" or a value "0".

<3. Signature Scheme in Detail>

With reference to FIGS. 31 to 37, the signature scheme will be described, and the function and operation of the cryptographic system 10 that implements the signature scheme will be described.

Figure 31:
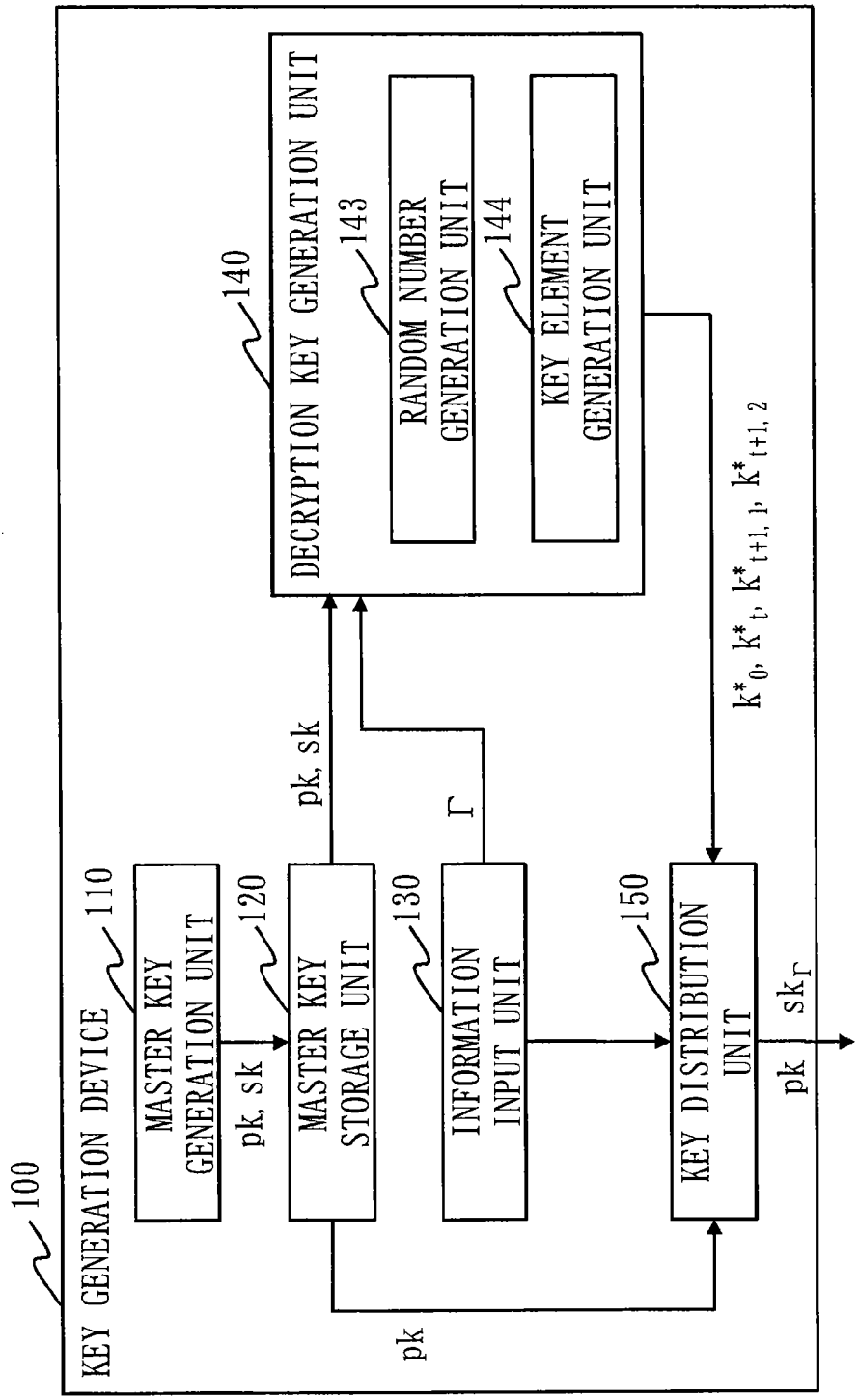
FIG. 31 is a configuration diagram of a key generation device 100 according to Embodiment 5.
Figure 32:
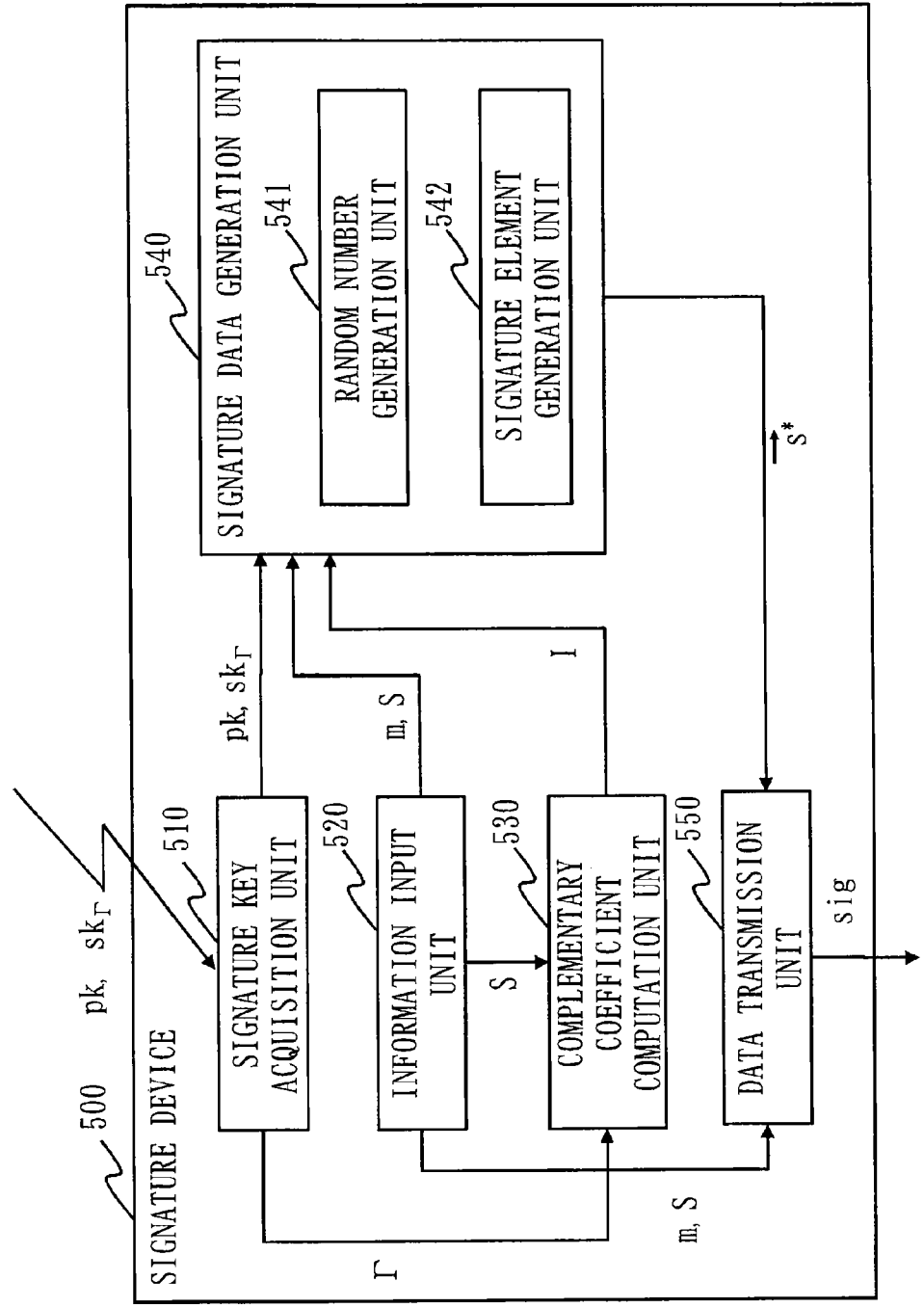
FIG. 32 is a configuration diagram of a signature device 500 according to Embodiment 5.
Figure 33:
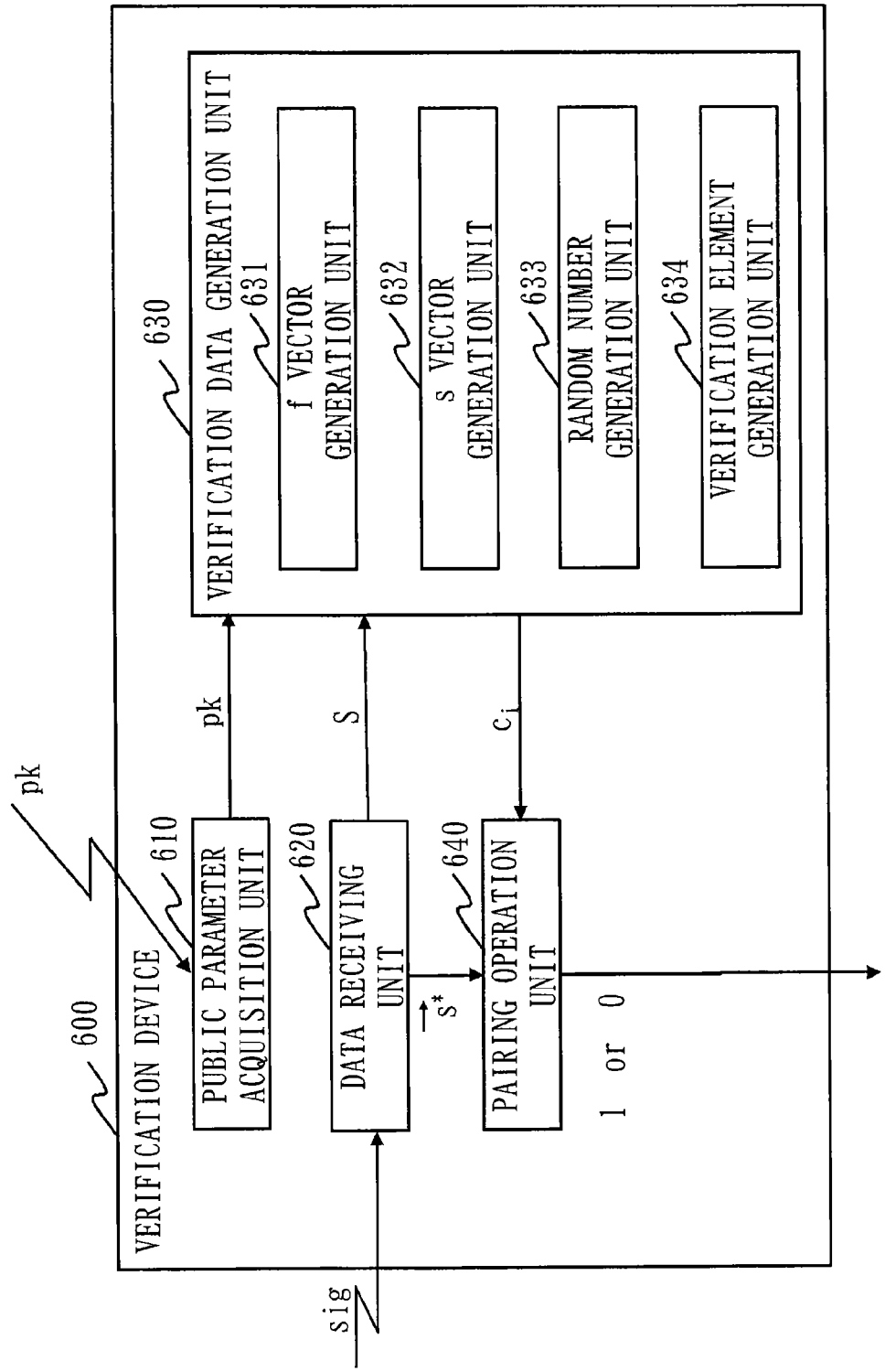
FIG. 33 is a configuration diagram of a verification device 600 according to Embodiment 5.

FIG. 31 is a configuration diagram of the key generation device 100 according to Embodiment 5. FIG. 32 is a configuration diagram of the signature device 500 according to Embodiment 5. FIG. 33 is a configuration diagram of the verification device 600 according to Embodiment 5.

Figure 34:
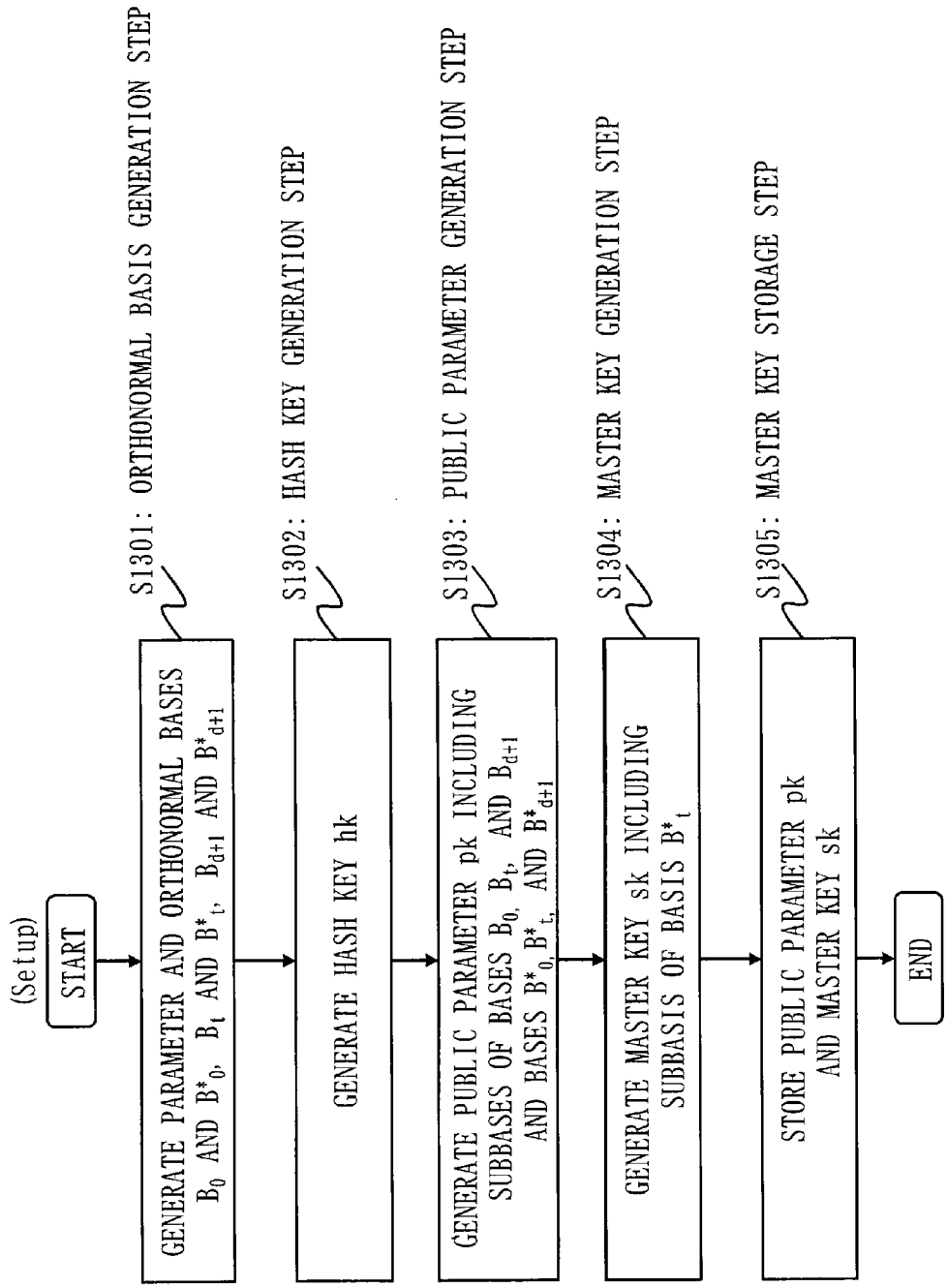
FIG. 34 is a flowchart illustrating the process of a Setup algorithm according to Embodiment 5.
Figure 35:
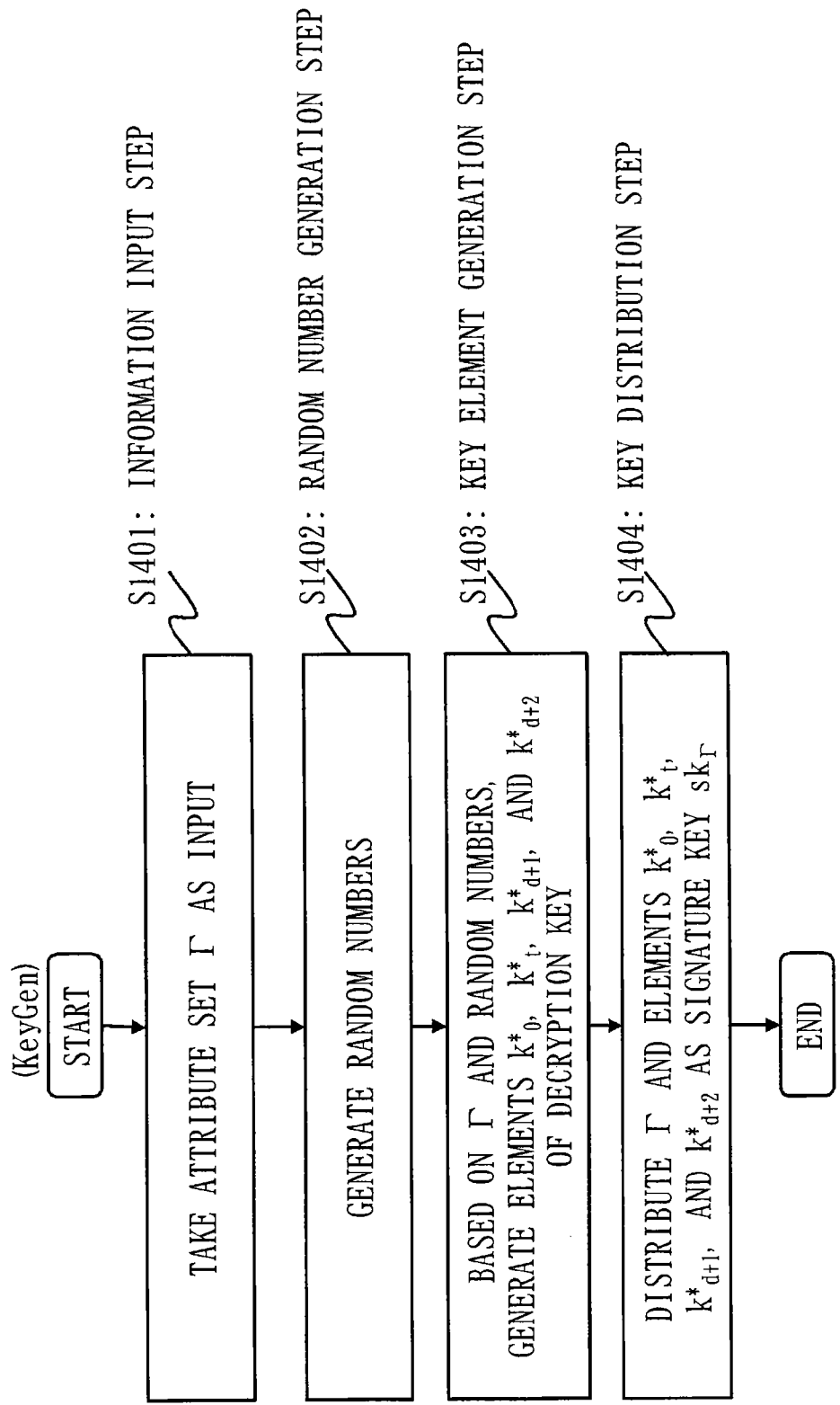
FIG. 35 is a flowchart illustrating the process of a KeyGen algorithm according to Embodiment 5.
Figure 36:
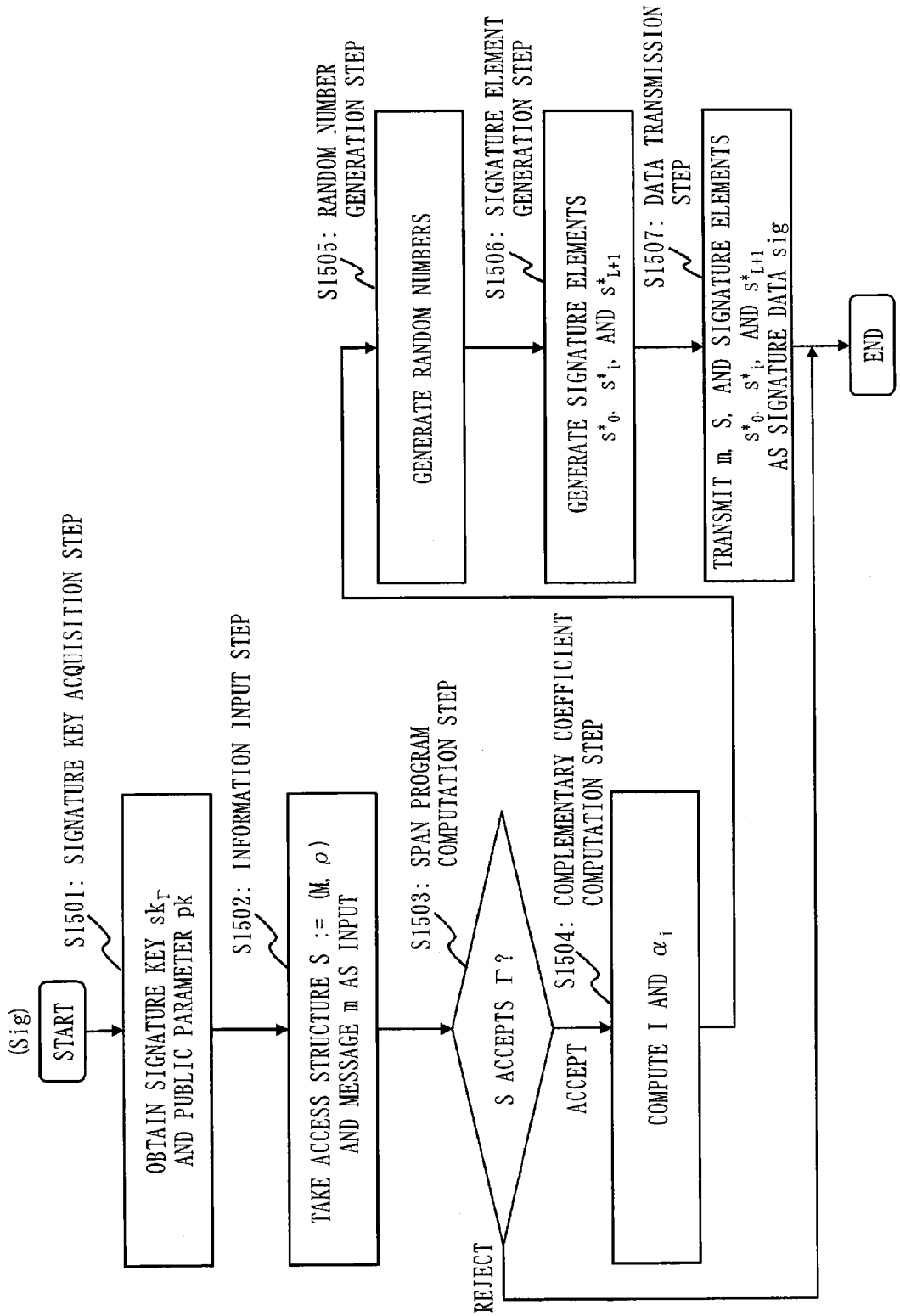
FIG. 36 is a flowchart illustrating the process of a Sig algorithm according to Embodiment 5.
Figure 37:
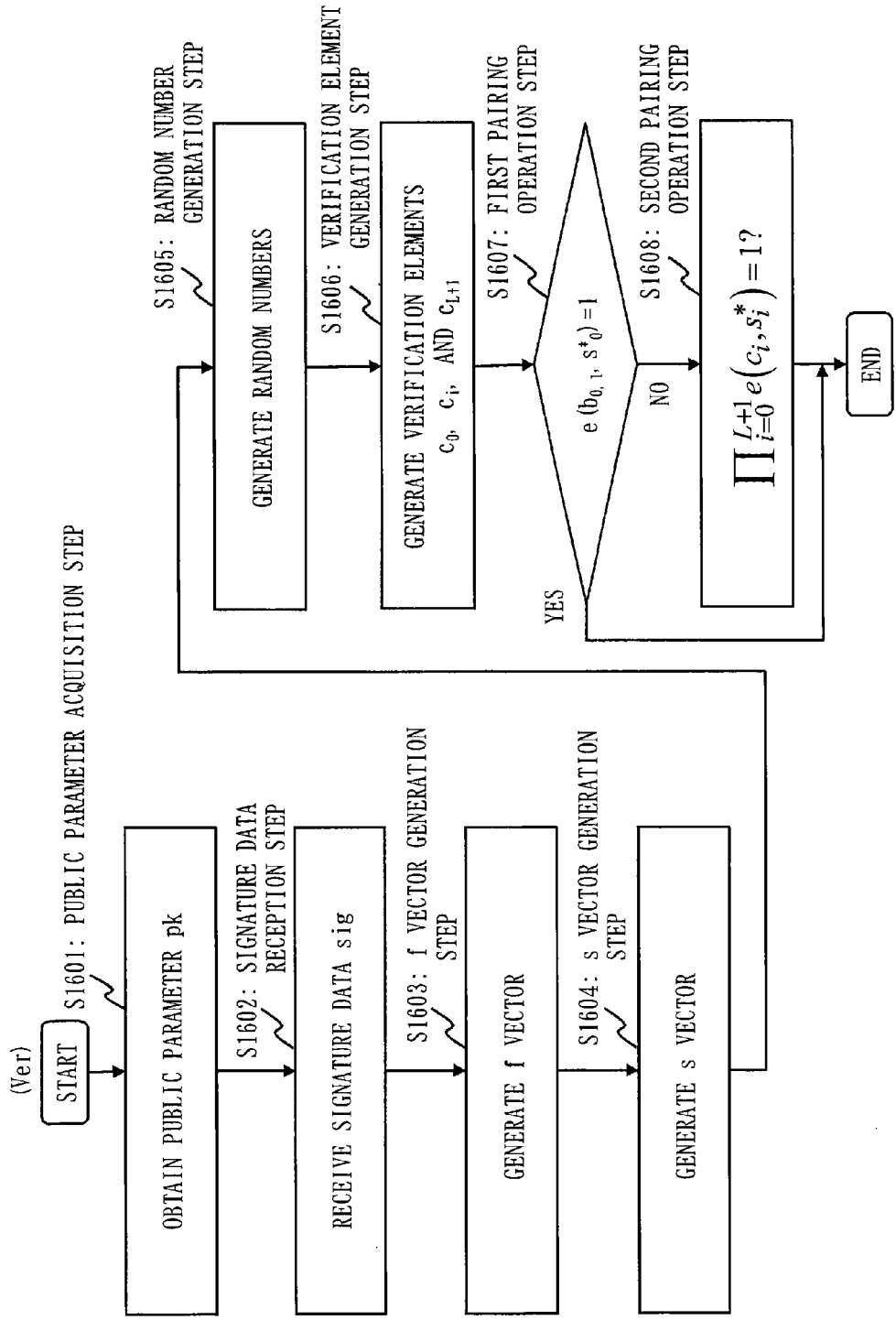
FIG. 37 is a flowchart illustrating the process of a Ver algorithm according to Embodiment 5.

FIGS. 34 and 35 show flowcharts illustrating the operation of the key generation device 100. FIG. 34 is a flowchart illustrating the process of the Setup algorithm. FIG. 35 is a flowchart illustrating the process of the KeyGen algorithm. FIG. 36 is a flowchart illustrating the operation of the signature device 500 and illustrating the process of the Sig algorithm. FIG. 37 is a flowchart illustrating the operation of the verification device 600 and illustrating the process of the Ver algorithm.

In the following description, $H := (KH_\lambda, H_{hk}^{\lambda,D})$ is a collision resistant hash function (see Non-Patent Literature 30). A collision resistant hash function is a hash function for which it is difficult to find two inputs that hash to the same output.

Specifically, a collision resistant hash function family H associated with the algorithm $G_{bpg}$ and a polynomial poly($\lambda$) specify two items:

1. A family of key spaces is indexed by $\lambda$. Each such key space is a probability space on bit strings denoted by $KH_\lambda$. There must exist a probabilistic polynomial-time algorithm whose output distribution on input $1^\lambda$ is equal to $KH_\lambda$.

2. A family of hash functions is indexed by λ, hk randomly selected from $KH_\lambda$, and $D:=\{0, 1\}^{poly(\lambda)}$, where each such function $H_{hk}^{\lambda,D}$ maps an element of D to an element of $F_q^x$ with q being the first element of output $param_G$ of algorithm $G_{bpg}(1^\lambda)$. There must exist a deterministic polynomial-time algorithm that outputs $H_{hk}^{\lambda,D}(d)$ on input $1^\lambda$, hk, and d∈D.

The function and operation of the key generation device 100 will be described.

The key generation device 100 includes a master key generation unit 110, a master key storage unit 120, an information input unit 130, a decryption key generation unit 140, and a key distribution unit 150. The decryption key generation unit 140 includes a random number generation unit 143 and a key element generation unit 144.

With reference to FIG. 34, the process of the Setup algorithm will be described.

(S1301) is basically the same as (S101) in Embodiment 2 shown in FIG. 9. There are differences, however, in that the process of (4) through (8) is executed for t=0, 1, and d+1 and that $N_0$ is $1+u_0+w_0+z_0$. Note that $N_{d+1}$ is $2+u_{d+1}+w_{d+1}+z_{d+1}$ and that $u_{d+1}$, $w_{d+1}$, and $z_{d+1}$ are integers of 1 or more.

(S1302: Hash Key Generation Step)

Using the processing device, the master key generation unit 110 computes Formula 196, and thus generates a hash key hk randomly.

$$hk \xleftarrow{R} KH_\lambda \qquad [\text{Formula 196}]$$

(S1303: Public Parameter Generation Step)

Using the processing device, the master key generation unit 110 generates a subbasis $\hat{B}_0$ of the basis $B_0$, a subbasis $\hat{B}$ of the basis B, a subbasis $\hat{B}_{d+1}$ of the basis $B_{d+1}$, a subbasis $\hat{B}^*_0$ of the basis $B^*_0$, a subbasis $\hat{B}^*$ of the basis $B^*$, and a subbasis $\hat{B}^*_{d+1}$ of the basis $B^*_{d+1}$, as indicated in Formula 197, the bases $B_0$, B, $B_{d+1}$, $B^*_0$, $B^*$, and $B^*_{d+1}$ having been generated in (S1301).

$$\hat{\mathbb{B}}_0 := (b_{0,1}, b_{0,1+u_0+w_0+1}, \ldots, b_{0,1+u_0+w_0+z_0})$$

$$\hat{\mathbb{B}} := (b_1, \ldots, b_{2+n}, b_{2+n+u+w+1}, \ldots, b_{2+n+u+w+z})$$

$$\hat{\mathbb{B}}_{d+1} := (b_{d+1,1}, b_{d+1,2}, b_{d+1,2+u_{d+1}+w_{d+1}+1}, \ldots, b_{d+1,2+u_{d+1}+w_{d+1}+z_{d+1}})$$

$$\hat{\mathbb{B}}^*_0 := (b^*_{0,1+u_0+1}, \ldots, b_{0,1+u_0+w_0})$$

$$\hat{\mathbb{B}}^* := (b^*_1, \ldots, b_{2+n}, b^*_{2+n+u+1}, \ldots, b_{2+n+u+w})$$

$$\hat{\mathbb{B}}^*_{d+1} := (b^*_{d+1,1}, b^*_{d+1,2}, b^*_{d+1,2+u_{d+1}+1}, \ldots, b^*_{d+1,2+u_{d+1}+w_{d+1}}) \qquad [\text{Formula 197}]$$

The master key generation unit 110 generates a public parameter pk by putting together the generated subbasis $\hat{B}_0$, subbasis $\hat{B}$, subbasis $\hat{B}_{d+1}$, subbasis $\hat{B}^*_0$, subbasis $\hat{B}^*$, and subbasis $\hat{B}^*_{d+1}$, the security parameter $\lambda(1^\lambda)$ inputted in (S1301), param generated in (S1301), and the hash key hk generated in (S1302).

(S1304: Master Key Generation Step)

The master key generation unit 110 generates a master key sk which is constituted by a basis vector $b^*_{0,1}$ of the basis $B^*_0$.

(S1305: Master Key Storage Step)

The master key storage unit 120 stores the public parameter pk generated in (S1303) in the storage device. The master key storage unit 120 also stores the master key sk generated in (S1304) in the storage device.

In brief, in (S1301) through (S1304), the key generation device 100 executes the Setup algorithm indicated in Formula 198, and thus generates the public parameter pk and the master key sk. In (S1305), the key generation device 100 stores the generated public parameter pk and master key sk in the storage device.

The public parameter is published via the network, for example, and is made available for the signature device 500 and the verification device 600.

$$\text{Setup}(1^\lambda) \qquad [\text{Formula 198}]$$

$$hk \xleftarrow{R} KH_\lambda,$$

$$(param, (\mathbb{B}_0, \mathbb{B}^*_0), (\mathbb{B}, \mathbb{B}^*), (\mathbb{B}_{d+1}, \mathbb{B}^*_{d+1})) \xleftarrow{R} \mathcal{G}_{ob}(1^\lambda),$$

$$\hat{\mathbb{B}}_0 := (b_{0,1}, b_{0,1+u_0+w_0+1}, \ldots, b_{0,1+u_0+w_0+z_0}),$$

$$\hat{\mathbb{B}} := (b_1, \ldots, b_{2+n}, b_{2+n+u+w+1}, \ldots, b_{2+n+u+w+z}),$$

$$\hat{\mathbb{B}}_{d+1} := (b_{d+1,1}, b_{d+1,2}, b_{d+1,2+u_{d+1}+w_{d+1}+1}, \ldots, b_{d+1,2+u_{d+1}+w_{d+1}+z_{d+1}}),$$

$$\hat{\mathbb{B}}^*_0 := (b^*_{0,1+u_0+1}, \ldots, b_{0,1+u_0+w_0}),$$

$$\hat{\mathbb{B}}^* := (b^*_1, \ldots, b_{2+n}, b^*_{2+n+u+1}, \ldots, b_{2+n+u+w}),$$

$$\hat{\mathbb{B}}^*_{d+1} := (b^*_{d+1,1}, b^*_{d+1,2}, b^*_{d+1,2+u_{d+1}+1}, \ldots, b^*_{d+1,2+u_{d+1}+w_{d+1}}),$$

$$sk := b^*_{0,1},$$

$$pk := (1^\lambda, hk, param, \hat{\mathbb{B}}_0, \hat{\mathbb{B}}, \hat{\mathbb{B}}_{d+1}, \hat{\mathbb{B}}^*_0, \hat{\mathbb{B}}^*, \hat{\mathbb{B}}^*_{d+1}).$$

return sk, pk.

With reference to FIG. 35, the process of the KeyGen algorithm will be described.

(S1401: Information Input Step)

Using the input device, the information input unit 130 takes as input an attribute set $\Gamma := \{(t, x_t := (x_{t,1}, \ldots, x_{t,n} \in F_q^n)) | 1 \leq t \leq d\}$. Note that attribute information of the user of a signature key $sk_\Gamma$ is set in the attribute set $\Gamma$, for example.

(S1402: Random Number Generation Step)

Using the processing device, the random number generation unit 143 generates random numbers, as indicated in Formula 199.

$$\delta \xleftarrow{U} \mathbb{F}_q^x, \qquad [\text{Formula 199}]$$

$$\vec{\varphi}_0 := \varphi_{0,1}, \ldots, \varphi_{0,w_0} \xleftarrow{U} \mathbb{F}_q^{w_0},$$

$$\vec{\varphi}_t := \varphi_{t,1}, \ldots, \varphi_{t,w} \xleftarrow{U} \mathbb{F}_q^w$$

for $$t = 1, \ldots, d,$$

$$\vec{\varphi}_{d+1,1} := \varphi_{d+1,1,1}, \ldots, \varphi_{d+1,1,w_{d+1}} \xleftarrow{U} \mathbb{F}_q^{w_{d+1}},$$

$$\vec{\varphi}_{d+1,2} := \varphi_{d+1,2,1}, \ldots, \varphi_{d+1,2,w_{d+1}} \xleftarrow{U} \mathbb{F}_q^{w_{d+1}},$$

(S1403: Key Element Generation Step)

Using the processing device, the key element generation unit 144 generates an element $k^*_0$ of the signature key $sk_\Gamma$, as indicated in Formula 200.

$$k_0^* := \left(\delta, \frac{u_0}{0^{u_0}}, \frac{w_0}{\vec{\varphi}_0}, \frac{z_0}{0^{z_0}}\right)_{\mathbb{B}_0^*}$$ [Formula 200]

Using the processing device, the key element generation unit 144 also generates an element $k^*_t$ of the signature key $sk_\Gamma$ for each integer t included in the attribute set $\Gamma$, as indicated in Formula 201.

$$k_t^* := \left(\frac{2+n}{\delta(1,t), \overrightarrow{\delta x_t}}, \frac{u}{0^u}, \frac{w}{\vec{\varphi}_t}, \frac{z}{0^z}\right)_{\mathbb{B}^*}$$ [Formula 201]

for $(t, \vec{x}_t) \in \Gamma$

Using the processing device, the key element generation unit 144 also generates elements $k^*_{d+1}$ and $k^*_{d+2}$ of the signature key $sk_\Gamma$, as indicated in Formula 202.

$$k_{d+1,1}^* := \left(\frac{2}{\delta(1,0)}, \frac{u_{d+1}}{0^{u_{d+1}}}, \frac{w_{d+1}}{\vec{\varphi}_{d+1,1}}, \frac{z_{d+1}}{0^{z_{d+1}}}\right)_{\mathbb{B}^*_{d+1}},$$

$$k_{d+1,2}^* := \left(\frac{2}{\delta(0,1)}, \frac{u_{d+1}}{0^{u_{d+1}}}, \frac{w_{d+1}}{\vec{\varphi}_{d+1,2}}, \frac{z_{d+1}}{0^{z_{d+1}}}\right)_{\mathbb{B}^*_{d+1}}$$ [Formula 202]

(S1404: Key Distribution Step)

Using the communication device and via the network, for example, the key distribution unit 150 distributes the signature key $sk_\Gamma$ having, as elements, the attribute set $\Gamma$ inputted in (S1401) and $k^*_0$, $k^*_t$, $k^*_{d+1}$, and $k^*_{d+2}$ generated in (S1403) to the signature device 500 in secrecy. As a matter of course, the signature key $sk_\Gamma$ may be distributed to the signature device 500 by another method.

In brief, in (S1401) through (S1403), the key generation device 100 executes the KeyGen algorithm indicated in Formula 203, and thus generates the signature key $sk_\Gamma$. In (S1404), the key generation device 100 distributes the generated signature key $sk_\Gamma$ to the signature device 500.

$KeyGen(pk, sk,$ [Formula 203]

$\Gamma := \{(t, \vec{x}_t := (x_{t,1}, \ldots, x_{t,n}) \in \mathbb{F}_q^n \setminus \{\vec{0}\}) | 1 \le t \le d\})$ $\delta \xleftarrow{U} \mathbb{F}_q^\times,$ $\vec{\varphi}_0 \xleftarrow{U} \mathbb{F}_q^{w_0},$ $\vec{\varphi}_t \xleftarrow{U} \mathbb{F}_q^w$ for $t = 1, \ldots, d,$ $\vec{\varphi}_{d+1,1}, \vec{\varphi}_{d+1,2} \xleftarrow{U} \mathbb{F}_q^{w_{d+1}},$ $k_0^* := \left(\delta, \frac{u_0}{0^{u_0}}, \frac{w_0}{\vec{\varphi}_0}, \frac{z_0}{0^{z_0}}\right)_{\mathbb{B}_0^*}$ $k_t^* := \left(\frac{2+n}{\delta(1,t), \overrightarrow{\delta x_t}}, \frac{u}{0^u}, \frac{w}{\vec{\varphi}_t}, \frac{z}{0^z}\right)_{\mathbb{B}^*}$ for -continued $(t, \vec{x}_t) \in \Gamma,$ $k_{d+1,1}^* := \left(\frac{2}{\delta(1,0)}, \frac{u_{d+1}}{0^{u_{d+1}}}, \frac{w_{d+1}}{\vec{\varphi}_{d+1,1}}, \frac{z_{d+1}}{0^{z_{d+1}}}\right)_{\mathbb{B}^*_{d+1}},$ $k_{d+1,2}^* := \left(\frac{2}{\delta(0,1)}, \frac{u_{d+1}}{0^{u_{d+1}}}, \frac{w_{d+1}}{\vec{\varphi}_{d+1,2}}, \frac{z_{d+1}}{0^{z_{d+1}}}\right)_{\mathbb{B}^*_{d+1}},$ $T :=$ $\{0, (d+1, 1), (d+1, 2)\} \cup \{t | 1 \le t \le d, (t, \vec{x}_t) \in \Gamma\},$ return $sk_\Gamma := (\Gamma, \{k_t^*\}_{t \in T}).$ The function and operation of the signature device 500 will be described.

The signature device 500 includes a signature key acquisition unit 510, an information input unit 520, a complementary coefficient computation unit 530, a signature data generation unit 540, and a data transmission unit 550. The signature data generation unit 540 includes a random number generation unit 541 and a signature element generation unit 542.

With reference to FIG. 36, the process of the Sig algorithm will be described.

(S1501: Signature Key Acquisition Step)

Using the communication device and via the network, for example, the signature key acquisition unit 510 obtains the signature key $sk_\Gamma$ generated by the key generation device 100. The signature key acquisition unit 510 also obtains the public parameter pk generated by the key generation device 100.

(S1502: Information Input Step)

Using the input device, the information input unit 520 takes as input an access structure $S := (M, \rho)$. Note that a matrix M of the access structure S is to be set according to the conditions of a system to be implemented.

Using the input device, the information input unit 520 also takes as input a message m to which a signature is to be appended.

(S1503: Span Program Computation Step)

Using the processing device, the complementary coefficient computation unit 530 checks whether or not the access structure S inputted in (S1502) accepts the attribute set $\Gamma$ included in the signature key $sk_\Gamma$ obtained in (S1501).

The method for checking whether or not the access structure accepts the attribute set is the same as that described in "5. Concept for implementing functional encryption in Embodiment 1".

If the access structure S accepts the attribute set $\Gamma$ (accept in S1503), the complementary coefficient computation unit 530 advances the process to (S1504). If the access structure S rejects the attribute set $\Gamma$ (reject in S1503), the complementary coefficient computation unit 530 ends the process.

(S1504: Complementary Coefficient Computation Step)

Using the processing device, the complementary coefficient computation unit 530 computes I and a constant (complementary coefficient) $\alpha_i$ for each integer i included in I such that Formula 204 is satisfied.

$\Sigma_{i \in I} \alpha_i M_i := \vec{1}$ and $I \subseteq \{i \in \{1, \ldots, L\} | [\rho(i) = (t, \vec{v}_i) \wedge (t, \vec{x}_t) \in \Gamma \wedge \vec{v}_i \cdot \vec{x}_t = 0]$ $\vee [\rho(i) = \neg(t, \vec{v}_i) \wedge (t, \vec{x}_t) \in \Gamma \wedge \vec{v}_i \cdot \vec{x}_t \ne 0]\}$ [Formula 204]

(S1505: Random Number Generation Step)

Using the processing device, the random number generation unit 541 generates random numbers, as indicated in Formula 205.

$$\xi \xleftarrow{U} \mathbb{F}_q^\times, \quad [\text{Formula 205}]$$

$$(\beta_i) \xleftarrow{U} \left\{ (\beta_1, \ldots, \beta_L) \;\middle|\; \sum_{i=1}^{L} \beta_i M_i = \vec{0} \right\}$$

(S1506: Signature Element Generation Step)

Using the processing device, the signature element generation unit 542 generates a signature element $s^*_0$ which is an element of signature data sig, as indicated in Formula 206.

$$s^*_0 := \xi k^*_0 + r^*_0 \quad [\text{Formula 206}]$$

Note that $r^*_0$ is defined by Formula 207 (see Formula 110 through Formula 112 and explanations thereof).

$$r^*_0 \xleftarrow{U} \mathrm{span}\langle b^*_{0,1+u_0+1}, \ldots, b^*_{0,1+u_0+w_0} \rangle \quad [\text{Formula 207}]$$

Using the processing device, the signature element generation unit 542 also generates a signature element $s^*_i$ which is an element of the signature data sig for each integer $i=1, \ldots, L$, as indicated in Formula 208.

$$s^*_i := \gamma_i \cdot \xi k^*_i + \sum_{i'=1}^{n} y_{i,i'} \cdot b^*_{t,i'} + r^*_i, \text{ for } 1 \le i \le L \quad [\text{Formula 208}]$$

Note that $r^*_i$ is defined by Formula 209.

$$r^*_i \xleftarrow{U} \mathrm{span}\langle b^*_{t,2+n+u+1}, \ldots, b^*_{t,2+n+u+w} \rangle \quad [\text{Formula 209}]$$

Note that $\gamma_i$ and $y_i := y_{i,i'}$ ($i'=1, \ldots, n$) are defined by Formula 210.

$\gamma_i, \vec{y}_i := (y_{i,1}, \ldots, y_{i,n})$ are defined as  [Formula 210]

if $i \in I \wedge \rho(i) = (t, \vec{v}_i),$ $\gamma_i := \alpha_i,$ $\vec{y}_i \xleftarrow{U} \{\vec{y}_i \mid \vec{y}_i \cdot \vec{v}_i = 0 \wedge y_{i,1} = \beta_i\},$ if $i \in I \wedge \rho(i) = \neg(t, \vec{v}_i),$ $\gamma_i := \dfrac{\alpha_i}{\vec{v}_i \cdot \vec{x}_i},$ $\vec{y}_i \xleftarrow{U} \{\vec{y}_i \mid \vec{y}_i \cdot \vec{v}_i = \beta_i\},$ if $i \notin I \wedge \rho(i) = (t, \vec{v}_i),$ $\gamma_i := 0,$ $\vec{y}_i \xleftarrow{U} \{\vec{y}_i \mid \vec{y}_i \cdot \vec{v}_i = 0 \wedge y_{i,1} = \beta_i\},$ if $i \notin I \wedge \rho(i) = \neg(t, \vec{v}_i),$ $\gamma_i := 0,$ $\vec{y}_i \xleftarrow{U} \{\vec{y}_i \mid \vec{y}_i \cdot \vec{v}_i = \beta_i\}$ Using the processing device, the signature element generation unit 542 also generates a signature element $s^*_{L+1}$ which is an element of the signature data sig, as indicated in Formula 211.

$$s^*_{L+1} := \xi(k^*_{d+1,1} + H_{hk}^{\lambda, D}(m \| \mathbb{S}) \cdot k^*_{d+1,2}) + r^*_{L+1} \quad [\text{Formula 211}]$$

Note that $r^*_{L+1}$ is defined by Formula 212.

$$r^*_{L+1} \xleftarrow{U} \mathrm{span}\langle b^*_{d+1,2+u_{d+1}+1}, \ldots, b^*_{d+1,2+u_{d+1}+w_{d+1}} \rangle \quad [\text{Formula 212}]$$

(S1507: Data Transmission Step)

Using the communication device and via the network, for example, the data transmission unit 550 transmits the signature data sig including the signature element $s^*_0$, the signature element $s^*_i$ ($i=1, \ldots, L$), the signature element $s^*_{L+1}$, the message m, and the access structure $S := (M, \rho)$ to the verification device 600. As a matter of course, the signature data sig may be transmitted to the verification device 600 by another method.

In brief, in (S1501) through (S1506), the signature device 500 executes the Sig algorithm indicated in Formula 213, and thus generates the signature data sig. In (S1507), the signature device 500 transmits the generated signature data sig to the verification device 600.

$Sig(pk, sk_\Gamma, m, \mathbb{S} := (M, \rho))$:  [Formula 213]

If $\mathbb{S} := (M, \rho)$ accepts $\Gamma := \{(t, \vec{x}_t)\},$ then compute $I$ and $\{\alpha_i\}_{i \in I}$ such that $$\sum_{i \in I} \alpha_i M_i := \vec{1}$$

and $I \subseteq \{i \in \{1, \ldots, L\} \mid [$ $\rho(i) = (t, \vec{v}_i) \wedge (t, \vec{x}_t) \in \Gamma \wedge \vec{v}_i \cdot \vec{x}_t = 0] \vee [$ $\rho(i) = \neg(t, \vec{v}_i) \wedge (t, \vec{x}_t) \in \Gamma \wedge \vec{v}_i \cdot \vec{x}_t \ne 0]\},$ $\xi \xleftarrow{U} \mathbb{F}_q^\times, (\beta_i) \xleftarrow{U} \left\{ (\beta_1, \ldots, \beta_L) \;\middle|\; \sum_{i=1}^{L} \beta_i M_i = \vec{0} \right\},$ $s^*_0 := \xi k^*_0 + r^*_0,$ where $r^*_0 \xleftarrow{U} \mathrm{span}\langle b^*_{0,1+u_0+1}, \ldots, b^*_{0,1+u_0+w_0} \rangle,$ $s^*_i := \gamma_i \cdot \xi k^*_t + \sum_{i'=1}^{n} y_{i,i'} \cdot b^*_{t,i'} + r^*_i, \text{ for } 1 \le i \le L,$ where $r^*_i \xleftarrow{U} \mathrm{span}\langle b^*_{t,2+n+u+1}, \ldots, b^*_{t,2+n+u+w} \rangle,$ and $\gamma_i, \vec{y}_i := (y_{i,1}, \ldots, y_{i,n})$ are defined as if $i \in I \wedge \rho(i) = (t, \vec{v}_i), \gamma_i := \alpha_i,$ $\vec{y}_i \xleftarrow{U} \{\vec{y}_i \mid \vec{y}_i \cdot \vec{v}_i = 0 \wedge y_{i,1} = \beta_i\},$ if $i \in I \wedge \rho(i) = \neg(t, \vec{v}_i),$ $\gamma_i := \dfrac{\alpha_i}{\vec{v}_i \cdot \vec{x}_t},$ $\vec{y}_i \xleftarrow{U} \{\vec{y}_i \mid \vec{y}_i \cdot \vec{v}_i = \beta_i\},$ -continued if $i \notin I \wedge \rho(i) = (t, \vec{v}_i), \gamma_i := 0,$ $\vec{y}_i \xleftarrow{U} \{\vec{y}_i \mid \vec{y}_i \cdot v_i = 0 \wedge y_{i,1} = \beta_i\},$ if $i \notin I \wedge \rho(i) = \neg (t, \vec{v}_i),$ $\gamma_i := 0, \vec{y}_i \xleftarrow{U} \{\vec{y}_i \mid \vec{y}_i \cdot \vec{v}_i = \beta_i\},$ $s^*_{L+1} := \xi(k^*_{d+1,1} + H^{\lambda,D}_{hk}(m\|\mathbb{S}) \cdot k^*_{d+1,2}) + r^*_{L+1},$ where $r^*_{L+1} \xleftarrow{U} \text{span}\langle b^*_{d+1,2+u_{d+1}+1}, \ldots, b^*_{d+1,2+u_{d+1}} + w_{d+1}\rangle,$ return $\vec{s}^* := (s^*_0, \ldots, s^*_{L+1}).$ The function and operation of the verification device 600 will be described.

The verification device 600 includes a public parameter acquisition unit 610, a data receiving unit 620, a verification data generation unit 630, and a pairing operation unit 640. The verification data generation unit 630 includes an f vector generation unit 631, an s vector generation unit 632, a random number generation unit 633, and a verification element generation unit 634.

With reference to FIG. 37, the process of the Ver algorithm will be described.

(S1601: Public Parameter Acquisition Step)

Using the communication device and via the network, for example, the public parameter acquisition unit 610 obtains the public parameter pk generated by the key generation device 100.

(S1602: Signature Data Reception Step)

Using the communication device and via the network, for example, the data receiving unit 620 receives the signature data sig transmitted by the signature device 500.

(S1603: f Vector Generation Step)

Using the processing device, the f vector generation unit 631 randomly generates a vector f having r pieces of elements, as indicated in Formula 214.

$$\vec{f} \xleftarrow{U} \mathbb{F}^r_q \quad \text{[Formula 214]}$$

(S1604: s Vector Generation Step)

Using the processing device and based on the (L rows×r columns) matrix M of the access structure S included in the signature data sig received in (S1602) and the vector f having r pieces of elements generated in (S1603), the s vector generation unit 632 generates a vector $s^T$, as indicated in Formula 215.

$$\vec{s}^T := (s_1, \ldots, s_L)^T := M \cdot \vec{f}^T \quad \text{[Formula 215]}$$

Using the processing device and based on the vector f generated in (S1603), the s vector generation unit 632 also generates a value $s_0$, as indicated in Formula 216. Note that 1 is a vector which has a value 1 in all its elements.

$$s_0 := \vec{1} \cdot \vec{f}^T \quad \text{[Formula 216]}$$

(S1605: Random Number Generation Step)

Using the processing device, the random number generation unit 633 generates random numbers, as indicated in Formula 217.

$$\vec{\eta}_0 := \eta_{0,1}, \ldots, \eta_{0,z_0} \xleftarrow{U} \mathbb{F}^{z_0}_q, \quad \text{[Formula 217]}$$

$$\vec{\eta}_{L+1} := \eta_{L+1,1}, \ldots, \eta_{L+1,z_{d+1}} \xleftarrow{U} \mathbb{F}^{z_{d+1}}_q,$$

$$\theta_{L+1}, s_{L+1} \xleftarrow{U} \mathbb{F}_q,$$

for $1 \leq i \leq L,$ if $\rho(i) = (t, \vec{v}_i)\mu_i,$ $\theta_i \xleftarrow{U} \mathbb{F}_q, \vec{\eta}_i \xleftarrow{U} \mathbb{F}^z_q,$ if $\rho(i) = \neg (t, \vec{v}_i)\mu_i \xleftarrow{U} \mathbb{F}_q, \vec{\eta}_i \xleftarrow{U} \mathbb{F}^z_q$ (S1606: Verification Element Generation Step)

Using the processing device, the verification element generation unit 634 generates a verification element $c_0$ which is an element of a verification key, as indicated in Formula 218.

$$c_0 := (-s_0 - s_{L+1}, \overbrace{0^{u_0}}^{u_0}, \overbrace{0^{w_0}}^{w_0}, \overbrace{\vec{\eta}_0}^{z_0})\mathbb{B}_0 \quad \text{[Formula 218]}$$

Using the processing device, the verification element generation unit 634 also generates a verification element $c_i$ which is an element of the verification key for each integer $i=1, \ldots, L$, as indicated in Formula 219.

for $1 \leq i \leq L,$ [Formula 219]

if $\rho(i) = (t, v_i)$ if $s^*_i \notin \mathbb{V}_t,$ return 0 else $c_i := (\mu_i(t, -1), s_i e_1 + \theta_i \vec{v}_i, \overbrace{0^u}^{2+n}, \overbrace{0^w}^{u}, \overbrace{\vec{\eta}}^{w}, \overbrace{}^{z})\mathbb{B},$ if $\rho(i) = \neg (t, \vec{v}_i)$ if $s^*_i \notin \mathbb{V}_t,$ return 0 else $c_i := (\mu_i(t, -1), s_i \vec{v}_i, \overbrace{0^u}^{2+n}, \overbrace{0^w}^{u}, \overbrace{\vec{\eta}_i}^{w})\mathbb{B}$ Using the processing device, the verification element generation unit 634 also generates a verification element $c_{L+1}$ which is an element of the verification key, as indicated in Formula 220.

$$c_{L+1} := (s_{L+1} - \theta_{L+1} H^{\lambda,D}_{hk}(m\|\mathbb{S}), \theta_{L+1}, \overbrace{0^{u_{d+1}}}^{u_{d+1}}, \overbrace{0^{w_{d+1}}}^{w_{d+1}}, \overbrace{\vec{\eta}_{L+1}}^{z_{d+1}})\mathbb{B}_{d+1} \quad \text{[Formula 220]}$$

(S1607: First Pairing Operation Step)

Using the processing device, the pairing operation unit 640 computes a pairing operation e $(b_{0,1}, s^*_0)$.

If the result of computing the pairing operation e $(b_{0,1}, s^*_0)$ is a value 1, the pairing operation unit 640 outputs a value 0 indicating failure of verification of the signature and ends the process. If the result of computing the pairing operation e $(b_{0,1}, s^*_0)$ is other than a value 1, the pairing operation unit 640 advances the process to S1608.

(S1608: Second Pairing Operation Step)

Using the processing device, the pairing operation unit 640 computes a pairing operation indicated in Formula 221.

$$\Pi_{i=0}^{L+1} e(c_i, s_i^*) \quad \text{[Formula 221]}$$

If the result of computing the pairing operation indicated in Formula 221 is a value 1, the pairing operation unit 640 outputs a value 1 indicating success of verification of the signature. If the result is any other value, the pairing operation unit 640 outputs a value 0 indicating failure of verification of the signature.

In brief, in (S1601) through (S1608), the verification device 600 executes the Ver algorithm indicated in Formula 222, and thus verifies the signature data sig.

$$Ver(pk, m, \mathbb{S} := (M, \rho), \vec{s}^*) \quad \text{[Formula 222]}$$

$$\vec{f} \xleftarrow{U} \mathbb{F}_q^r,$$

$$\vec{s}^T := (s_1, \ldots, s_L)^T := M \cdot \vec{f}^T,$$

$$s_0 := \vec{1} \cdot \vec{f}^T,$$

$$\vec{\eta}_0 \xleftarrow{U} \mathbb{F}_q^{z_0}, \vec{\eta}_{L+1} \xleftarrow{U} \mathbb{F}_q^{z_{d+1}}, \theta_{L+1} s_{L+1} \xleftarrow{U} \mathbb{F}_q,$$

$$c_0 := (-s_0 - s_{L+1}, \overbrace{0^{u_0}}^{u_0}, \overbrace{0^{w_0}}^{w_0}, \vec{\eta}_0)\mathbb{B}_0,$$

for $1 \le i \le L$, if $\rho(i) = (t, \vec{v}_i)$, if $s_i^* \notin \mathbb{V}_t$, return 0, else $\mu_i, \theta_i \xleftarrow{U} \mathbb{F}_q, \vec{\eta}_i \xleftarrow{U} \mathbb{F}_q^z,$ $$c_i := (\overbrace{\mu_i(t, -1), s_i e_1 + \theta_i \vec{v}_i}^{2+n}, \overbrace{0^u}^{u}, \overbrace{0^w}^{w}, \vec{\eta})\mathbb{B},$$

if $\rho(i) = \neg (t, \vec{v}_i)$, if $s_i^* \notin \mathbb{V}_t$, return 0, else $\mu_i \xleftarrow{U} \mathbb{F}_q, \vec{\eta}_i \xleftarrow{U} \mathbb{F}_q^z,$ $$c_i := (\overbrace{\mu_i(t, -1), s_i \vec{v}_i}^{2+n}, \overbrace{0^u}^{u}, \overbrace{0^w}^{w}, \vec{\eta})\mathbb{B},$$

$$c_{L+1} := $$

$$(\overbrace{s_{L+1} - \theta_{L+1} H_{hk}^{\lambda,D}(m\|\mathbb{S}), \theta_{L+1}}^{2}, \overbrace{0^{u_{d+1}}}^{u_{d+1}}, \overbrace{0^{w_{d+1}}}^{w_{d+1}}, \vec{\eta}_{L+1}) \mathbb{B}_{d+1}$$

return 0 if $e(b_{0,1}, s_0^*) = 1$, return 1 if $\prod_{i=0}^{L+1} e(c_i, s_i^*) = 1,$ return 0 otherwise.

As described above, as in the cryptographic systems 10 according to Embodiments 2 to 4, in the cryptographic system 10 according to Embodiment 5, the index parts are provided, so that the bases that are used for every attribute category can be constructed as the common bases (basis B and basis B*). As a result, only the basis B and the basis B* need to be included in a public parameter, eliminating the need for reissuing the public parameter when an attribute category is to be added at a later stage.

As in Embodiments 2 to 4, for the index parts, it is required that 0 be obtained as a result of an inner-product operation of the index parts. Therefore, although the 2-dimensional index parts, namely the basis vectors $b^*_1$ and $b^*_2$ and the basis vectors $b_1$ and $b_2$, are employed in the above description, the index parts are not limited to 2-dimensional and may be 3-dimensional or higher-dimensional. The values assigned to the index parts are not limited to those described above, and a different assignment arrangement may be employed.

The signature scheme based on the functional encryption scheme has been described above. However, as explained in Embodiment 3 that the functional encryption scheme can be modified into an attribute-based encryption scheme, so the signature scheme based on the functional encryption scheme can be modified into a signature scheme based on the attribute-based encryption scheme.

Embodiment 6

This embodiment describes a multi-authority functional encryption scheme and a multi-authority signature scheme.

Multi-authority signifies the presence of a plurality of authorities who generate the user's decryption key (or signature key).

In an ordinary functional encryption, the security of the whole system depends on one certain party (authority). For example, in the cryptographic system 10 described in Embodiment 2 or 3, the security of the whole system depends on the key generation device 100. If the master secret key sk which is the secret key of the key generation device 100 is compromised, the security of the whole system will be broken.

With the multi-authority scheme, however, even if the security of some authority is broken or the secret key (master key) of some authority is compromised, only part of the system stops functioning, and the remaining portion of the system can function properly.

Figure 38:
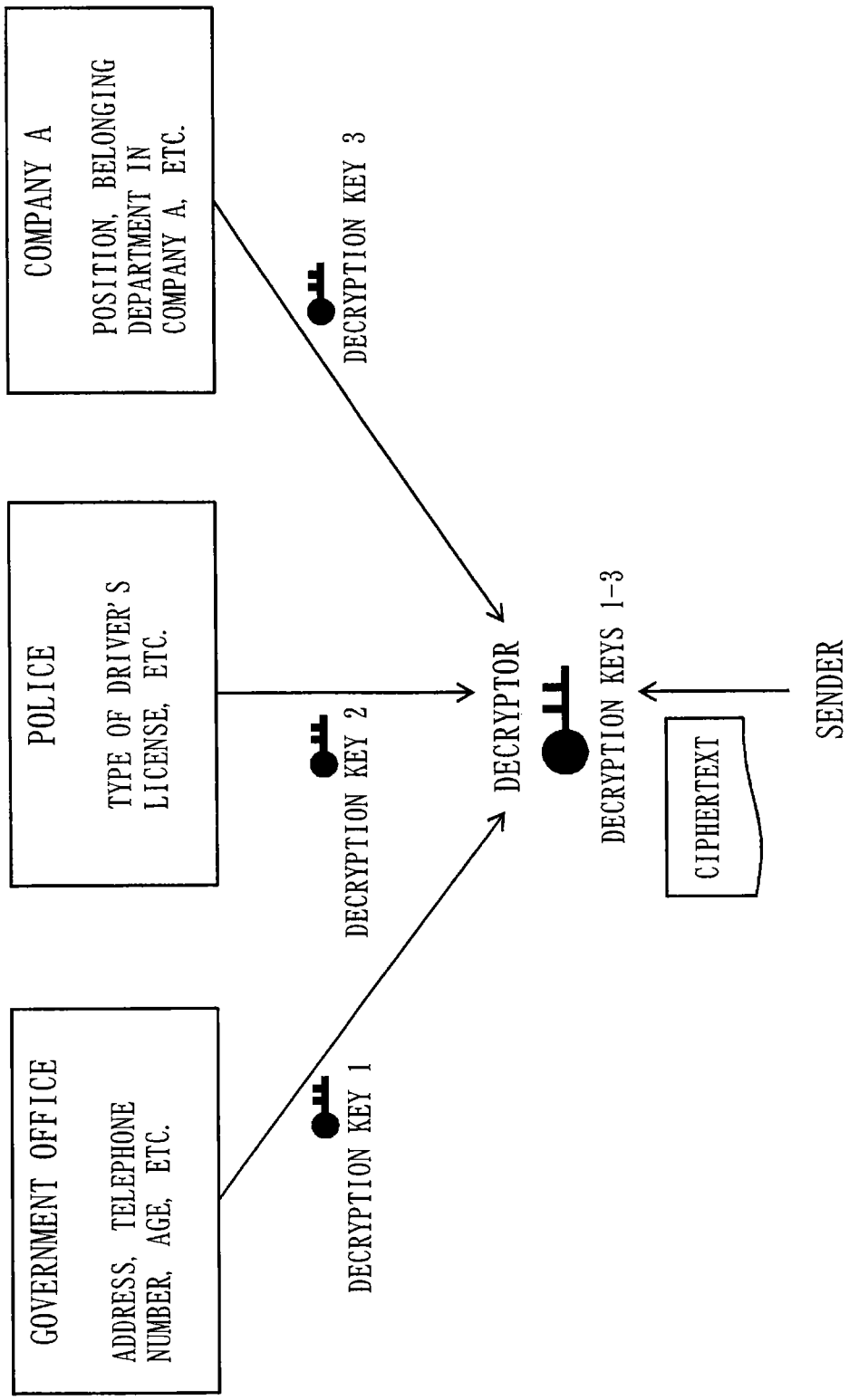
FIG. 38 is an explanatory drawing of multi-authority.

FIG. 38 is an explanatory drawing of the multi-authority. In FIG. 38, a narrowly-defined cryptographic process is used as an example.

In FIG. 38, a government office manages attributes such as address, telephone number, and age. The police manage attributes such as type of driver's license. Company A manages attributes such as position in Company A and belonging department in Company A. A decryption key 1 associated with the attributes managed by the government office is issued by the government office. A decryption key 2 associated with the attributes managed by the police is issued by the police. A decryption key 3 associated with the attributes managed by Company A is issued by Company A.

A decryptor who decrypts a ciphertext decrypts the ciphertext using a decryption key formed by putting together the decryption keys 1, 2, and 3 issued by the respective authorities such as the government office, the police, and Company A. That is, when seen from the decryptor, a decryption key formed by putting together the decryption keys issued by the respective authorities is the single decryption key issued to him or her.

For example, in a case where the master key of Company A is compromised, although the cryptographic processing system does not function regarding the attributes of Company A, it functions regarding the attributes managed by the other authorities. That is, concerning the attributes managed by Company A there is a risk of decryption by a user having attributes other than the specified attributes. However, concerning attributes other than those managed by Company A, decryption is possible only by a user having the specified attributes.

As is seen from the example of FIG. 38, according to the functional encryption, it is normal that a plurality of authorities are present, and that each authority manages a certain category (subspace) or definition range in the attributes and issues (a part of) a decryption key regarding the attribute of the user in this category.

When any party can serve as an authority and issue (a part of) a decryption key without interacting with the other parties, and each user can obtain (a part of) the decryption key without interacting with the other parties, this scheme is called a decentralized multi-authority scheme.

For example, if a central authority exists, the scheme is not decentralized. A central authority is an authority superior to the other authorities. If the security of the central authority is broken, the security of every authority will be broken.

Non-Patent Literature 31 describes a decentralized multi-authority functional encryption scheme, and Non-Patent Literature 30 describes a non-decentralized multi-authority signature scheme. As in the case of the encryption scheme and the signature scheme described in the above embodiments, the schemes described in Non-Patent Literature 30 and Non-Patent Literature 31 can be constructed such that there is no need to reissue a public parameter when an attribute category is to be added.

Figure 39:
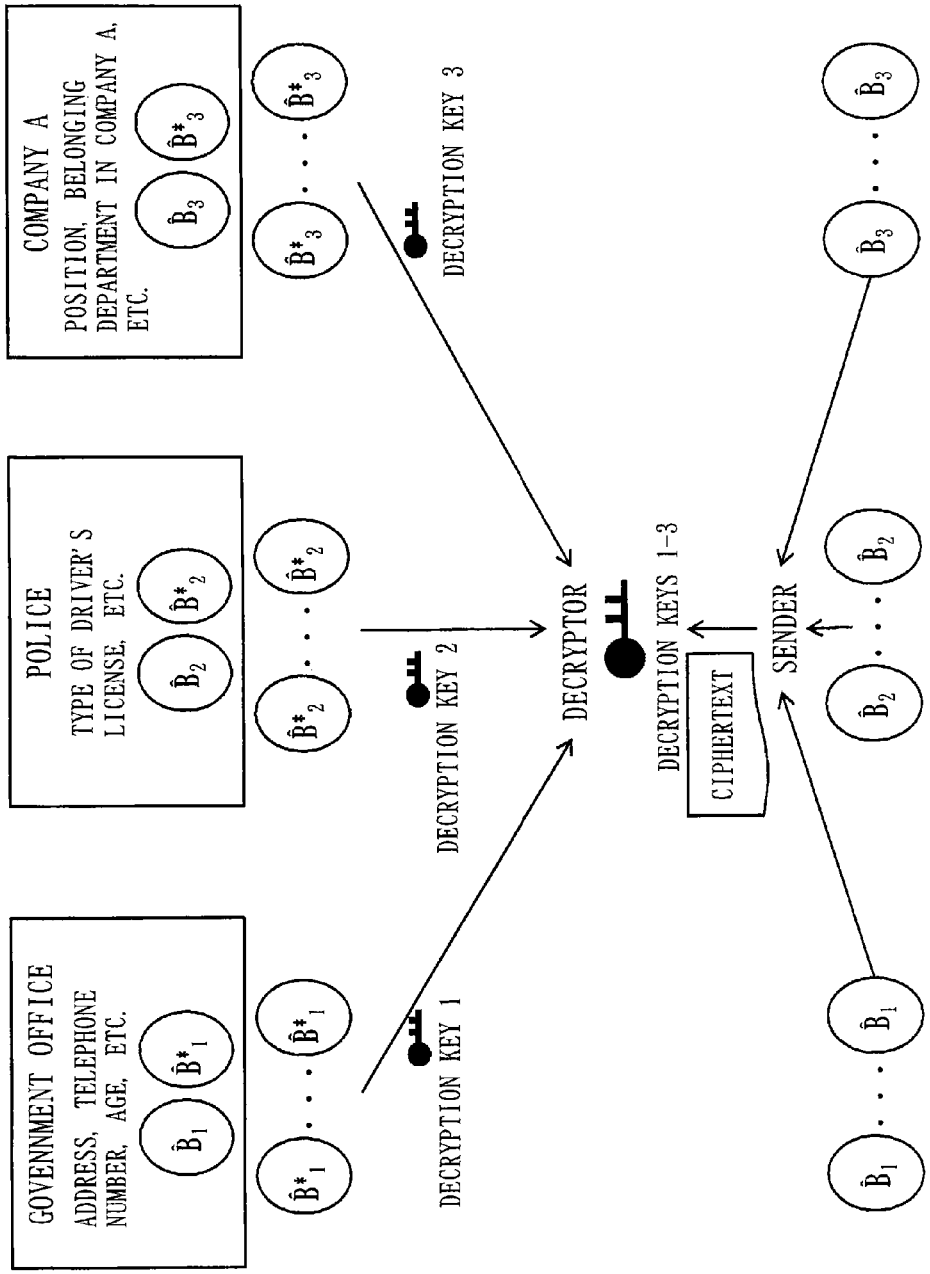
FIG. 39 is an explanatory drawing of a functional encryption scheme that allows for addition of an attribute category in a case of multi-authority.

FIG. 39 is an explanatory drawing of a functional encryption scheme that allows for addition of an attribute category in a case of multi-authority.

In FIG. 39, as in FIG. 38, a government office manages attributes such as address, telephone number, and age. The police manage attributes such as type of driver's license. Company A manages attributes such as position in Company A and belonging department in Company A. A decryption key 1 associated with the attributes managed by the government office is issued by the government office. A decryption key 2 associated with the attributes managed by the police is issued by the police. A decryption key 3 associated with the attributes managed by Company A is issued by Company A.

Note here that the government office generates a basis $B^\wedge_1$ and a basis $B^{\wedge*}_1$ as a public parameter pk and a master secret key sk, respectively. Using the basis $B^{\wedge*}_1$, the government office generates the decryption key 1 concerning the attributes such as address, telephone number, and age. Similarly, the police generate a basis $B^\wedge_2$ and a basis $B^{\wedge*}_2$ as a public parameter pk and a master secret key sk, respectively. Using the basis $B^{\wedge*}_2$, the police generate the decryption key 2 concerning the attributes such as type of driver's license. Similarly, Company A generates a basis $B^\wedge_3$ and a basis $B^{\wedge*}_3$ as a public parameter pk and a master secret key sk, respectively. Using the basis $B^{\wedge*}_3$, Company A generates the decryption key 3 concerning the attributes such as position in Company A and belonging department in Company A.

A sender generates a ciphertext by setting the attributes such as address, telephone number, and age using the basis $B^\wedge_1$, setting the attributes such as type of driver's license using basis $B^\wedge_2$, and setting the attributes such as position in Company A and belonging department in Company A using basis $B^\wedge_3$. A decryptor decrypts the ciphertext using the decryption keys 1 to 3.

For example, when an attribute category managed by the government office is to be added, the attribute category can be added without reissuing the public parameter pk of the government office.

The functional encryption scheme that allows for addition of an attribute category has been described herein. However, the same concept can basically be applied to the signature scheme adapted from the functional encryption scheme.

Embodiment 7

In the above embodiments, the method for implementing the processes of the cryptographic primitives in the dual vector spaces has been described. In Embodiment 7, a method for implementing the processes of the cryptographic primitives in dual additive groups will be described.

More specifically, in the above embodiments, the processes of the cryptographic primitives are implemented in the cyclic group of the prime order q. When a ring R is expressed using a composite M as indicated in Formula 223, the processes of the cryptographic primitives described in the above embodiments can also be applied to an additive group having the ring R as a coefficient.

$$\mathbb{R} := \mathbb{Z}/M\mathbb{Z} \qquad \text{[Formula 223]}$$

where
$\mathbb{Z}$: an integer; and
M: a composite number

By changing $F_q$ to R in the algorithms described in the above embodiments, the processes of the cryptographic primitives in dual additive groups can be implemented.

From the view point of security proof, in the above embodiments, $\rho(i)$ for each integer $i=1, \ldots, L$ may be limited to a positive tuple (t, v) or negative tuple $\neg$(t, v) for respectively different identification information t.

In other words, when $\rho(i)=(t, v)$ or $\rho(i)=\neg(t, v)$, let a function $\tilde{\rho}$ be map of $\{1, \ldots, L\} \rightarrow \{1, \ldots, d\}$ such that $\tilde{\rho}(i)=t$. In this case, $\tilde{\rho}$ may be limited to injection. Note that $\rho(i)$ is $\rho(i)$ in the access structure S:=(M, $\rho(i)$) described above.

A hardware configuration of the cryptographic system 10 (the key generation device 100, the encryption device 200, the decryption device 300, the key delegation device 400, the signature device 500, and the verification device 600) according to the embodiments will be described.

Figure 40:
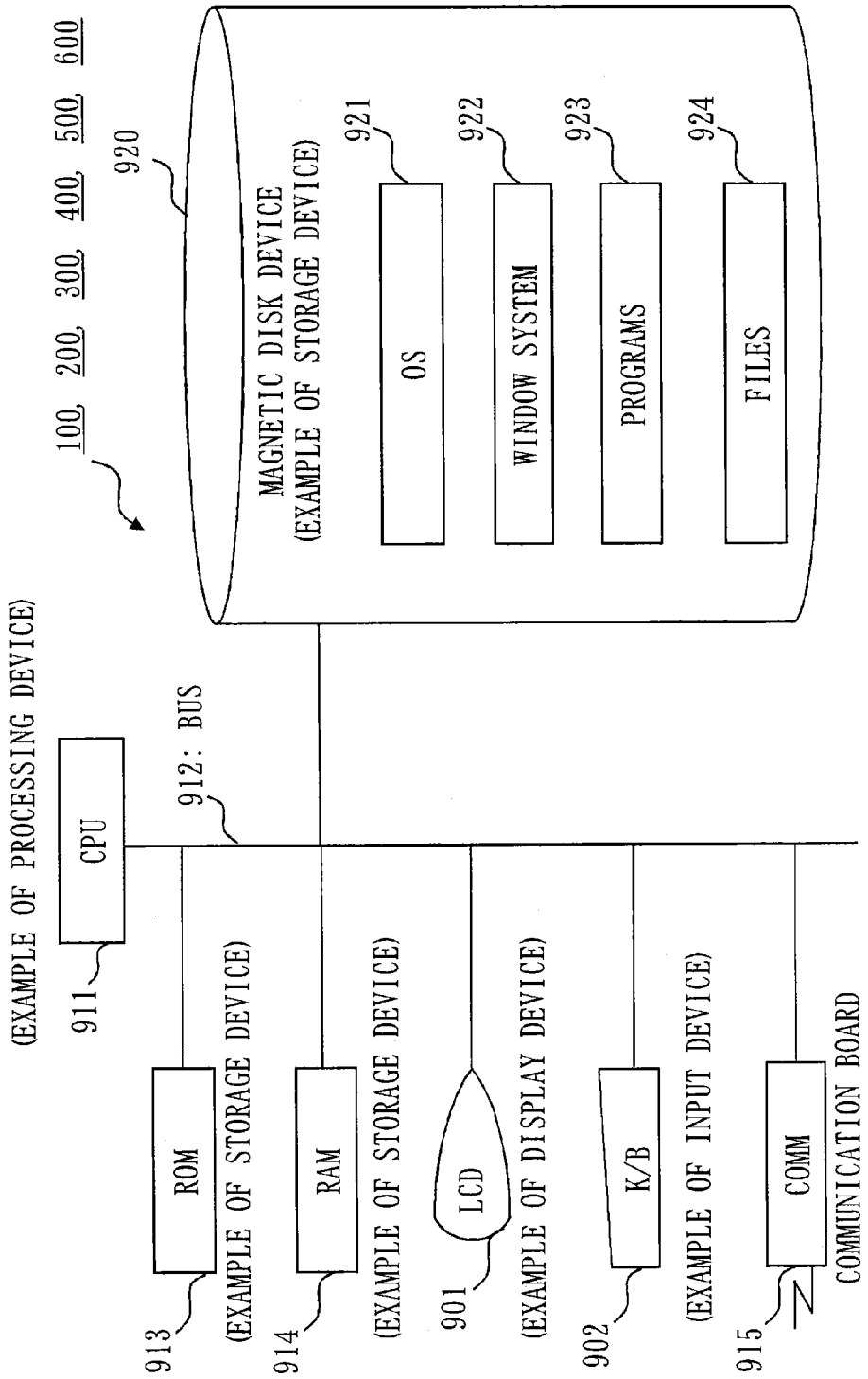
FIG. 40 is a diagram illustrating an example of a hardware configuration of the key generation device 100, the encryption device 200, the decryption device 300, the key delegation device 400, the signature device 500, and the verification device 600.

FIG. 40 is a diagram showing an example of a hardware configuration of the key generation device 100, the encryption device 200, the decryption device 300, the key delegation device 400, the signature device 500, and the verification device 600.

As shown in FIG. 40, each of the key generation device 100, the encryption device 200, the decryption device 300, the key delegation device 400, the signature device 500, and the verification device 600 includes the CPU 911 (also referred to as a Central Processing Unit, central processing device, processing device, arithmetic device, microprocessor, microcomputer, or processor) that executes programs. The CPU 911 is connected via a bus 912 to the ROM 913, the RAM 914, an LCD 901 (Liquid Crystal Display), the keyboard 902 (K/B), the communication board 915, and the magnetic disk device 920, and controls these hardware devices. In place of the magnetic disk device 920 (fixed disk device), a storage device such as an optical disk device or memory card read/write device may be employed. The magnetic disk device 920 is connected via a predetermined fixed disk interface.

The ROM 913 and the magnetic disk device 920 are examples of a nonvolatile memory. The RAM 914 is an example of a volatile memory. The ROM 913, the RAM 914, and the magnetic disk device 920 are examples of a storage device (memory). The keyboard 902 and the communication board 915 are examples of an input device. The keyboard 902 is an example of a communication device. The LCD 901 is an example of a display device.

The magnetic disk device 920, the ROM 913, or the like stores an operating system 921 (OS), a window system 922, programs 923, and files 924. The programs 923 are executed by the CPU 911, the operating system 921, and the window system 922.

The programs 923 store software and programs that execute the functions described in the above description as the "master key generation unit 110", the "master key storage unit 120", the "information input unit 130", the "decryption key generation unit 140", the "key distribution unit 150", the "public parameter acquisition unit 210", the "information input unit 220", the "cipher data generation unit 230", the "data transmission unit 240", the "decryption key acquisition unit 310", the "data receiving unit 320", the "span program computation unit 330", the "complementary coefficient computation unit 340", the "pairing operation unit 350", the "message computation unit 360", the "decryption key acquisition unit 410", the "information input unit 420", the "delegation key generation unit 430", the "key distribution unit 440", the "signature key acquisition unit 510", the "information input unit 520", the "complementary coefficient computation unit 530", the "signature data generation unit 540", the "data transmission unit 550", the "public parameter acquisition unit 610", the "data receiving unit 620", the "verification data generation unit 630", the "pairing operation unit 640", and the like. The programs 923 store other programs as well. The programs are read and executed by the CPU 911.

The files 924 store information, data, signal values, variable values, and parameters such as the "public parameter pk", the "master secret key sk", the "decryption keys $sk_S$ and $sk_\Gamma$", the "ciphertexts $ct_\Gamma$ and $ct_S$", the "access structure S", the "attribute information", and the "message m", as the items of a "file" and "database". The "file" and "database" are stored in a recording medium such as a disk or memory. The information, data, signal values, variable values, and parameters stored in the recording medium such as the disk or memory are read out to the main memory or cache memory by the CPU 911 through a read/write circuit, and used for operations of the CPU 911 such as extraction, search, look-up, comparison, calculation, computation, processing, output, printing, and display. The information, data, signal values, variable values, and parameters are temporarily stored in the main memory, cache memory, or buffer memory during the operations of the CPU 911 including extraction, search, look-up, comparison, calculation, computation, processing, output, printing, and display.

The arrows in the flowcharts in the above description mainly indicate input/output of data and signals. The data and signal values are stored in the memory of the RAM 914, the recording medium such as an optical disk, or in an IC chip. The data and signals are transmitted online via a transmission medium such as the bus 912, signal lines, or cables, or via electric waves.

What is described as "unit" in the above description may be "circuit", "device", "equipment", "means", or "function", and may also be "step", "procedure", or "process". What is described as "device" may be "circuit", "equipment", "means", or "function", and may also be "step", "procedure", or "process". What is described as "process" may be "step". In other words, what is described as "unit" may be realized by firmware stored in the ROM 913. Alternatively, what is described as "unit" may be implemented solely by software, or solely by hardware such as an element, a device, a substrate, or a wiring line, or by a combination of software and firmware, or by a combination including firmware. The firmware and software are stored as programs in the recording medium such as the ROM 913. The programs are read by the CPU 911 and are executed by the CPU 911. That is, each program causes the computer or the like to function as each "unit" described above. Alternatively, each program causes the computer or the like to execute a procedure or a method of each "unit" described above.

REFERENCE SIGNS LIST

10: cryptographic system; 100: key generation device; 110: master key generation unit; 120: master key storage unit; 130: information input unit; 140: decryption key generation unit; 141: f vector generation unit; 142: s vector generation unit; 143: random number generation unit; 144: key element generation unit; 145: randomizing element generation unit; 146: delegation element generation unit; 150: key distribution unit; 200: encryption device; 210: public parameter acquisition unit; 220: information input unit; 230: cipher data generation unit; 231: random number generation unit; 232: cipher element generation unit; 240: data transmission unit; 300: decryption device; 310: decryption key acquisition unit; 320: data receiving unit; 330: span program computation unit; 340: complementary coefficient computation unit; 350: pairing operation unit; 360: message computation unit; 400: key delegation device; 410: decryption key acquisition unit; 420: information input unit; 430: delegation key generation unit; 431: random number generation unit; 432: lower-level key element generation unit; 433: lower-level randomizing element generation unit; 434: lower-level delegation element generation unit; 440: key distribution unit; 500: signature device; 510: signature key acquisition unit; 520: information input unit; 530: complementary coefficient computation unit; 540: signature data generation unit; 541: random number generation unit; 542: signature element generation unit; 550: data transmission unit; 600: verification device; 610: public parameter acquisition unit; 620: data receiving unit; 630: verification data generation unit; 631: f vector generation unit; 632: s vector generation unit; 633: random number generation unit; 634: verification element generation unit; 640: pairing operation unit

The invention claimed is:

1. A cryptographic system configured to perform a process using a predetermined basis B and a predetermined basis B*, the cryptographic system comprising:

a transmission device including circuitry configured to generate a transmission-side vector tj for at least one index j out of a plurality of indices j, the transmission-side vector tj being a vector in which information J assigned in advance to the index j is set as a coefficient of a predetermined basis vector $b_{index}$ of the basis B, and a parameter $\Phi_j$ for the index j is set as a coefficient of another basis vector $b_{att}$ of the basis B; and a reception device including circuitry configured to use a reception-side vector $r_{j'}$ for at least one index j' out of a plurality of indices j', the reception-side vector $r_{j'}$ being a vector in which information J' having an inner-product of 0 with the information J assigned in advance to the index j corresponding to the index j' is set as a coefficient of a basis vector $b^*_{index}$ of the basis B* corresponding to the basis vector $b_{index}$, and a parameter $\Psi j'$ for the index j' is set as a coefficient of a basis vector $b^*_{att}$ of the basis B* corresponding to the basis vector $b_{att}$, and compute a product of pairing operations on corresponding pairs of the basis vectors of the transmission-side vector $t_j$ for the index j and the reception-side vector $r_{j'}$ for the index j' corresponding to the index j.

2. The cryptographic system according to claim 1, wherein the transmission device is an encryption device that generates a ciphertext ct, and is configured to use an integer t of t=1, ..., d (d being an integer of 1 or more) as the index j, use attribute information $x_t$ for the integer t as the parameter $\Phi_j$ for the index j, and generate the ciphertext ct including as the transmission-side vector $t_j$ a cipher vector $c_t$ in which information J assigned to the integer t is set as the coefficient of the basis vector $b_{index}$ and the attribute information $x_t$ for the integer t is set as the coefficient of the basis vector $b_{att}$, for at least one integer t, and wherein the reception device is a decryption device that decrypts the ciphertext ct, and is configured to use an integer i of i=1, ..., L (L being an integer of 1 or more) as the index j', use predicate information $v_i$ for the integer i as the parameter $\Psi_{j'}$ for the index j', use as the reception-side vector $r_{j'}$ a key vector $k^*_i$ in which information J' having an inner-product of 0 with the information J assigned to the integer t corresponding to the integer i is set as the coefficient of the basis vector $b^*_{index}$, and predicate information $v_i$ for the integer i is set as the coefficient of the basis vector $b^*_{att}$, for each integer i, and compute a product of pairing operations on corresponding pairs of the basis vectors of the key vector $k^*_i$ for the each integer i and the cipher vector $c_t$ for the integer t corresponding to the each integer i.

3. The cryptographic system according to claim 1,
wherein the transmission device is an encryption device that generates a ciphertext ct, and is configured to use an integer i of i=1, ..., L (L being an integer of 1 or more) as the index j, use predicate information $v_i$ for the integer i as the parameter $\Phi_j$ for the index j, and generate the ciphertext ct including as the transmission-side vector $t_j$ a cipher vector $c_i$ in which information J assigned to the integer i is set as the coefficient of the basis vector $b_{index}$, and the predicate information $v_i$ for the integer i is set as the coefficient of the basis vector $b_{att}$, for each integer i, and
wherein the reception device is a decryption device that decrypts the ciphertext ct, and is configured to use an integer t of t=1, ..., d (d being an integer of 1 or more) as the index j', use attribute information $x_t$ for the integer t as the parameter $\Psi_{j'}$ for the index j', use as the reception-side vector $r_{j'}$ a key vector $k^*_t$ in which information Y having an inner-product of 0 with the information J assigned to the integer i corresponding to the integer t is set as the coefficient of the basis vector $b^*_{index}$, and attribute information $x_t$ for the integer t is set as the coefficient of the basis vector $b^*_{att}$, for at least one integer t, and compute a product of pairing operations on corresponding pairs of the basis vectors of the cipher vector $c_i$ for the each integer i and the key vector $k^*_t$ for the integer t corresponding to the each integer i.

4. The cryptographic system according to claim 1,
wherein the transmission device is an encryption device that generates a ciphertext ct, and is configured to use an integer i of i=1, ..., L (L being an integer of 1 or more) as the index j, use attribute information $x_i$ for the integer i as the parameter $\phi_j$ for the index j, and generate the ciphertext ct including as the transmission-side vector $t_j$ a cipher vector $c_i$ in which information J assigned to the integer i is set as the coefficient of the basis vector $b_{index}$, and attribute information $x_i$ for the integer i is set as the coefficient of the basis vector $b_{att}$, for each integer i, and
wherein the reception device is a decryption device that decrypts the ciphertext ct, and is configured to use the integer i as the index j', and use predicate information $v_i$ for the integer i as the parameter $\Psi_{j'}$ for the index j', use as the reception-side vector $r_{j'}$ a key vector $k^*_i$ in which information J' having an inner-product of 0 with the information J assigned to the integer i is set as the coefficient of the basis vector $b^*_{index}$, and predicate information $v_i$ for the integer i is set as the coefficient of the basis vector $b^*_{att}$, for each integer i, and compute a product of pairing operations on corresponding pairs of the basis vectors of the key vector $k^*_i$ and the cipher vector $c_i$ for the each integer i.

5. The cryptographic system according to claim 1,
wherein the transmission device is a signature device that uenerates signature data sig, and is configured to use an integer t of t=1, ..., d (d being an integer of 1 or more) as the index j, use attribute information $x_t$ for the integer t as the parameter $\Phi_j$ for the index j, use a key vector $k^*_t$ in which information J assigned to the integer t is set as the coefficient of the basis vector $b_{index}$, and attribute information $x_t$ for the integer t is set as the coefficient of the basis vector $b_{att}$, for at least one integer t, and generate the signature data sig including as the transmission-side vector $t_j$ a signature element $s_i$ for each integer i of i=1, ..., L (L being an integer of 1 or more), including the key vector $k^*_t$ for the integer t corresponding to the each integer i, and
wherein the reception device is a verification device that verifies the signature data sig, and is configured to use the integer i as the index j', use predicate information $v_i$ for the integer i as the parameter $\Psi_{j'}$ for the index j', use as the reception-side vector $r_{j'}$ a verification element ci in which, for each integer i, information J' having an inner-product of 0 with the information J assigned to each integer t corresponding to the each integer i is set as the coefficient of the basis vector $b^*_{index}$, and predicate information $v_i$ for the each integer i is set as the coefficient of the basis vector $b^*_{att}$, and compute a product of pairing operations on corresponding pairs of the basis vectors of the signature element $s_i$ and the verification element $c_i$ for the each integer i.

6. The cryptographic system according to claim 2,
wherein the cryptographic system is configured to perform the process using a predetermined basis $B_0$ and a predetermined basis $B^*_0$, and a predetermined basis B and a predetermined basis $B^*$,
wherein the transmission device is configured to generate the ciphertext ct including a cipher vector $c_0$ and a cipher vector $c_t$ for at least one integer t of t=1, ..., d, as indicated in Formula 1, and
wherein the reception device is configured to compute Formula 3 for a key vector $k^*_i$ for each integer i of i=0, ..., L, as indicated in Formula 2, and the cipher vector $c_t$ $$c_0 := (-s_0 - s_{L+1}, \overbrace{0^{u_0}}^{u_0}, \overbrace{0^{w_0}}^{w_0}, \overbrace{\vec{\eta}_0}^{z_0}) B_0 \qquad \text{[Formula 1]}$$

$$c_t = (\sigma_t(1, t), \omega\vec{x}_t, \overbrace{0^u}^{2+n}, \overbrace{0^w}^{u}, \overbrace{\vec{\varphi}_t}^{w}) B$$

where $\vec{x}_t := (x_{t,1}, \ldots, x_{t,n})$, $\omega, \xi, \vec{\phi}_0 = \phi_{0,1}, \ldots, \phi_{0,z_0}, \sigma_t, \vec{\phi}_t = \phi_{t,1}, \ldots, \phi_{t,z}$ are each random numbers, n is an integer of 1 or more, and $u_0, w_0, z_0, u, w, z$ are each an integer of 0 or more, $$k^*_0 := (-s_0, \overbrace{0^{u_0}}^{u_0}, 1, \overbrace{\vec{\eta}_0}^{w_0}, \overbrace{0^{z_0}}^{z_0}) B^*_0, \qquad \text{[Formula 2]}$$

if $\rho(i) = (t, \vec{v}_i)$, $$k^*_i := (\mu_i(t, -1,), s_i\vec{e}_i + \theta_i\vec{v}_i, \overbrace{0^u}^{2+n}, \overbrace{\vec{\eta}_i}^{u}, \overbrace{0^z}^{w}) B^*,$$

-continued if $\rho(i) = \neg (t, \vec{v}_i)$, $$k_i^* := (\mu_i(t, -1,), s_i \vec{v}_i, \overset{u}{0^u}, \overset{w}{\vec{\eta}_i}, \overset{z}{0^z})B^*$$

where $\vec{v}_i := (v_{i,1}, \ldots, v_{i,n})$, $\eta_0 = \eta_{0,1}, \ldots, \eta_{0,w_0}, \mu_i, \theta_i, \vec{\eta}_i = \eta_{i,1}, \ldots, \eta_{i,w}$ are random numbers, $s_0 := \vec{1} \cdot \vec{f}^T$, $\vec{s}^T := (s_1, \ldots, s_L)^T := M \cdot \vec{f}^T$, $\vec{f}$ is a vector having r pieces of elements, M is an L-row and r-column matrix, $\rho(i)$ is a variable to which $(t, \vec{v}_i)$ or, $\neg(t, \vec{v}_i)$ is assigned in advance, n is an integer of 1 or more, and $u_0, w_0, z_0, u, w, z$ are each an integer of 0 or more, $K := e(c_0, k_0^*)$ [Formula 3]

$$\prod_{i \in I \wedge \rho(i)=(t,\vec{v}_i)} e(c_t, k_i^*)^{\alpha_i} \prod_{i \in I \wedge \rho(i)=\neg(t,\vec{v}_i)} e(c_t, k_i^*)^{\alpha_i/(\vec{v}_i \cdot \vec{x}_t)}$$

where $$\vec{1} = \sum_{i \in I} \alpha_i M_i,$$

where $M_i$ is the $i$-th row of $M$, $I \subseteq$ $\{i \in \{1, \ldots L\} \mid [\rho(i) = (t, \vec{v}_i) \wedge (t, \vec{x}_t) \in \Gamma \wedge \vec{v}_i \cdot \vec{x}_t = 0] \vee$
$[\rho(i) = \neg (t, \vec{v}_i) \wedge (t, \vec{x}_t) \in \Gamma \wedge \vec{v}_i \cdot \vec{x}_t \neq 0]\}$.

7. The cryptographic system according to claim 3,
wherein the cryptographic system is configured to perform the process using a predetermined basis $B_0$ and a predetermined basis $B^*_0$, and a predetermined basis $B$ and a predetermined basis $B^*$,
wherein the transmission device is configured to generate the ciphertext ct including a cipher vector $c_i$ for each integer i of i=0, . . . , L, as indicated in Formula 4, and
wherein the reception device is configured to compute Formula 6 for a key vector $k^*_0$ and a key vector $k^*_t$ for at least one integer t of t=1, . . . , d, as indicated in Formula 5, and the cipher vector $c_i$ $$c_0 := (-s_0, \overset{u_0}{0^{u_0}}, \zeta, \overset{w_0}{0^{w_0}}, \overset{z_0}{\vec{\eta}_0})B_0,$$ [Formula 4]

if $\rho(i) = (t, \vec{v}_i)$, $$c_i := (\mu_i(t, -1,), s_i \vec{e}_i + \theta_i \vec{v}_i, \overset{u}{0^u}, \overset{w}{0^w}, \overset{z}{\vec{\eta}_i})B,$$

if $\rho(i) = \neg (t, \vec{v}_i)$, $$c_i := (\mu_i(t, -1,), s_i \vec{v}_i, \overset{u}{0^u}, \overset{w}{0^w}, \overset{z}{\vec{\eta}_i})B$$

where $\vec{v}_i := (v_{i,1}, \ldots, v_{i,n})$, $\zeta, \vec{\eta}_0 = \eta_{0,1}, \ldots, \eta_{0,z_0}, \mu_i, \theta_i, \vec{\eta}_i = \eta_{i,1}, \ldots, \eta_{i,z}$ are random numbers, $s_0 := \vec{1} \cdot \vec{f}^T$, $\vec{s}^T := (s_1, \ldots, s_L)^T := M \cdot \vec{f}^T$, $\vec{f}$ is a vector having r pieces of elements, M is an L-row and r-column matrix, $\rho(i)$ is a variable to which $(t, \vec{v}_i)$ or, $\neg(t, \vec{v}_i)$ is assigned in advance, n is an integer of 1 or more, and $u_0, w_0, z_0, u, w, z$ are each integer of 0 or more, $$k_0^* := (\omega, \overset{u_0}{0^{u_0}}, 1, \overset{w_0}{\vec{\varphi}_0}, \overset{z_0}{0^{z_0}})B_0^*,$$ [Formula 5]

$$k_t^* := (\sigma_t(1, t), \omega \vec{x}_t, \overset{u}{0^u}, \overset{w}{\vec{\varphi}_t}, \overset{z}{0^z})B^*$$

where $\vec{x}_t := (x_{t,1}, \ldots, x_{t,n})$, $\omega, \vec{\varphi}_0 = \varphi_{0,1}, \ldots, \varphi_{0,w_0}, \sigma_t, \vec{\varphi}_t = \varphi_{t,1}, \ldots, \varphi_{t,w}$ are random numbers, n is an integer of 1 or more, and $u_0, w_0, z_0, u, w, z$ are each integer of 0 or more, $K := e(c_0, k_0^*)$ [Formula 6]

$$\prod_{i \in I \wedge \rho(i)=(t,\vec{v}_i)} e(c_t, k_i^*)^{\alpha_i} \prod_{i \in I \wedge \rho(i)=\neg(t,\vec{v}_i)} e(c_t, k_i^*)^{\alpha_i/(\vec{v}_i \cdot \vec{x}_t)}$$

where $$\vec{1} = \sum_{i \in I} \alpha_i M_i,$$

where $M_i$ is the $i$-th row of $M$, $I \subseteq$ $\{i \in \{1, \ldots L\} \mid [\rho(i) = (t, \vec{v}_i) \wedge (t, \vec{x}_t) \in \Gamma \wedge \vec{v}_i \cdot \vec{x}_t = 0] \vee$
$[\rho(i) = \neg (t, \vec{v}_i) \wedge (t, \vec{x}_t) \in \Gamma \wedge \vec{v}_i \cdot \vec{x}_t \neq 0]\}$.

8. The cryptographic system according to claim 4,
wherein the cryptographic system is configured to perform the process using a predetermined basis $B_0$ and a predetermined basis $B^*_0$, and a predetermined basis $B$ and a predetermined basis $B^*$,
wherein the transmission device is configured to generate the ciphertext ct including a cipher vector $c_1$ which is a sum of cipher vectors $c_i$ for each integer i of i=0, . . . , L, as indicated in Formula 7, and
wherein the reception device is configured to compute a product of pairing operations on the corresponding pairs of the basis vectors of the cipher vector $c_1$ and a key vector $k^*_{L,dec}$ which is a sum of key vectors $k^*_i$ for the each integer i, as indicated in Formula 8

$$c_1 := ((\omega, 0^{u_0}, \xi, 0^{w_0}, \vec{\Phi}_0)_{B_0}, (\sigma_t(1,t), \omega \vec{x}_t), 0^u, 0^w,$$
$$\vec{\Phi}_t)_B : t=1, \ldots, L)$$ [Formula 7]

where $\vec{x}_t := (x_{t,1}, \ldots, x_{t,n})$, $\omega, \xi, \vec{\phi}_0 := \phi_{0,1}, \ldots, \phi_{0,z_0}, \sigma_t, \vec{\Phi}_t := \phi_{t,1}, \ldots, \phi_{t,z}$ are each random numbers, and $u_0, w_0, z_0, u, w, z$ are each an integer of 0, $$k^*_{L,dec} := ((-s_{dec,0}, 0^{u_0}, 1, \vec{\eta}_{dec,0}, 0^{z_0})) \mathbb{B}^*_0,$$

$$(\mu_{dec,t}(t,-1), s_{dec,t}\vec{e}_1 + \theta_{dec,t}\vec{v}_t, 0^u, \vec{\eta}_{dec,t}, 0^z) \mathbb{B}^*$$

$:t=1, \ldots, L),$ [Formula 108]

where $\vec{v}_i := (v_{i,1}, \ldots, v_{i,n})$, $\vec{\eta}_{dec,0} = \eta_{dec,0,1}, \ldots, \eta_{dec,0,w_0}, \mu_{dec,t}, \theta_{dec,t}$, are random numbers, $\vec{\eta}_{dec,t} = \eta_{dec,t,1}, \ldots, \eta_{dec,t,w}$ $s_{dec,0} := \sum_{t=1}^{L} s_{dec,t}$, n is an integer of 1 or more, and $u_0, w_0, z_0, u, w, z$ are each an integer of 0 or more.

9. The cryptographic system according to claim 5, wherein the cryptographic system is configured to perform the process using a predetermined basis $B_0$ and a predetermined basis $B^*_0$, a predetermined basis B and a predetermined basis $B^*$, and a predetermined basis $B_{d+1}$ and a predetermined basis $B^*_{d+1}$, wherein the transmission device is configured to generate the signature data sig including a signature element $s_i$, as indicated in Formula 10, by using a key vector $k^*_0$, a key vector $k^*_t$ for at least one integer t of $t=1, \ldots, d$, a key vector $_{d+1,1}$, and a key vector $_{d+1,2}$, as indicated in Formula 9, and wherein the reception device computes Formula 12 for a verification element $c_i$ for the each integer i, as indicated in Formula 11, and the signature element $s_i$ $$k^*_0 := (\delta, 0^{u_0}, \overline{\vec{\varphi}_0}, 0^{z_0})B_0,$$ [Formula 9]

$$k^*_t := (\sigma_t(1, t), \delta\vec{x}_t, 0^u, \overline{\vec{\varphi}_t}, 0^z)B,$$

$$k^*_{d+1,1} := (\delta(1, 0), 0^{u_{d+1}}, \overline{\vec{\varphi}_{d+1,1}}, 0^{z_{d+1}})B_{d+1},$$

$$k^*_{d+1,2} := (\delta(1, 0), 0^{u_{d+1}}, \overline{\vec{\varphi}_{d+1,2}}, 0^{z_{d+1}})B_{d+1}$$

where $\vec{x}_t := (x_{t,1}, \ldots, x_{t,n})$, $\delta, \vec{\phi}_0 = \phi_{0,1}, \ldots, \phi_{0,w_0}, \sigma_t, \vec{\phi}_t = \phi_{t,1}, \ldots, \phi_{t,w}$, $\vec{\phi}_{d+1,1} = \phi_{d+1,11}, \ldots, \phi_{d+1,1,w_{d+1}}$, are random numbers, $\vec{\phi}_{d+2} = \phi_{d+1,2,1}, \ldots, \phi_{d+1,2,w_{d+1}}$ n is an integer of 1 or more, and $u_0, w_0, z_0, u, w, z$ are each an integer of 0 or more, $$s^*_0 := \xi k^*_0 + r^*_0,$$ [Formula 10]

$$s^*_i := \gamma_i \cdot \xi k^*_t + \sum_{t=1}^{n} y_{i,t} \cdot b^*_{t,i} + r^*_i, \text{ for } 1 \le i \le L,$$

$$s^*_{L+1} := \xi(k^*_{d+1,1} + H \cdot k^*_{d+1,2}) + r^*_{L+1}$$

where $\xi, r^*_0, r^*_i, r^*_{L+1}$ are random numbers, $\gamma_i, \vec{y}_1 := (y_{i,1}, \ldots, y_{i,n})$ are defined as if $i \in I \wedge \rho(i) = (t, \vec{v}_i),$ $\gamma_i := \alpha_i, \vec{y}_i \xleftarrow{U} \{\vec{y}_i \mid \vec{y}_i \cdot \vec{v}_i = 0 \wedge y_{i,1} = \beta_i\},$ if $i \in I \wedge \rho(i) = \neg(t, \vec{v}_i),$ $\gamma_i := \frac{\alpha_i}{\vec{v}_i \cdot \vec{x}_t}, \vec{y}_i \xleftarrow{U} \{\vec{y}_i \mid \vec{y}_i \cdot \vec{v}_i = \beta_i\},$ if $i \notin I \wedge \rho(i) = (t, \vec{v}_i),$ $\gamma_i := 0, \vec{y}_i \xleftarrow{U} \{\vec{y}_i \mid \vec{y}_i \cdot \vec{v}_i = 0 \wedge y_{i,1} = \beta_i\},$ if $i \notin I \wedge \rho(i) = \neg(t, \vec{v}_i),$ $\gamma_i := 0, \vec{y}_i \xleftarrow{U} \{\vec{y}_i \mid \vec{y}_i \cdot \vec{v}_i = \beta_i\},$ $(\beta_i) \xleftarrow{U} \left\{(\beta_i, \ldots, \beta_L) \mid \sum_{i=1}^{L} \beta_i M_i = \vec{0}\right\},$ M is an L-row and r-column matrix, $\rho(i)$ is a variable to which $(t, \vec{v}_i)$ or $\neg(t, \vec{v}_i)$ is assigned in advance, and H is a hash value, $$c_0 := (-s_0, -s_{L+1}, \overline{0^{u_0}}, \overline{0^{w_0}}, \overline{\vec{\eta}_0})B^*_0,$$ [Formula 11]

if $\rho(i) = (t, \vec{v}_i)$ $$c_i := (\mu_i(t, -1), s_i e_i + \theta_i \vec{v}_i, \overline{0^u}, \overline{0^w}, \overline{\vec{\eta}})B^*,$$

if $\rho(i) = \neg(t, \vec{v}_i)$ $$c_i := (\mu_i(t, -1), s_i \vec{v}_i, \overline{0^u}, \overline{0^w}, \overline{\vec{\eta}})B^*,$$

$$c_{L+1} := (s_{L+1} - \theta_{L+1}H, \theta_{L+1}, \overline{0^{u_{d+1}}}, \overline{0^{w_{d+1}}}, \overline{\vec{\eta}_{L+1}})B^*_{d+1}$$

where $\vec{v}_i := (v_{i,1}, \ldots, v_{i,n})$, $\vec{\eta}_0 = \eta_{0,1}, \ldots, \eta_{0,z_0}, \mu_i, \theta_i, \vec{\eta}_i = \eta_{i,1}, \ldots, \eta_{i,z},$ are random numbers, $\vec{\eta}_{L+1} = \eta_{L+1,1}, \ldots, \eta_{L+1,z}$ $s_0 := \vec{1} \cdot \vec{f}^T, \vec{s}^T := (s_1, \ldots, s_L)^T := M \cdot \vec{f}^T,$ $\vec{f}$ is a vector having r pieces of elements, M is an L-row and r-column matrix,)

$\rho(i)$ is a variable to which $(t, \vec{v}_i)$ or $\neg(t, \vec{v}_i)$ is assigned in advance, n is an integer of 1 or more, and $u_0, w_0, z_0, u, w, z$ are each an integer of 0 or more, $\Pi_{i=0}^{L+1} e(c_i, s^*_i).$ [Formula 12]

10. A cryptographic method for performing a process using a predetermined basis B and a predetermined basis $B^*$, the cryptographic method comprising:

generating, by circuitry of a transmission device, a transmission-side vector $t_j$ for at least one index j out of a plurality of indices j, the transmission-side vector $t_j$ being a vector in which information J assigned in advance to the index j is set as a coefficient of a predetermined basis vector $b_{index}$ of the basis B, and a parameter $\Phi_j$ for the index j is set as a coefficient of another basis vector $b_{att}$ of the basis B, by a transmission device; and using, by circuitry of a reception device, a reception-side vector r for at least one index j' out of a plurality of indices j', the reception-side vector $r_{j'}$ being a vector in which information J' having an inner-product of 0 with the information J assigned in advance to the index j corresponding to the index j' is set as a coefficient of a basis vector $b^*_{index}$ of the basis B* corresponding to the basis vector $b_{index}$, and a parameter $\Psi_{j'}$ for the index j' is set as a coefficient of a basis vector $b^*_{att}$ of the basis B* corresponding to the basis vector $b_{att}$, and computing a product of pairing operations on corresponding pairs of the basis vectors of the transmission-side vector $t_j$ for the index j and the reception-side vector $r_{j'}$ for the index j' corresponding to the index j, by a reception device.

11. A non-transitory computer-readable medium encoded with non-transitory computer-readable instructions that, when executed by a computer, cause the computer to perform cryptographic processes using a predetermined basis B and a predetermined basis B*, comprising:

generating, at a transmission device, a transmission-side vector $t_j$ for at least one index j out of a plurality of indices j, the transmission-side vector $t_j$ being a vector in which information J assigned in advance to the index j is set as a coefficient of a predetermined basis vector $b_{index}$ of the basis B, and a parameter $\Phi_j$ for the index j is set as a coefficient of another basis vector $b_{att}$ of the basis B; and using, at a reception device, a reception-side vector $r_{j'}$ for at least one index j' out of a plurality of indices j', the reception-side vector $r_{j'}$ being a vector in which information J' having an inner-product of 0 with the information J assigned in advance to the index j corresponding to the index j' is set as a coefficient of a basis vector $b^*_{index}$ of the basis B* corresponding to the basis vector $b_{index}$, and a parameter $\Psi_{j'}$ for the index j' is set as a coefficient of a basis vector $b^*_{att}$ of the basis B* corresponding to the basis vector $b_{att}$, and computing a product of pairing operations on corresponding pairs of the basis vectors of the transmission-side vector $t_j$ for the index j and the reception-side vector $r_{j'}$ for the index j' corresponding to the index j.

* * * * *